US012704652B2

(12) United States Patent
Possee et al.

(10) Patent No.: US 12,704,652 B2
(45) Date of Patent: Aug. 11, 2026

(54) FAULTED SEISMIC HORIZON MAPPING

(71) Applicant: Landmark Graphics Corporation, Houston, TX (US)

(72) Inventors: Daniel James Possee, Southampton (GB); Graham Baines, Abingdon (GB)

(73) Assignee: Landmark Graphics Corporation, Houston, TX (US)

( * ) Notice: Subject to any disclaimer, the term of this patent is extended or adjusted under 35 U.S.C. 154(b) by 259 days.

(21) Appl. No.: 17/951,250

(22) Filed: Sep. 23, 2022

(65) Prior Publication Data

US 2024/0111067 A1 Apr. 4, 2024

(51) Int. Cl.
*G01V 1/34* (2006.01)
*E21B 49/00* (2006.01)
*G01V 1/30* (2006.01)

(52) U.S. Cl.
CPC .............. *G01V 1/345* (2013.01); *E21B 49/00* (2013.01); *G01V 1/30* (2013.01); *G01V 2210/642* (2013.01)

(58) Field of Classification Search
CPC .... G01V 1/345; G01V 1/30; G01V 2210/642; G01V 2210/643; G01V 1/301; E21B 49/00
See application file for complete search history.

(56) References Cited

U.S. PATENT DOCUMENTS 6,138,076 A * 10/2000 Graf ......................... G01V 1/28 702/14
6,757,615 B2 6/2004 Zauderer et al.
7,283,911 B2 10/2007 Fitzsimmons et al.
7,523,024 B2 4/2009 Endres et al.
8,213,261 B2 7/2012 Imhof et al.
8,566,069 B2 10/2013 Pauget et al.
9,164,192 B2 * 10/2015 Maerten ................. G01V 20/00
9,759,826 B2 9/2017 Mallet
9,817,142 B2 11/2017 Bornhurst et al.
9,869,783 B2 1/2018 Jin et al.
(Continued)

FOREIGN PATENT DOCUMENTS

GB 2592203 8/2021
KR 20200075727 6/2020
(Continued)

OTHER PUBLICATIONS

"U.S. Appl. No. 17/447,604, Final Office Action", Dec. 21, 2022, 13 pages.
(Continued)

*Primary Examiner* — Eyob Hagos
(74) *Attorney, Agent, or Firm* — DeLizio, Peacock, Lewin & Guerra LLP

(57) ABSTRACT

Disclosed herein are embodiments of a method, a non-transitory computer readable medium, and an apparatus for faulted seismic horizon mapping. In one example, a method comprises: obtaining seismic data for a seismic volume that corresponds to a subsurface formation; generating a map of at least one horizon in the subsurface formation based on the seismic volume; identifying at least one fault intersecting the at least one horizon; determining a throw of the at least one fault; and updating the map of the at least one horizon to incorporate the at least one fault based on the throw of the at least one fault.

20 Claims, 30 Drawing Sheets

(56) References Cited

U.S. PATENT DOCUMENTS

| | | | | |
|---|---|---|---|---|
| 10,215,868 | B2 | 2/2019 | Nguyen et al. | |
| 10,339,709 | B1 | 7/2019 | Mallet et al. | |
| 11,209,561 | B2 * | 12/2021 | Klinger | G01V 20/00 |
| 11,320,551 | B2 * | 5/2022 | Liu | G06N 3/09 |
| 11,520,077 | B2 * | 12/2022 | Denli | G06N 3/094 |
| 2003/0158669 | A1 | 8/2003 | Davidson | |
| 2006/0253759 | A1 | 11/2006 | Wei | |
| 2008/0015784 | A1 | 1/2008 | Dorn et al. | |
| 2010/0214870 | A1 | 8/2010 | Pepper et al. | |
| 2011/0118985 | A1 | 5/2011 | Aarre | |
| 2011/0307178 | A1 | 12/2011 | Hoekstra | |
| 2013/0235697 | A1 | 9/2013 | Szydlik et al. | |
| 2015/0066460 | A1 * | 3/2015 | Klinger | G01V 1/302<br>703/2 |
| 2015/0103623 | A1 | 4/2015 | Gersztenkorn | |
| 2015/0293260 | A1 | 10/2015 | Ghayour et al. | |
| 2016/0124117 | A1 * | 5/2016 | Huang | G06T 17/05<br>703/2 |
| 2017/0242141 | A1 | 8/2017 | Cotton et al. | |
| 2017/0337302 | A1 * | 11/2017 | Mezghani | G06F 30/20 |
| 2018/0031721 | A1 * | 2/2018 | Etiene Queiroz | G06T 17/05 |
| 2019/0243017 | A1 * | 8/2019 | Klinger | G01V 1/301 |
| 2019/0302309 | A1 * | 10/2019 | Li | G06F 17/142 |
| 2020/0166664 | A1 | 5/2020 | Bin Gubair et al. | |
| 2022/0091292 | A1 | 3/2022 | Nguyen | |
| 2022/0221604 | A1 * | 7/2022 | Skjæveland | G01V 20/00 |
| 2022/0291418 | A1 * | 9/2022 | Noufal | G01V 20/00 |
| 2023/0085023 | A1 | 3/2023 | Possee et al. | |
| 2023/0161061 | A1 | 5/2023 | Denli et al. | |

FOREIGN PATENT DOCUMENTS

| | | | |
|---|---|---|---|
| WO | 2018065684 | 4/2018 | |
| WO | WO-2022256039 A1 * | 12/2022 | G01V 1/301 |
| WO | 2023042476 | 3/2023 | |

OTHER PUBLICATIONS

"PCT Application No. PCT/US2023/065971, International Search Report and Written Opinion", Jul. 27, 2023, 10 pages.

"PCT Application No. PCT/US2022/077032, International Search Report and Written Opinion", Jun. 9, 2023, 10 pages.

Wang, et al., "3D Seismic Horizon Extraction with Horizon Patch Constraints", Paper presented at the 2015 SEG Annual Meeting, New Orleans, Louisiana, Oct. 2015, Oct. 18, 2015, 5 pages.

"PCT Application No. PCT/US2021/071473, International Search Report and Written Opinion", Jun. 14, 2022, 8 pages.

"U.S. Appl. No. 17/447,604, Non-Final Office Action", Sep. 6, 2022, 11 pages.

Branch, et al., "A Subspace, Interior, and Conjugate Gradient Method for Large-Scale Bound-Constrained Minimization Problems", SIAM Journal on Scientific Computing, vol. 21, 23 pages, 1999.

Ferreira, et al., "Seismic Graph Analysis to Aid Seismic Interpretation", Interpretation, vol. 7, Issue 3, May 28, 2019, 12 pages.

Hale, "Dynamic Warping of Seismic Images", Geophysics, vol. 78, Issue 2, Mar. 1, 2013, pp. 233-244.

Hale, "Methods to Compute Fault Images, Extract Fault Surfaces, and Estimate Fault Throws From 3D Seismic Images", Geophysics, vol. 78, Issue 2, Mar.-Apr. 2013, pp. O33-O43.

Höllt, et al., "Interactive Seismic Interpretation with Piecewise Global Energy Minimization", 2011 IEEE Pacific Visualization Symposium, Hong Kong, Mar. 4, 2011, 8 pages.

Kidd, "Fundamentals of 3D Seismic Volume Visualization", Offshore Technology Conference, Houston, TX, May 3-6, 1999, 13 pages.

Pauget, et al., "A Global Approach in Seismic Interpretation Based on Cost Function Minimization", SEG Technical Program Expanded Abstracts, 2009, pp. 2592-2596.

Wu, et al., "Horizon vols. with interpreted constraints", Geophysics, vol. 80, No. 2 (Mar.-Apr. 2015), 13 pages.

Wu, et al., "Least-squares horizons with local slopes and multi-grid correlations", Geophysics, vol. 83; Jun. 2018, 15 pages.

"U.S. Appl. No. 17/950,995 Non-Final Office Action", Feb. 3, 2025, 20 pages.

* cited by examiner

FAULTED SEISMIC HORIZON MAPPING

BACKGROUND

Evaluation of subsurface formations can include locating horizons and faults within such formation. A horizon is a geological feature within a formation, or which may define boundaries of a formation which corresponds to a marked change in lithology or stratigraphy. Horizons which are strong seismic reflectors can be detected in geological formations based on distinctive reflections apparent in seismic data which mark them as seismic horizons. Identification and interpretation of seismic horizons can aid in geological feature identification (e.g., faults, fans, channels, etc.), geological dating of relative strata, and location and identification of reservoirs.

BRIEF DESCRIPTION OF THE DRAWINGS

Embodiments of the disclosure may be better understood by referencing the accompanying drawings.

DESCRIPTION OF EMBODIMENTS

Figure 1A:
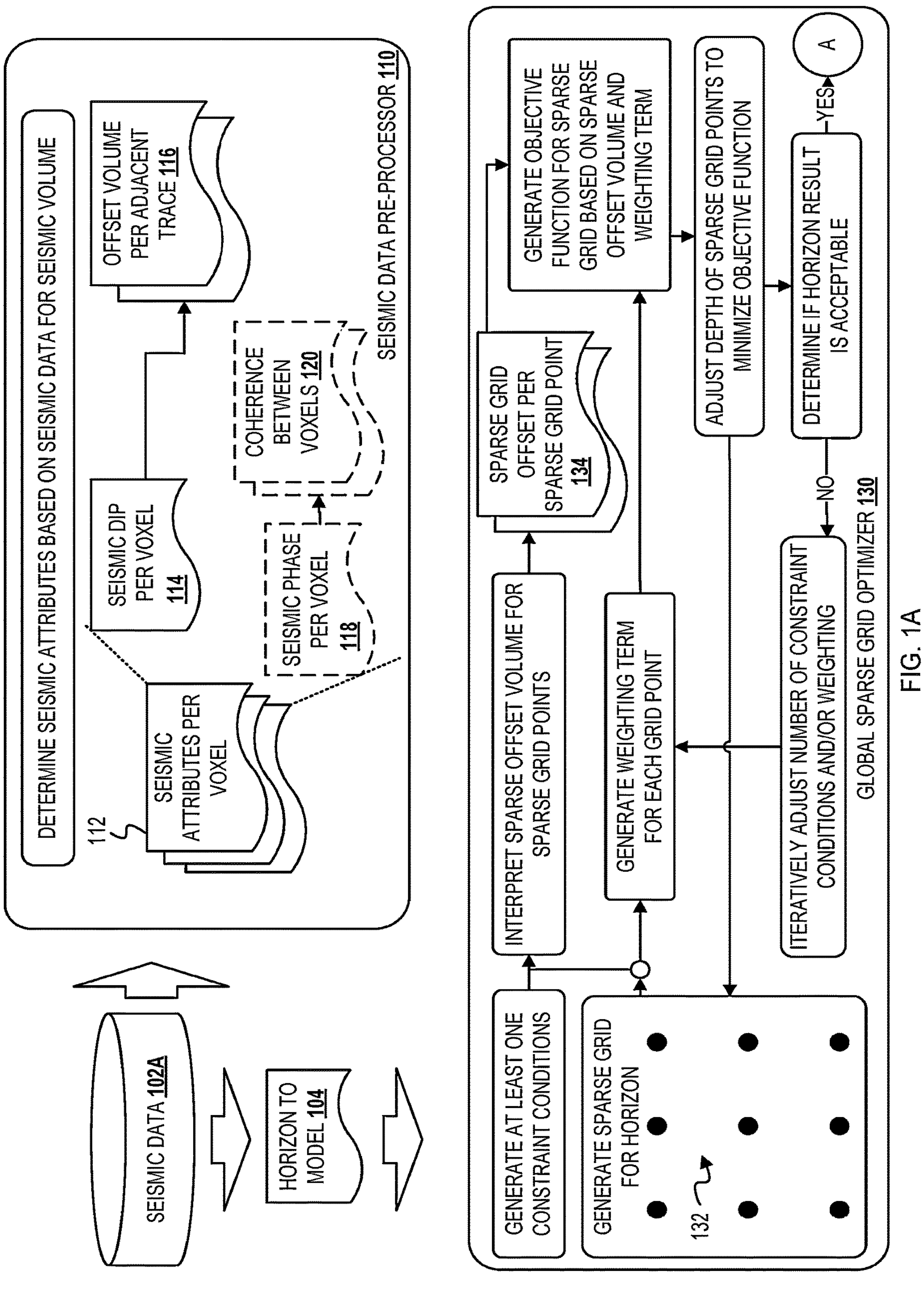
FIGS. 1A-1B depict an example system for seismic horizon mapping with multi-scale optimization, according to some embodiments.

The description that follows includes example systems, methods, techniques, and program flows that illustrate embodiments of the disclosure. However, it is understood that this disclosure may be practiced without these specific details. For instance, this disclosure refers to seismic dip in illustrative examples. Embodiments of this disclosure can be also applied to other measures of horizon directionality or gradients. In other instances, well-known instruction instances, protocols, structures and techniques have not been shown in detail in order not to obfuscate the description.

Example embodiments may be used for formation evaluation for subsurface formations. For example, some embodiments can assist in recovery of hydrocarbons from a subsurface formation in which a wellbore was created. Formation evaluation can include identification of horizons in seismic data of the subsurface formations in order to provide a detailed geologic interpretation of these formations. Other embodiments may consider the presence of faults when interpreting seismic horizons. However, extraction of horizons from such seismic data can be a difficult task. In particular, the overall structure of a horizon in a complex geological environment can be hard to interpret across a seismic volume. As a result, manual extraction of a single horizon in a large three-dimensional dataset can be time-consuming and therefore costly. As workflows (such as in reservoir characterization and stratigraphic studies) advance, there is an increasing need to extract large numbers of seismic horizons from any given dataset. Therefore, methods that can help automatically extract seismic horizon from any given dataset can be extremely valuable.

Example implementations described herein may account for the presence of faults when interpreting seismic horizons. The interpretation of seismic horizons from a post-stack seismic volume may be complicated by the presence of faults. Horizon interpretation may struggle with such structures because these faults may represent large discontinuities on the horizon surface which may be hard to traverse as they require shifts that aren't captured by local seismic attributes. A common approach to dealing with faults is simply to block/stop horizon interpretation when a fault surface is met. However, to complete a horizon surface the algorithm must be able to find a path around the fault or must be provided with constraints on either side of the fault. Another approach is to un-fault the seismic volume using estimated fault throw vectors; such that horizon interpretation in the un-faulted space is more straight-forward. However, estimating fault throw directly from the seismic volume may be difficult and the un-faulting process may be compute-intensive and thus time-consuming.

Example implementations described herein for addressing the presence of faults when interpreting seismic horizons may include operations that first estimate a fault throw. This estimate may then be combined within a horizon optimization framework to aid the initial horizon predictions. As horizon surfaces are refined, their displacement across faults may be used to update the initial fault throw estimates. This in turn may aid the interpretation of subsequent horizons and a geologically consistent stack of horizon can be built quickly. Overall, this interactive and iterative workflow is intuitive and will hugely reduce the time taken to interpret seismic horizons in structurally complex datasets.

Example implementations may allow for the direct incorporation of discrete fault planes within a horizon framework itself. Such implementations may aid in extracting more accurate seismic horizons in structurally complex datasets, especially those where horizons are segmented into isolated fault blocks. Additionally, example implementations may easily be extended to incorporate vertical fault throws that have been estimated by some other method. Accordingly, example embodiments may include operations that allow for more efficient and robust extraction of seismic horizon in structurally complex datasets. This may ultimately lead to time savings and therefore cost savings during the interpretation of seismic data.

Operations for incorporation of discrete fault planes into horizon seismic data (as described herein) may be combined with a number of different approaches for generating horizon seismic data. For example, in some implementations, operations for incorporation of discrete fault planes into horizon seismic data may be combined with seismic horizon mapping with multi-scale optimization (also as described herein).

For example, some embodiments may include a new global method for seismic horizon interpretation, which can be based on multi-scale grids and constrained linear optimization. Example embodiments may optimize seismic reflector dips to achieve a globally consistent horizon interpretation. In some implementations, horizon interpretation may include three main operations. The first operation can be a pre-processing operation, whereby a dip volume is abstracted onto a sparse global grid. The second operation can include optimizing the horizon interpretation on this sparse global grid. The third operation can include executing local optimizers to return the horizon interpretation to full input resolution.

By separating into these three operations, example embodiments can provide for accurate seismic horizon interpretation while being less computationally intensive (and thus providing faster results) than conventional approaches. As further described below, the first and third operations can be computationally intensive because such operations are processing at the resolution of the seismic data. However (as further described below), the second operation can be much less computationally intensive and extremely efficient because less data (a sparse grid) is being processed. For example, in the second operation, every nth trace in the two horizontal directions can be processed (thereby reducing the complexity of the global optimization by $n^2$).

Therefore, n can be scaled in order to ensure the global optimization stage works in seconds, regardless of data size and/or computational power available. Thus, example embodiments can include seismic interpretation that can make changes and add new constraints to the horizon interpretation, while seeing the changes to the global grid in a reduced time. Also, after the global grid has been created, the third operation can be executed to generate a final horizon at full resolution. Thus, example embodiments can include seismic interpretation that focuses on refining the global structure of the horizon interactively in real time and allows the local high-resolution structure to be populated automatically (as described herein).

Thus, example embodiments can map seismic horizons of formations based on multi-scale optimization. For example, example embodiments can determine seismic dip and, optionally, other seismic attributes for each voxel of an acquired seismic volume. Seismic dip is a vector quantity and can be defined as a measure of the gradients or angle of a reflector or seismic horizon or other feature of the seismic data with respect to the earth's surface. Seismic dip may include magnitude and direction in which dip is measured. A sparse global grid can then be determined for a selected horizon, where the sparse global grid contains at least one constraint point. Based on the sparse global grid and the seismic dip, a sparse offset dip volume can be determined which accounts for the change in orientation of the seismic horizon across the seismic volume. An objective function for the sparse global grid can then be minimized iteratively over the sparse global grid based on the sparse offset dip volume, where the objective function is a function of the depth at each of the grid points of the sparse global grid, in order to iteratively approximate the seismic horizon at depths throughout the seismic volume. The seismic horizon mapped using the global sparse grid can be used to identify any areas to be further refined and allow adjustment of the sparse global gird, where adjustments of the sparse global grid occur before significant computing power is expended.

Local grids, which account for individual seismic trace data, can be generated based on the sparse global grid. The objective function for the local grid edges, where local grid edges are contained in more than one local grid, can then be minimized iteratively based on the offset (or dip) volume interpreted for adjacent traces. The objective function for each of the local grids can then be minimized iteratively based on the sparse offset dip volume in order to generate the seismic horizon mapped to units as small as individual seismic traces. Various example embodiments also include iterative minimization of the objective function based on an additional seismic attribute, such as seismic phase, seismic coherence, etc., in addition to seismic dip.

Based on a mapped seismic horizon, additional seismic horizons can be mapped with multi-scale optimization. For additional seismic horizons, the depth of the sparse global grid can be constrained by neighboring mapped seismic horizons. The depth of the sparse global grid can also be predicted by using dynamic time warping (DTW) applied, as an additional seismic attribute with seismic dip. DTW can also be used instead of seismic dip to generate a depth offset for points of a grid (e.g., the sparse global grid or a local grid) based on a warping path relationship between various vertical traces of a seismic volume. By mapping a plurality of seismic horizons in a seismic volume, a continuous relative geologic time volume can be produced. For various example embodiments, the uncertainty of the model can also be determined, such as based on a covariance matrix.

As further described below, example embodiments differ from conventional approaches for seismic horizon mapping because of incorporation of a global interpretation of a seismic horizon (that can include simultaneous assessment of available data to find a best fitting solution for a horizon). In contrast, conventional approaches are limited to performing local tracking outward from a constraint point (or seed point). Such conventional approaches only assess local data and can, therefore, be more susceptible to providing an incorrect or in complete solution.

Thus, example embodiments can allow for efficient and automated extraction of horizons from a seismic volume. In addition, the efficiency of the global optimization stage on a sparse grid allows for a seismic interpretation that can include added constraints and can provide updates in real time or near real time to ensure horizon interpretations are accurate. Also, the decomposed nature of example embodiments can be more scalable than conventional global horizon interpretation approaches, resulting in better performance on larger datasets.

Example System

Figure 1B:
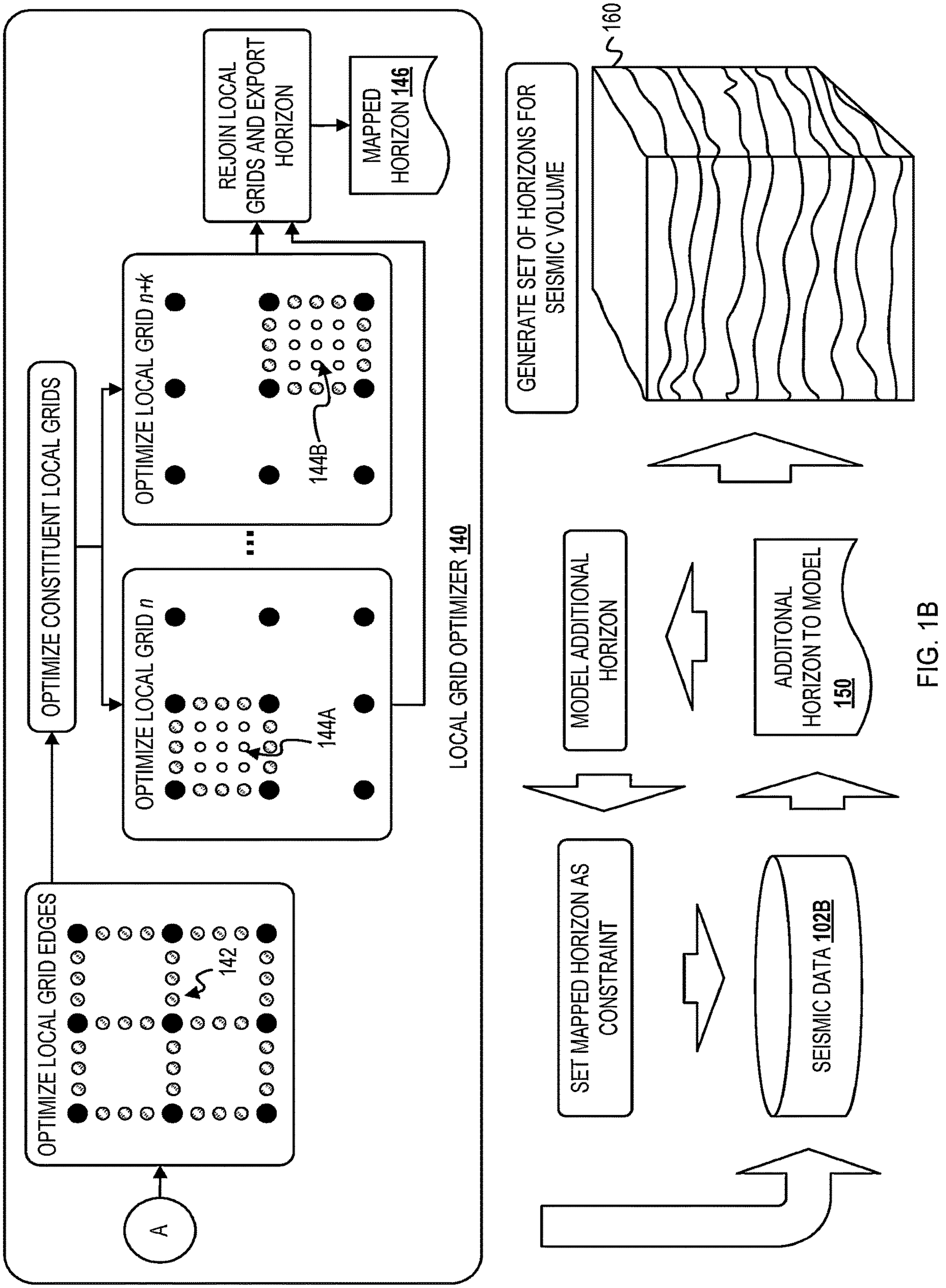

FIGS. 1A-1B depict an example system for seismic horizon mapping with multi-scale optimization, according to some embodiments. FIGS. 1A-1B illustrate a seismic data pre-processor 110, a global sparse grid optimizer 130, and a local grid optimizer 140.

For a set of seismic data 102A (which can be a seismic volume or a set of seismic traces approximating a seismic volume and can include information about seismic phase, seismic frequency, seismic amplitude, etc.), the seismic data pre-processor 110 determines seismic attributes based on the seismic data of the seismic volume. The seismic data pre-processor 110 can determine seismic attributes per voxel 112, where a voxel represents the discrete three-dimensional (3D) elements into which the seismic volume is divided. The seismic attributes per voxel 112 can include seismic dip per voxel, where seismic dip is a measure of the gradient of seismic reflectors corresponding to seismic horizons in the seismic volume and can be calculated using an image tensor or other appropriate method. The total collection of seismic dip per voxel can be referred to as a "dip volume", which is the dip for each voxel of the seismic volume. Based on the seismic dip per voxel 114, an offset volume per adjacent trace 116 can be calculated. The offset volume per adjacent trace 116 is a measure of seismic dip occurring between adjacent traces and a measure of the distance (in one, two or three dimensions) between the adjacent traces for which seismic dip is determined. The offset volume per adjacent trace 116 measures the seismic dip per voxel 114 and accounts for the granularity of the data acquisition (i.e., distance between measurements).

The seismic attributes per voxel 112 can also include measures of a seismic phase per voxel 118 (where seismic phase can include relative phase, such as in relation to the seismic source, absolute phase, etc.). The seismic attributes per voxel 112 can also include a measure of coherence between voxels 120, where the coherence between voxels 120 can be determined for each voxel with respect to each other voxel or can be determined for each voxel with respect to a reference voxel. The coherence between voxels 120 can be determined with respect to phase, amplitude, and/or frequency between the seismic signals of the respective voxels. The seismic attributes per voxel 112 can also include any other appropriate seismic attributes, including fault locations, distance to a fault, etc.

From the seismic data 102A, a horizon to model 104 is selected. The horizon to model 104 (hereinafter the "modeling horizon 104") can be selected from the seismic volume, such as based on intensity of reflection, intensity of amplitude, based on distance from other previously modeled horizons, etc. The global sparse grid optimizer then generates at least one constraint condition and a sparse grid 132 for the modeling horizon 104. The constraint condition can be a constraint point (or seed point), where a constraint point is an identified location of the horizon in the seismic volume. The constraint point is defined by a vector or coordinate in the three-dimensions of the seismic volume (which may be trace number by trace number by time, distance by distance by depth, or any other appropriate seismic volume dimensional scheme). Hereinafter "depth" is used to refer to the third dimension of the seismic volume, which can be physical depth, time, etc. The constraint point is located on the modeling horizon 104 and on the sparse grid 132, and identifies the modeling horizon 104 which has been selected.

The sparse grid 132 is a collection of points in the seismic volume at the approximate depth of the modeling horizon 104. The sparse grid 132 can be generated at the depth of the constraint point, if one constraint point is used, or on a plane between or surface between multiple constraint points, if multiple constraint points are used. The sparse grid 132 is shown as a square grid, but other types of grids can be used including triangular grids, mesh grids (including variable spacing mesh grids), etc. The depth of the points of the sparse grid 132 are adjusted by the sparse grid optimizer 130 to conform with the depth of the seismic horizon within the seismic volume.

The global sparse grid optimizer 130 interprets the offset volume per adjacent trace 166 based on the sparse grid 132 to generate a sparse grid offset per sparse grid point 134. The sparse grid offset per sparse grid point 134 abstracts the values of the offset volume per adjacent trace 116 for the voxels between the grid points of the sparse grid 132 into a single value for each of the grid points of the sparse grid 132. Values of the sparse grid offset per sparse grid point 134 can be contained within a sparse offset volume, where the sparse offset volume is a collection the values of the sparse grid offset per sparse grid point 134 evaluated at the locations of the points of the sparse grid 132 and various depths which make up the seismic volume.

The global sparse grid optimizer 130 also generates a weighting term for each grid point of the sparse global grid 132. The weighting term can include a contribution from a spatial weighting term, a coherence weighting term (e.g., coherence along a given trace, coherence between two points, etc.), a data quality weighting term, a fault proximity weighting term, etc. The spatial weighting term can be a weighting term based on spatial proximity to at least one constraint point.

The global sparse grid optimizer 130 generates an objective function for the sparse grid based on depths of the points of the sparse grid 132, the sparse grid offset per sparse grid point 134, and the weighting term. The global sparse grid optimizer 130 then adjusts depth of the points of the sparse global grid 132 to minimize the objective function. The global sparse grid optimizer 130 can then determine if the seismic horizon map represented by the points of the global sparse grid 132 is acceptable. The global sparse grid optimizer 130 can determine if the seismic horizon map is acceptable based on a number of iterations, a value of the objective function, a value of an error estimate (such as generated by a covariance matrix), etc. If the depths of the points of the global sparse grid 132 are acceptable as a map of the seismic horizon, flow then continues through transition point A to FIG. 1B and operations of the local grid optimizer 140. If the depths of the points of the global sparse grid 132 are not acceptable as a map of the seismic horizon, then the global sparse grid optimizer 130 can iteratively adjust the number of constraint conditions and/or weighting.

The global sparse grid optimizer 130 can add one or more constraint points, prompt an operator or interpreter to generate one or more constraint points, etc. and adjust the global sparse grid 132 based on the additional one or more constraint points. The global sparse grid optimizer 130 can also generate one or more constraint conditions, which can be depth minimums, depth maximums, neighboring seismic horizon map exclusionary zones, etc., for the global sparse grid 132. The global sparse grid optimizer 130 can also adjust the weighting term for each grid point of the sparse global grid 132 or a component of the weighting term. For example, the global sparse grid optimizer 130 can, based on the seismic data 102A or additional seismic attributes or interpretation, identify one or more faults within the seismic volume. The global sparse grid optimizer 130 can then generate or adjust a fault proximity weighting term to decrease contributions to the objective function of the points of the sparse global grid 132 which are within a tolerance distance of a fault. The global sparse grid optimizer 130 can also adjust the number or concentration of the points of the global sparse grid 132. The global sparse grid optimizer 130 then generates the objective function for the sparse grid based on depths of the points of the sparse grid 132, the sparse grid offset per sparse grid point 134, and the weighting term as iteratively adjusted. The global sparse grid optimizer 130 can compute the value of the sparse grid offset per sparse grid point 134 based on the depths of the points of the sparse grid 132. Alternatively, the seismic data pre-processor 110 can generate or pre-compute the sparse grid offset per sparse grid point 134 for each of the locations of the sparse grid 132 and various depths such that values of the sparse offset are stored as the sparse offset volume for multiple possible depths of the points of the sparse grid 132.

The global sparse grid optimizer 130 can then adjust depth of the points of the sparse global grid 132 to minimize the objective function and determine if the seismic horizon map represented by the points of the global sparse grid 132 is acceptable, as previously described.

If the depths of the points of the global sparse grid 132 are acceptable as a map of the seismic horizon, the sparse global grid optimizer 130 outputs the points and depths of the global sparse grid 132 to the local grid optimizer 140. The local grid optimizer 140 can then optimize the map of the seismic horizon points along the points corresponding to local grid edges 142.

The local grid optimizer 140 can generate multiple local grids 144A, 144B and the local grid edges 142. The local grid optimizer 140 can first generate the local grid edges 142 between the points of the global sparse grid 132. For example, the local grid optimizer 140 can generate the local grid edges 142 based on vectors which run between the points of the global sparse grid 132. The local grid optimizer 140 can then populate the local grid edges 142 with grid points to form the multiple local grids 144A, 144B.

Alternatively, the global sparse grid optimizer 130 can populate the sparse global grid with grid points and assign some of the grid points to local grid edges 142 and divide other grid points among the multiple local grids 144A, 144B. For example, the global sparse grid optimizer 130 can generate the multiple local grids 144A, 144B with a grid point separation based on the granularity of the seismic data 102A (i.e., with M points where M is the number of seismic traces) and select N number of points of the one or more local grid 144 as points of the global sparse grid 132 (where $N<M$). In another example, the global sparse grid optimizer 130 can select every n points of the multiple local grids 144A, 144B as points of the global sparse grid 132. The depths of the points of the local grid edges 142 can be optimized to map the seismic horizon using an objective function minimization, as described in reference to the global sparse grid optimizer 130. The local grid optimizer 140 may add additional constraint conditions during optimization as previously described.

The local grid optimizer 140 can then optimize the map of the seismic horizon points over each of the K local grids, where K is the number of the multiple local grids 144A, 144B which make up the global sparse grid 132. The local grid optimizer 140 can optionally generate the multiple local grids 144A, 144B with variable point spacing, such that a first local grid can contain more points than a second local grid. For example, a local grid which contains a fault can have fewer points or a larger spacing between points than a local grid which does not contain a fault. The depths of the points of the multiple local grids 144A, 144B can be optimized to map the seismic horizon using an objective function minimization, as described in reference to the global sparse grid optimizer 130. The local grid optimizer 140 may add additional constraint conditions during optimization. The local grid optimizer 140 can also optionally operate multiple optimizations in parallel or operate as multiple local grid optimizers 140 in parallel—the local grid optimizer 140 can operate on each of the multiple local grids 144A, 144B separately or concurrently. The local grid optimizer 140 can use distributed computing, parallel processing, concurrent computing, etc. in order to reduce operational time for optimization of the multiple local grids 144A, 144B. The local grid optimizer 140 can rejoin each of the K local grids into a mapped horizon 146, which contain the points and depths of the global sparse grid 132, the local grid edges 142, and the multiple local grids 144A, 144B and is a map of the modeling horizon 104. The mapped horizon 146 can then be exported for interpretation.

The mapped horizon 146 can also be added to or associated with seismic data (i.e., the seismic data 102A) for the seismic volume to generate seismic data 102B, where the seismic data 102B contains information about the mapped horizon 146 and, optionally, other mapped horizons. Based on the seismic data 102B, an additional horizon to model 150 can be selected and modeled. The sparse global grid optimizer 130 can generate additional constraint conditions for the sparse global grid 132 of the additional horizon to model 150 based on the mapped horizon 148. Seismic horizons, which can be assumed to have zero or negligible thickness, correspond to geological depositional features (i.e., sedimentary layers, volcanic events, etc.) and generally occur in the same relative orientation as a function of depth. In rare cases, seismic horizons can be inverted in order and because of the generally stable relationship between seismic horizons, the mapped horizon 146 can be used as a constrain (i.e., upper bound or lower bound) for a neighboring additional horizon to model 150.

Once the additional horizon to model 150 has modeled as a mapped horizon, it too can be added to the seismic data 102B and function as a constraint condition for any further modeling horizons. In such a manner, a set of horizons can be generated for the seismic volume 160. The set of horizons can then be interpreted, together with geological age data, as a map of continuous relative geological time for the seismic volume 160.

Example Operations

Figure 2:
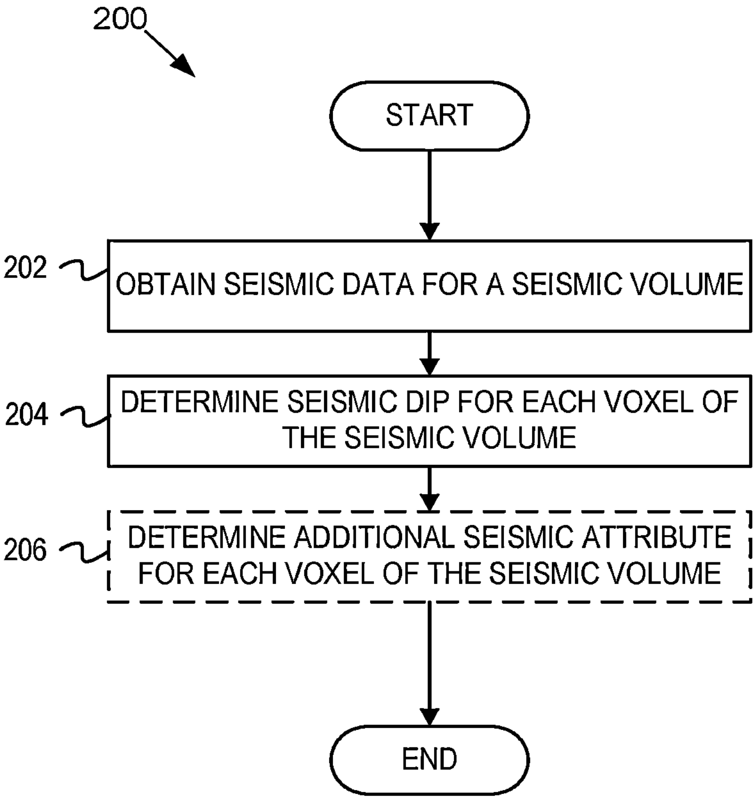
FIG. 2 depicts a flowchart of example operations for seismic data pre-processing, according to some embodiments.
Figure 3:
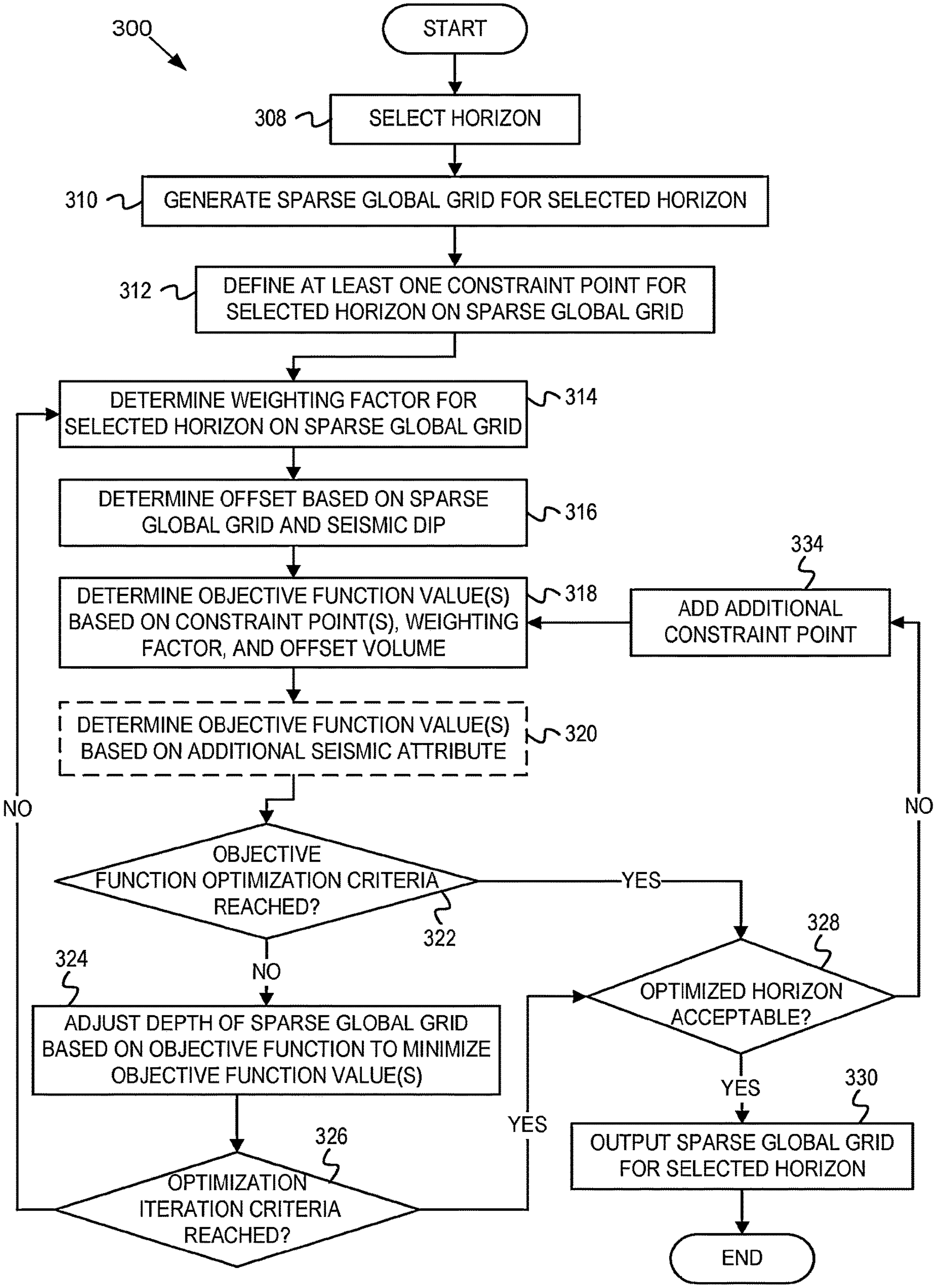
FIG. 3 depicts a flowchart of example operations for optimization of a horizon on a global sparse grid, according to some embodiments.
Figure 4:
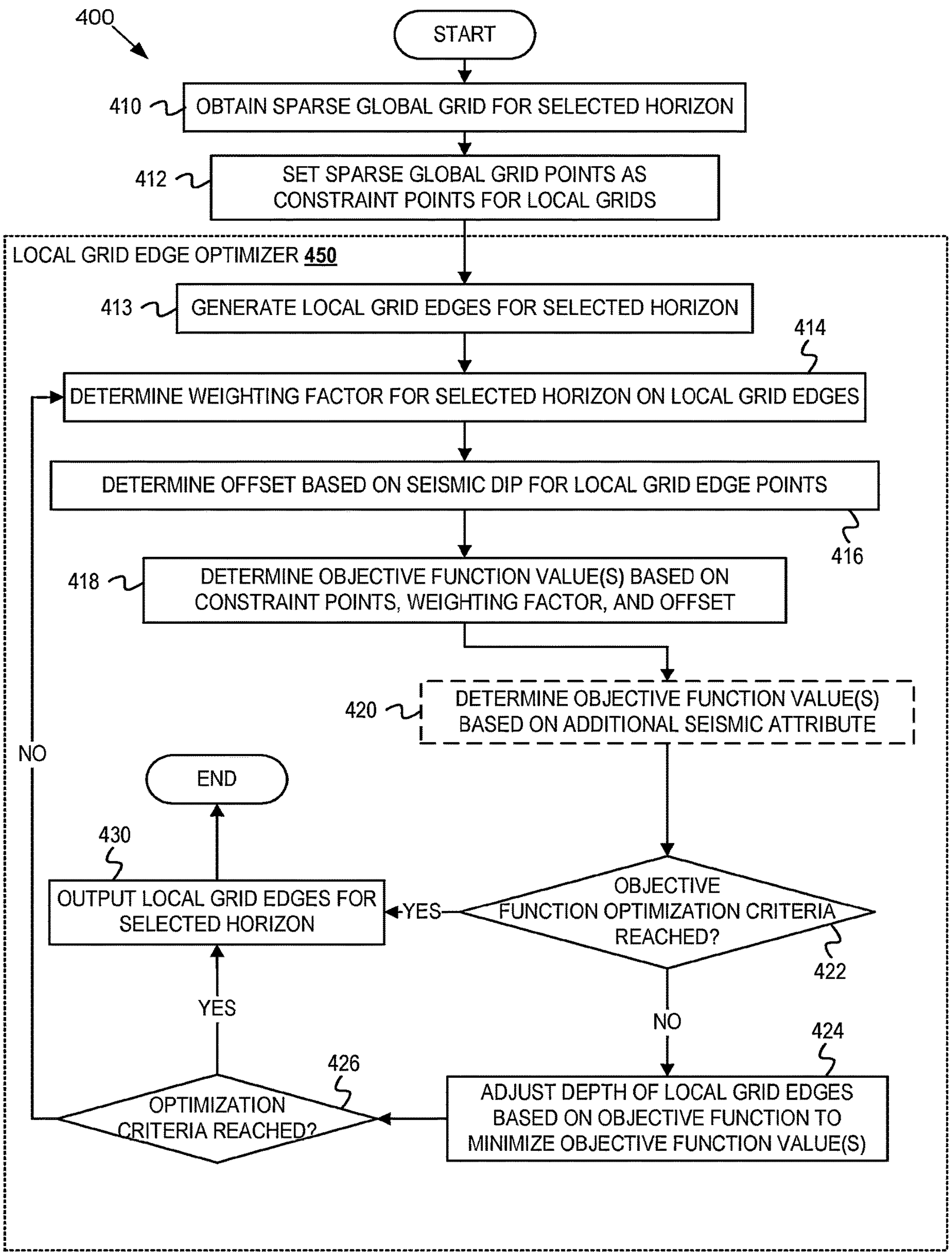
FIG. 4 depicts a flowchart of example operations for optimization of a horizon over edges of local grids, according to some embodiments.

Example operations are now described in reference to FIGS. 2, 3, 4, and 5. FIG. 2 depicts a flowchart of example operations for seismic data pre-processing. FIG. 3 depicts a flowchart of example operations for optimization of a horizon on a global sparse grid. FIG. 4 depicts a flowchart of example operations for optimization of a horizon over edges of local grids and FIG. 5. depicts a flowchart of example operations for optimization of a horizon on a local grid. Additionally, the example operations are described with reference to the example system of FIGS. 1A-1B.

FIG. 2 depicts a flowchart of example operations for seismic data pre-processing, according to some embodiments. A flowchart 200 of FIG. 2 includes operations described as performed by the seismic data pre-processor 110 for consistency with the earlier description. Such operations can be performed by a controller or processor, hardware, firmware, software, or a combination thereof of one or more computers, including asynchronously. However, apparatus component naming, division, organization, and program code naming, organization, and deployment can vary due to arbitrary operating choice, ordering, programmer choice, programming language(s), platform, etc. Additional, operations of the flowchart 200 are described in reference to the seismic data 102A of FIGS. 1A-1B. The flowchart includes the operations described as performed by the seismic data pre-processor 110, but one or more of the operations may instead or additionally be performed by the global sparse grid optimizer 130 or the local grid optimizer 140.

At block 202, seismic data is obtained for a seismic volume. For example, with reference to FIGS. 1A-1B, the seismic data pre-processor 110 can obtain the seismic data for the seismic volume. The seismic data can be a collection of seismic traces collected during a two dimensional (2D) or multiple 2D seismic surveys, during a 3D seismic survey, during a 4D seismic survey, etc. The seismic data can be generated from multiple 2D seismic surveys of either correlated to form a 3D seismic survey. In some embodiments, the seismic volume may be a seismic area. The seismic data can be obtained at multiple receivers or sensors in response to a charge or shot deployed to generate a seismic signal. The seismic data can be obtained along two axes of earth's surface, which may or may not be orthogonal. The seismic volume may not be regularly shaped (i.e., have orthogonal axes) but can be any shape. The seismic data can be obtained for a geological formation unit, which can be a region, reservoir, basin, field, etc. The seismic data can be obtained for a field containing drilling wells, including exploration wells, production wells, injection wells, abandoned wells, etc. The seismic data can be obtained for a subsea geological formation, for example via a seismic vessel.

At block 204, seismic dip for each voxel off the seismic volume is determined. For example, with reference to FIGS. 1A-1B, the seismic data pre-processor 110 determines the seismic dip for each voxel of the seismic volume. The voxel can be the smallest unit of the seismic volume, such as the volume defined by individual seismic traces and a resolution limit of the seismic sensors. The voxel can be defined in an appropriate dimension, such as trace by trace by time, length by length by depth, etc. The voxel can be any appropriate division of the seismic volume or the seismic data for which seismic attributes can be determined.

Seismic dip is a measure of the gradient of seismic reflectors which generate seismic horizons or other features of the seismic volume and can be calculated using an image tensor or other appropriate method. The seismic dip can be calculated using an image structure tensor, which can be determined using any appropriate equation such as Equation 1, below:

$$T(x) = \begin{bmatrix} \langle g_1(x)g_1(x)\rangle & \langle g_1(x)g_2(x)\rangle \\ \langle g_1(x)g_2(x)\rangle & \langle g_2(x)g_2(x)\rangle \end{bmatrix} \quad (1)$$

where $g_1(x)$ and $g_1(x)$ represent the horizontal components of the image gradient $g_1(x)$ in each of the horizontal directions, and the brackets <•> represent a two-dimensional (2D) smoothing of each component of the structure tensor field, such as a Gaussian filter. Seismic dip can be calculated for each voxel of the seismic volume.

At block 206, optionally an additional seismic attribute is determined for each voxel of the seismic volume. For example, with reference to FIGS. 1A-1B, the seismic data pre-processor 110 determines the additional seismic attribute for each voxel of the seismic volume. The seismic data pre-processor 110 can determine one or more additional seismic attribute, such as coherence, relative coherence, phase, relative phase, intensity, relative intensity, etc. using any appropriate method. The seismic data pre-processor 110 can also obtain one or more additional seismic attribute from another source, such as a fault map, or based on a comparison of the data of the seismic volume to a reference point or other seismic data. For example, the seismic data pre-processor 110 can compare the phase of the seismic signal at each voxel to the seismic signal of its nearest neighbors to determine a signal to noise or coherence ratio. The seismic data pre-processor 110 can also compare the amplitude of the seismic signal at each voxel to the amplitude of the seismic source to determine a strength of the seismic reflector.

FIG. 3 depicts a flowchart of example operations for optimization of a horizon on a global sparse grid, according to some embodiments. A flowchart 300 of FIG. 3 includes operations described as performed by the global sparse grid optimizer 130 for consistency with the earlier description. Such operations can be performed by a controller or processor, hardware, firmware, software, or a combination thereof of one or more computers, including asynchronously. However, apparatus component naming, division, organization, and program code naming, organization, and deployment can vary due to arbitrary operating choice, ordering, programmer choice, programming language(s), platform, etc. Additional, operations of the flowchart 300 are described in reference to the seismic data 102A, modeling horizon 104, and seismic data pre-processor 110 of FIGS. 1A-1B. The flowchart includes the operations described as performed by the global sparse grid optimizer 130, but one or more of the operations may instead or additionally be performed by the seismic data pre-processor 110 or the local grid optimizer 140.

At block 308, a horizon is selected. For example, with reference to FIGS. 1A-1B, the global sparse grid optimizer 130 can select a horizon. the global sparse grid optimizer 130 can select a horizon based on operator input, such as based on an operator identified constraint point, seed point, starting point, etc. The global sparse grid optimizer 130 can select a horizon based on previously mapped horizons—i.e., the global sparse grid optimizer 130 can proceed through a seismic volume selecting horizons as a function of depth (where depth can also correspond to geological age). The global sparse grid optimizer 130 can select a horizon based on relative strength or coherence of the horizon as compared to other horizons of the seismic volume.

At block 310, a sparse global grid is generated for the selected horizon. For example, with reference to FIGS. 1A-1B, the global sparse grid optimizer 130 can generate the sparse global grid for the selected horizon. The global sparse grid optimizer 130 can generate the sparse global grid based on the voxels of the seismic data—for example as generating a grid point for the sparse global grid every n voxels, where n is greater than one. In example embodiments, n may be five (5) or six (6), but n can be these or any other appropriate value. As the objective function is a set of linear equations in N variables, where N is the number of grid points (for a volume of dimensions of m by m where $N=m^2$), solving for the objective function involves a set of $N=m^2$ equation. Complexity of a minimization of the objective function is reduced as the number of points over which the minimization is performed are reduced. For a value of n, the complexity of the minimization of the objective function is reduced by a factor of $n^2$, where the number of equations are now $$\frac{m}{n} * \frac{m}{n} = \frac{m^2}{n^2} = \frac{N}{m^2}.$$

The global sparse grid optimizer 130 can therefore select an n which is large enough to simplify the minimization of the objective function while still including features of the selected horizon within the global sparse grid.

The global sparse grid optimizer 130 can generate the sparse global grid at a depth in the seismic volume, such that each point on the grid has the same depth or a depth defined by a constraint point or constraint surface. The global sparse grid optimizer 130 can generate the sparse global grid in two dimensions, such that a depth is added to the sparse global grid once a constraint point is selected.

The global sparse grid optimizer 130 can also generate a sparse offset volume based on the sparse global grid. Once the grid points of the sparse global grid are determined in the horizontal directions, sparse offset values can be determined for the grid points at the depths in the seismic volume. The sparse offset volume can then be generated which contains the sparse offsets for the locations of the grid points of the sparse global grid and each depth the grip points can occupy.

At block 312, at least one constraint point for the selected horizon is defined on the sparse global grid. For example, with reference to FIGS. 1A-1B, the global sparse grid optimizer 130 can define the at least one constraint point for the selected horizon on the sparse global grid. The global sparse grid optimizer 130 can select the constraint point based on the selected horizon. Optionally, at least one constraint point can be selected, and the horizon selected by virtue of selecting the at least one constraint point—i.e., the constraint point is within the selected horizon so selecting a constraint point can select a horizon by default. The global sparse grid optimizer 130 can define the at least one constraint point based on a previously mapped horizon, where the at least one constraint point can be a constraint plane or upper and lower bound for depths of the sparse global grid. The global sparse grid optimizer 130 can define a constraint point based on operator input or manual identification. In some embodiments, the global sparse grid optimizer 130 can define a depth or set of depths for the sparse global grid based on the selected at least one constraint point.

At block 314, a weighting factor is determined for the selected horizon on the sparse global grid. For example, with reference to FIGS. 1A-1B, the global sparse grid optimizer 130 can determine the weighting factor for the selected horizon on the sparse global grid. The global sparse grid optimizer 130 can determine a weighting factor or a combined weighting factor based on one or more of individual weighting factors—i.e., spatial weighting factors, discontinuity weighting factor, a seismic attribute weighting factor (such as a coherence weighting factor, a phase weighting factor, etc.), signal to noise weighting factor, etc. The global sparse grid optimizer 130 can determine weighting factors for the sparse global grid based on additional information or information not contained within the seismic data or the seismic volume, such as manually identified faults or folds. The global sparse grid optimizer 130 can determine the weighting factors based on the depths of the points of the sparse global grid, and can then update or recalculate the weighting factors if the depths of the points of the sparse global grid are changed or updated.

A spatial weighting factor can be introduced to increase the influence of values of the objective function for grid points proximate to a constraint point versus values of the objective function for grid points distant from the one or more constraint point. The spatial weighting term can be calculated for each grid point using Equation 2, below:

$$W_{i,j} = \max\begin{cases} 0.5 \\ \exp\left[-\frac{d(S, P_{i,j})}{2\beta^2}\right] \end{cases} \tag{2}$$

where $W_{i,j}$ is the spatial weighting term, 0.5 is the minimum spatial weighting term, $d(S,W_{i,j})$ is the Euclidean distance between the nearest constraint point (or seed point S) and a grid point P at (i,j), and β is distance weighting factor for a distance distribution, which can be a Gaussian or normal distribution, which adjusts the size of the weighting factor for a given distance between a point and the nearest constraint point.

Additional weighting factors can be determined based on other additional seismic attributes, such as phase, coherence, etc. A fault weighting factor can be generated in a similar manner to the spatial weighting factor of Eq. 2, where sparse grid points near a fault line or other discontinuity (such as within a threshold distance) can be down weighted in the optimization.

At block 316, a sparse offset is determined based on the sparse global grid and the seismic dip. For example, with reference to FIGS. 1A-1B, the global sparse grid optimizer 130 can determine the sparse offset based on the sparse offset volume, which has values based on the sparse global grid and the seismic dip. For example, the global sparse grid optimizer 130 can look up values from the sparse offset volume for the depths of the points of the sparse global grid. The sparse offset volume describes the structure of the seismic data (e.g., the seismic dip) between two adjacent points (or traces) on the sparse global grid. The sparse offset volume is a determined by the seismic dip between each of the points (e.g., the traces of the seismic volume or the grid points of the local grid) on the sparse global grid and is therefore an estimate of the amount of change in depth between the points of the sparse global grid. Alternatively, the global sparse grid optimizer 130 can determine the sparse offset values for each of the points of the sparse global grid based on their depths. The global sparse grid optimizer 130 calculate the sparse offset based on the seismic dip determined by the seismic data pre-processor 110.

The relationship between depth of the horizon at adjacent grid points (which may be sparse grid points or local grid points) is given by Equation 3, below:

$$x_i + d_i = x_{i+1} \tag{3}$$

where $x_i$ represents the depth of the horizon at point i, $x_{i+1}$ represents the depth of the horizon at point i+1, and $d_i$ represents the vertical offset between points i and i+1. The depth $x_i$ can be determined based on manual interpretation of the horizon, but such a method can be financially costly and resource intensive. The depth $x_i$ can be estimated based on seismic dip of the horizon for the local grid, and based on the sparse offset volume for the sparse global grid.

The difference between the depth at the point $x_i$ and at the point $x_{i+1}$ can be estimated using the seismic dip evaluated over the distance between the point $x_i$ and the point $x_{i+1}$. A dip offset volume can be measured where the dip offset is the difference between the depth estimate for the point $x_{i+1}$ and the depth of the point $x_{i+1}$ over the distance between the point $x_i$ and the point $x_{i+1}$. The sparse offset volume is the dip offset volume evaluated for the sparse global grid points. By adjusting the locations of various points $x_i$ of the global grid to minimize the sparse offset volume—i.e., by adjusting the locations of the points $x_i$ to lie at the depth of the horizon—a horizon can be located or optimized for.

At block 318, an objective function value(s) is determined based on the constraint point(s), the weighting factor, and the offset volume. For example, with reference to FIGS. 1A-1B, the global sparse grid optimizer 130 can determine the objective function value(s) based on the constraint point(s), the weighting factor, and the offset volume. The global sparse grid optimizer 130 can determine the objective function based on any appropriate method, such as the one described below.

The horizon optimization is then given by a minimization of the total offset as given by the objective function of Equation 4, below:

$$f = \frac{1}{N}\sum_{i=0}^{N_i-1}\sum_{j=0}^{N_j-1} W_{i,j}\left[(X_{i,j} + DI_{i,j} - X_{i,j+1})^2 + (X_{i,j} + DJ_{i,j} - X_{i+1,j})^2\right] \tag{4}$$

where $f$ is the objective function to be minimized, N is the total number of points over which the minimization is to be determined, $N_i$ and $N_j$ are the number of points in each of the horizontal directions, $X_{i,j}$ is the horizon depth at grid point (i,j), $DI_{i,j}$ and $DJ_{i,j}$ are the vertical offset estimated from calculated dip in each of the horizontal directions, and $W_{i,j}$ is the combined weighting term for each point on the grid.

The optimization problem can then be solved for a horizon using a generalized linear matrix equation such as Equation 5, below:

$$WAx = WB \tag{5}$$

where A is the coefficient matrix of size (2N+M, N) where N is the number of points on the grid and M is the number of constraint points and xis the (N,1) matrix containing depths $X_{i,j}$ of horizon at the N points on the grid. B is the (2N+M,1) matrix containing the dependent variables (i.e., the reflection dip value of the current iteration) and W is the diagonal weighting matrix of size (2N+M, 2N+M) which contains the combined weighting terms—i.e., fault weighting, spatial weighting, other seismic attribute weighting, etc.

The objective function of Equation 4 can then be written as Equation 6, below:

$$f = \|WB - WAx\|^2 \tag{6}$$

using the matrices of Equation 5.

To solve for a single solution, at least one constraint point is required. The total number of constraint points is given by the number M, where additional constraint points can refine the solution but also increase the complexity of computation—as seen in the sizes of the matrices defined in relationship to Equation 5. For each constraint point, the horizon is identified at a grid point with location (i,j) and constrained to that depth as given by Equation 7, below:

$$X_{i,j} = \text{Depth}_{i,j} \tag{7}$$

This relationship forces or pins the horizon solution to intersect with the constraint points at the constrained depth.

At block 320, optionally, the objective function value(s) is determined based on an additional seismic attribute. For example, with reference to FIGS. 1A-1B, the global sparse grid optimizer 130 can determine the objective function value(s) based on the additional seismic attribute. The global sparse grid optimizer 130 can include an additional seismic attribute, such as the one or more additional seismic attributes determined by the seismic data pre-processor 110 at block 206 of FIG. 2. In some embodiments, the global sparse grid optimizer 130 can determine an additional seismic attribute in any other appropriate manner. The global sparse grid optimizer 130 can adjust the objective function value(s) based on the additional seismic attribute in any appropriate manner, such as those described below.

Equations 4 and 6 describe using dip to minimize the objective function $f$, such as via a least mean square method. Additional seismic attributes (e.g., seismic attributes in addition to dip) can be included in the objective function h in order to improve horizon optimization. The seismic attribute y can be described as a function of location i, j, $X_{i,j}$ where (i,j) is the coordinate of the location along the horizontal axes and $X_{i,j}$ is the depth in the vertical direction. The value of the seismic attribute is then given by Equation 8, below, as:

$$y = h(i, j, X_{i,j}) \tag{8}$$

where y can be a seismic attribute such as coherence, relative coherence, phase, relative phase, intensity, relative intensity, etc. The seismic attribute can vary based on all three dimensions of the seismic volume (i.e., i, j and $X_{i,j}$) or can vary based only on one or two dimensions of the seismic volume.

The value of the seismic attribute can be expressed as a matrix (such as that shown in Equation 9 below), a vector (such as that shown in Equation 10 below) or any other appropriate expression or in any other appropriate dimension.

$$y = h(i, j, X_{i,j}) = \begin{bmatrix} h(1, 1, X_{1,1}) & h(1, 2, X_{1,2}) & \cdots & h(1, j, X_{1,j}) \\ h(2, 1, X_{2,1}) & h(2, 2, X_{2,2}) & & \vdots \\ \vdots & & \ddots & h(i-1, j, X_{i-1,j}) \\ h(i, 1, X_{i,1}) & \cdots & h(i, j-1, X_{i,j-1}) & h(i, j, X_{i,j}) \end{bmatrix} \quad (9)$$

$$y = h(x) \quad (10)$$

where $h(i,j,X_{i,j})$ is the value of the seismic attribute evaluated at the depth d of the grid point $X_{ij}$. h(x) is then a generalized function to sample seismic attributes at the grid points on the seismic horizon in vector form.

The objective function of Eq. 6 can then be modified to minimize the objective function while simultaneously optimizing for one or more additional seismic attribute. This gives rise to Equation 11, below:

$$f = \|WB - WAx\|^2 + w\|C - D\ h(x)\|^2 \quad (11)$$

where D is a matrix of size (L, N), C is a vector of matrix size (L, 1), L is the number of attribute values which are considered, and w is a weighting factor that defines the relative weight of the attribute y compared to the seismic dip. L can equal the number of points in the grid (e.g., N) or can be greater or fewer. For example, L can have a value for each point in the grid, or values for every two points in the grid, or two or more values for each point in the grid (such as for each point relative to a nearest neighbor). In this example, h(x) is a vector matrix of size (N, 1). It should be understood that matrices of different sizes (e.g., D, C, and h(x) be applicable based on the selection of the attribute and the attribute form (i.e., vector, matrix, etc.).

The values and forms of C, D, and h(x) can be selected in order to optimize for both a minimization of the sparse offset volume and constrain the additional seismic attribute. For example, in order to optimize for a horizon having a constant phase φ of π/2, which corresponds to a peak in the seismic data, the seismic attribute can be defined by Equation 12, below:

$$h(x) = (\varphi_1, \varphi_2, \ldots, \varphi_{N-1}, \varphi_N)^T \quad (12)$$

where $\varphi_i$ is the phase at the grid point i. To select for a constant phase φ of π/2, the vector C can be defined by Equation 13, below:

$$C = \left(\frac{\pi}{2}, \frac{\pi}{2}, \ldots, \frac{\pi}{2}, \frac{\pi}{2}\right)^T \quad (13)$$

where the value of phase for which the objective function is minimized is the peak phase φ of π/2. Further, D can be an identify matrix as given by Equation 14:

$$D = \text{diags}(1, 1, \ldots, 1, 1) \quad (14)$$

where each of the diagonal values are unity.

Because the attribute y may have a non-linear relationship to the depth of the grid points $X_{i,j}$, optimization can be solved for iteratively based on an initial solution and the attribute $y=h(i,j, X_{i,j})$ evaluated for the seismic volume or at the grid points.

The gradient of the objective function ƒ as described in Eq. 11 is given by Equation 15 below:

$$grad = 2\left(A^T W^T WB - A^T W^T WAx + wD^T C\frac{\partial}{\partial x}h(x) - wD^T Dh(x)\frac{\partial}{\partial x}h(x)\right) \quad (15)$$

where $$\frac{\partial}{\partial x}h(x)$$

is the derivative of the seismic attribute $y=h(i,j, X_{i,j})$ or elements of the seismic attribute vector or matrix y=h(x) with respect to the depth at the grid point $X_{i,j}$.

Equations 11 and 15 can then be combined to generate a best fit solution, where minimization of the objective function can be performed using any appropriate iterative solver such as the conjugate gradient method, the limited memory Broyden-Fletcher-Goldfarb-Shanno algorithm (L-BFGS), etc.

Additionally, extension of the principles of Eq. 8 and 11 give a general equation for consideration of multiple attributes and multiple conditions. This can be given by any appropriate formula, such as that of Equation 16, below:

$$f = \|WB - WAx\|^2 + \sum_{k=1}^{k=K} w_k\|C_k - D_k h_k(x)\|^2 \quad (16)$$

where K is the number of conditions, $w_k$ is the weighting factor that defines the relative weight of the attribute y compared to the seismic dip for the condition k, $C_k$, $D_k$, and $h_k$ are the matrices for the condition k.

At block 322, it is determined if the objective function optimization criteria is reached. For example, with reference to FIGS. 1A-1B, the global sparse grid optimizer 130 can determine if the objective function optimization criteria is reached. The global sparse grid optimizer 130 can determine that the objective function optimization criteria is reached based on a threshold value for the objective function or for elements of the objective function corresponding to the points of the sparse global grid. The global sparse grid optimizer 130 can determine that the objective function optimization criteria is reached based on an additional seismic attribute, such as coherence or phase, or based on a threshold based on an additional seismic attribute. The global sparse grid optimizer 130 can optionally set no threshold for the objective function optimization iteration and only determine if the objective function optimization iteration criteria is reached at block 326. If the global sparse grid optimizer 130 determines that the optimization criteria is reached, flow continues to block 328 where it is determined if the optimized horizon is acceptable. If the global sparse grid optimizer 130 determines that the optimization criteria is not reached, flow continues to block 324.

At block 324, the depth of the sparse global grid is adjusted based on the objective function to minimize the objective function value(s). For example, with reference to FIGS. 1A-1B, the global sparse grid optimizer 130 can adjust the depth of the sparse global grid based on the objective function to minimize the objective function value (s). The global sparse grid optimizer 130 can minimize the objective function in any appropriate manner, such as those described below. The global sparse grid optimizer 130 can minimize the objective function by adjusting the depth of each of the grid points of the global sparse grid. The global sparse grid optimizer 130 can then recalculate the value of the objective function at the new depths of the points of the global sparse grid. As the depth of each of the points is related by the seismic offset volume, the objective function operated to align the depth of each of the points with the selected horizon. The global sparse grid optimizer 130 can adjust the depth of the sparse global grid using any appropriate method. The global sparse grid optimizer 130 can minimize the objective function using any appropriate method.

The objective function can be minimized using the least squares solution based on the matrix containing the linear system of equations for the solution (as shown in Equation 6). The objective function need not be visualized or optimized as a matrix, but as it is a system of linear equations matrix manipulation may be used in minimizing or solving. Any appropriate solution to the linear system of equations can be used, such as a least squared solution, and any iterative appropriate iterative solution can be used, such as L-BFGS.

At block 326, it is determined if the optimization iteration criteria is reached. For example, with reference to FIGS. 1A-1B, the global sparse grid optimizer 130 can determine if the optimization iteration criteria is reached. The global sparse grid optimizer 130 can determine that the optimization iteration criteria is reached based a number of iterations performed and/or a time of computation. The global sparse grid optimizer 130 can also determine that the optimization iteration criteria is not reached based on a threshold value of the objective function (as described in reference to block 322) in combination with a number of iterations performed and/or a time of computation. The global sparse grid optimizer 130 can determine additional iterations could improve optimization of the objective function. The global sparse grid optimizer 130 can optionally set no threshold for the optimization iteration and only determine if the objective function optimization criteria is reached at block 322. If the global sparse grid optimizer 130 determines that the optimization iteration criteria is reached, flow continues to block 328. If the global sparse grid optimizer 130 determines that the optimization criteria is not reached, flow continues to block 314, where an additional iteration of the minimization of the objective function is performed beginning with a determination of the weighting factor for the points of the sparse global grid at the adjusted depths.

At block 328, it is determined if the optimized horizon is acceptable. For example, with reference to FIGS. 1A-1B, the global sparse grid optimizer 130 can determine if the optimized horizon is acceptable. The global sparse grid optimizer 130 can determine if the optimized horizon is acceptable based on one or more constraint points or constraint boundaries. The global sparse grid optimizer 130 can determine if the optimized horizon is acceptable based on agreement with other mapped horizons. The global sparse grid optimizer 130 can determine if the optimized horizon is acceptable based on operator or interpreter input—such as by outputting the optimized horizon to a user or operator and generating a trigger to determine if the operator or user would like to add another constraint point or asking if the user finds the optimized horizon to be acceptable. In some cases, a user can have additional knowledge or access to additional data which can influence the acceptable shapes of a horizon. The global sparse grid optimizer 130 can determine if the optimized horizon is acceptable based on behavior across a discontinuity or fault. The global sparse grid optimizer 130 can determine if the horizon is acceptable based on two or more of the methods previously described in combination. The global sparse grid optimizer 130 can determine if the optimized horizon is acceptable in either a qualitative or quantitative manner. If the global sparse grid optimizer 130 determines that the optimized horizon is acceptable, flow continues to block 330. If the global sparse grid optimizer 130 determines that the optimized horizon is not acceptable, flow continues to block 334, where at least one additional constraint point is added.

At block 330, the sparse global grid for the selected horizon is output. For example, with reference to FIGS. 1A-1B, the global sparse grid optimizer 130 can output the sparse global grid for the selected horizon. The global sparse grid optimizer 130 can output the sparse global grid to the local grid optimizer 140 of FIGS. 1A-1B. The global sparse grid optimizer 130 can output the sparse global grid to an operator or user. The global sparse grid optimizer 130 can output the sparse global grid to a set of seismic data or otherwise attach the sparse global grid to a set of seismic data.

At block 334, an additional constraint point can be added. For example, with reference to FIGS. 1A-1B, the global sparse grid optimizer 130 can add an additional constraint point. The global sparse grid optimizer 130 can add a constraint point using any appropriate method, such as those described in reference to block 312. Additionally, the global sparse grid optimizer 130 can request a constraint point from an operator or manual interpreter. In some embodiments, the global sparse grid optimizer 130 can generate an additional constraint point which is separated from any original constraint points by a fault. That is, the global sparse grid optimizer 130 can add a constraint point for a portion of the horizon separated from the original constraint point by a fault in order to identify discontinuous portions of the horizon with the sparse global grid.

FIG. 4 depicts a flowchart of example operations for optimization of a horizon over edges of local grids, according to some embodiments. A flowchart 400 of FIG. 4 includes operations described as performed by the local grid optimizer 140 for consistency with the earlier description. Such operations can be performed by a controller or processor, hardware, firmware, software, or a combination thereof of one or more computers, including asynchronously. However, apparatus component naming, division, organization, and program code naming, organization, and deployment can vary due to arbitrary operating choice, ordering, programmer choice, programming language(s), platform, etc. Additional, operations of the flowchart 400 are described in reference to the seismic data pre-processor 110 and the sparse global grid optimizer 130 of FIGS. 1A-1B.

The flowchart includes the operations described as performed by the local grid optimizer 140, but one or more of the operations may instead or additionally be performed by the seismic data pre-processor 110 or the global sparse grid optimizer 130. The flowchart includes the operations depicted as performed by a local grid edge optimizer 450. It should be understood that the local grid edge optimizer 450 can be a component of the local grid optimizer 140 or can be in communication with the local grid optimizer 140.

At block 410, the sparse global grid for the selected horizon is obtained. For example, with reference to FIGS. 1A-1B, the local grid optimizer 140 can obtain the sparse global grid from the global sparse grid optimizer 130 or an output of the global sparse grid optimizer 130. The local grid optimizer 140 can access the sparse global grid from data storage. The local grid optimizer 140 can also be in communication with the global sparse grid optimizer 130 or a component of the global sparse grid optimizer 130 can operate on the data of the global sparse grid optimizer 130.

At block 412, the sparse global grid points are set as constraint points for the local grids. For example, with reference to FIGS. 1A-1B, the local grid optimizer 140 can set the sparse global grid points as constraint points for the local grids. The local grid optimizer 140 can set the points of the sparse global grid as constraint points using any appropriate method, such as those described in reference to block 312 of FIG. 3.

At block 413, local grid edges are generated for the selected horizon. For example, with reference to FIGS. 1A-1B, the local grid optimizer 140 can generate local grid edges for the selected horizon. The local grid optimizer 140 can generate local grid edges and constituent points for the local grid edges based on locations of the points of the sparse global grid. The local grid optimizer 140 can generate the local grid edges and points of the local grid edges between each of the adjacent points of the sparse global grid. The local grid optimizer 140 can generate local grid edges along vectors or surfaces connecting each of the points of the sparse global grid. The local grid optimizer 140 can space the points of the local grid edges equally between the adjacent points of the sparse global grid, where the points can be spaced equally in distance between two of the adjacent points of the sparse global grid, equally in depth, or equally in one of the horizontal directions. The local grid optimizer 140 can generate a number of edge points based on the relative intensity of the change in depth between the points of the sparse global grid—i.e., the local grid optimizer 140 can generate more or less points along the local grid edges based on the magnitude of the change in depth between the points of the sparse global grid. For example, the local grid optimizer 140 can generate fewer points along a local grid edge which formed between two points of the sparse global grid which fall on separate sides of a fault. That is, the number of points for the local grid edge (and by extension the local grid) can be weighted based on seismic data. The local grid optimizer 140 can also generate points of the local grid edge at the granularity of the data. That is, the local grid optimizer 140 can generate a point for each trace in each of the horizontal directions, for each voxel, or otherwise at the smallest measurement unit available for the seismic data. The points for the local grid edge can also optionally or alternatively be generated by the global sparse grid optimizer 130, such as at block 310 of FIG. 3.

At block 414, the weighting factor is determined for the selected horizon on the local grid edges. For example, with reference to FIGS. 1A-1B, the local grid optimizer 140 can determine the weighting factor for the selected horizon on the local grid edges. The local grid optimizer 140 can determine the weighing factor for the points on the local grid edges using any appropriate method, such as those detailed in reference to block 314 of FIG. 3. The local grid optimizer 140 can determine the weighting factors based on the depths of the points of the local grid edges, and can update or recalculate the weighting factors if the depths of the points on the local grid edges are changed or updated. The local grid optimizer 140 can also apply the weighting factor, a component of the weighting factor, or an average or composition of the weighting factor of the points of the sparse global grid to the points of the local grid edges between those points of the sparse global grid instead of calculating or re-calculating the weighting factor.

At block 416, offset for the local grid edge points is determined based on the seismic dip. For example, with reference to FIGS. 1A-1B, the local grid optimizer 140 can determine the offset based on the seismic dip for the local grid edges. The local grid optimizer 140 can determine the offset for each point of the local grid edges. The local grid optimizer 140 can determine the offset based on the seismic dip for each voxel of the seismic volume, such as that determined at block 204 of FIG. 2 by the seismic data pre-processor 110 of FIGS. 1A-1B. The local grid optimizer 140 can determine the offset in any appropriate manner, such as those described in reference to block 316 of FIG. 3.

At block 418, the objective function value(s) is determined based on the constraint points, the weighting factor, and the offset. For example, with reference to FIGS. 1A-1B, the local grid optimizer 140 can determine the objective function value(s) based on the constraint points, the weighting factor, and the offset. The local grid optimizer 140 can determine the objective function value(s) in any appropriate manner, such as those described in reference to block 318 of FIG. 3. The local grid optimizer 140 can also interpolate or estimate the value(s) of the objective function based on the values of the objective function at the points of the sparse global grid which bookend the local grid edges. The local grid optimizer 140 can also interpolate or estimate the value(s) of the objective function based on the values of the objective function at the points of the sparse global grid which bookend the local grid edges and on values of one or more additional seismic attributes.

At block 420, optionally, the objective function value(s) is determined based on an additional seismic attribute. For example, with reference to FIGS. 1A-1B, the local grid optimizer 140 can determine the objective function value(s) based on the additional seismic attribute. The local grid optimizer 140 can determine the objective function value(s) in any appropriate manner, such as those described in reference to block 320 of FIG. 3. The local grid optimizer 140 can also interpolate or estimate the value(s) of the objective function with the additional seismic attribute based on the values of the objective function or the values of the additional seismic attribute at the points of the sparse global grid which bookend the local grid edges.

At block 422, it is determined if the objective function optimization criteria is reached. For example, with reference to FIGS. 1A-1B, the local grid optimizer 140 can determine if the objective function optimization criteria is reached. The local grid optimizer 140 can determine if the objective function optimization criteria is reached in any appropriate manner, including those described in reference to block 322 of FIG. 3. If local grid optimizer 140 determines that the objective function optimization criteria is reached, flow continues to block 430 where the local grid edges are output for the selected horizon. If local grid optimizer 140 determines that the objective function optimization criteria is not reached, flow continues to block 424.

At block 424, the depths of the local grid edges are adjusted based on the objective function to minimize the objective function value(s). For example, with reference to FIGS. 1A-1B, the local grid optimizer 140 can adjust the depth of the local grid edges based on the objective function to minimize the objective function value(s). The local grid optimizer 140 can adjust the depth of the points of the local grid edges in any appropriate manner, such as those described in reference to block 324 of FIG. 3.

At block 426, it is determined if the optimization iteration criteria is reached. For example, with reference to FIGS. 1A-1B, the local grid optimizer 140 can determine if the optimization iteration criteria is reached. The local grid optimizer 140 can determine if the optimization iteration criteria is reached in any appropriate manner, including those described in reference to block 326 of FIG. 3. If local grid optimizer 140 determines that the optimization iteration criteria is reached, flow continues to block 430 where the local grid edges are output for the selected horizon. If local grid optimizer 140 determines that the objective function optimization criteria is not reached, flow continues to block 414, where the weighting factor is determined.

At block 430, the local grid edges for the selected horizon are output. For example, with reference to FIGS. 1A-1B, the local grid optimizer 140 can output the local grid edges for the selected horizon. The local grid optimizer 140 can output the local grid edges to a local grid interior optimizer 550 of FIG. 5. The local grid optimizer 140 can also continue operations on the local grid edges, such as via the operations which will be described in reference to FIG. 5. The local grid optimizer 140 can output the local grid edges to an operator or user. The local grid optimizer 140 can output the local grid edges to a set of seismic data or otherwise attach the local grid edges to a set of seismic data.

Figure 5:
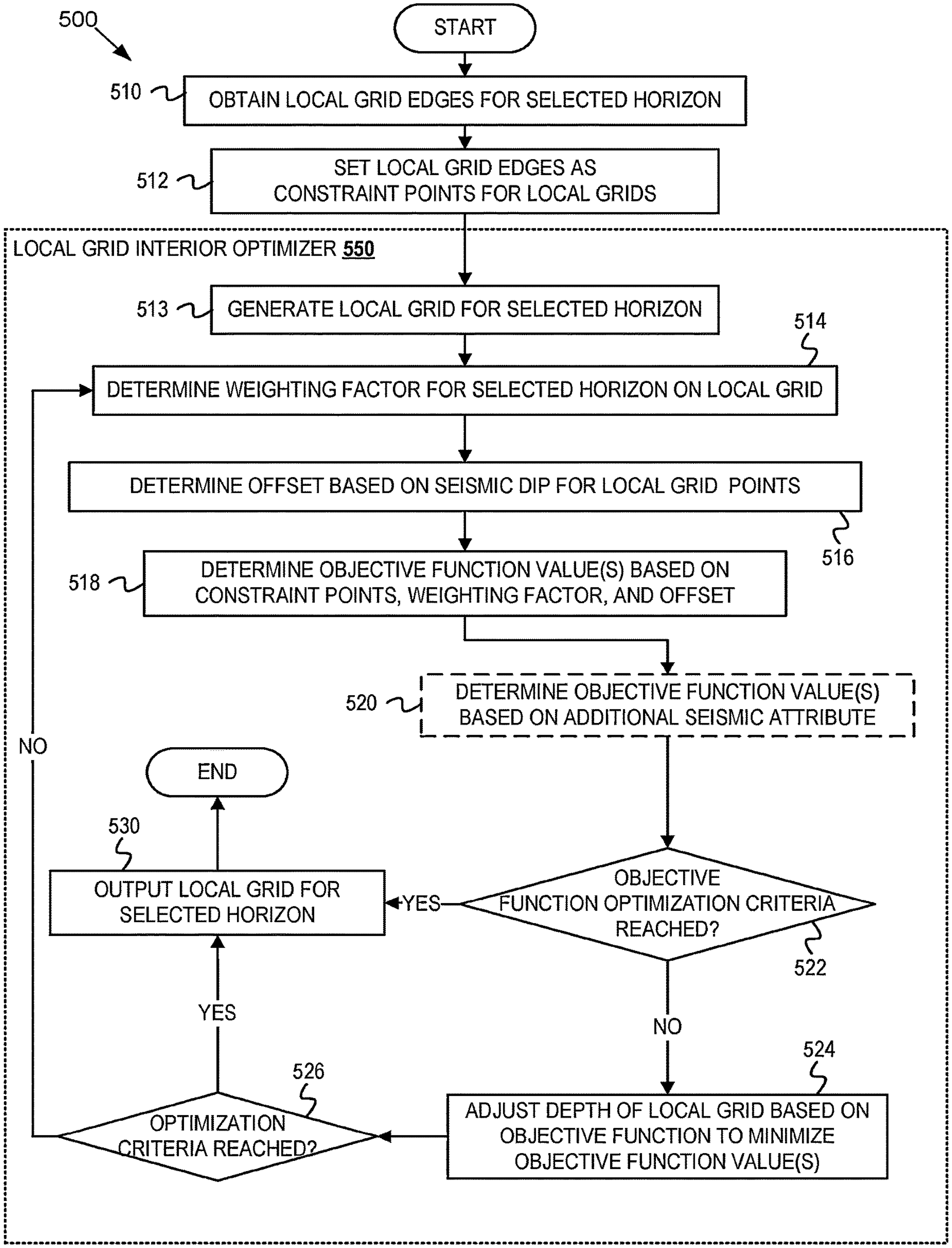
FIG. 5 depicts a flowchart of example operations for optimization of a horizon on a local grid, according to some embodiments.

FIG. 5 depicts a flowchart of example operations for optimization of a horizon on a local grid, according to some embodiments. A flowchart 500 of FIG. 5 includes operations described as performed by the local grid optimizer 140 for consistency with the earlier description. Such operations can be performed by a controller or processor, hardware, firmware, software, or a combination thereof of one or more computers, including asynchronously. However, apparatus component naming, division, organization, and program code naming, organization, and deployment can vary due to arbitrary operating choice, ordering, programmer choice, programming language(s), platform, etc. Additional, operations of the flowchart 500 are described in reference to the seismic data pre-processor 110 and the sparse global grid optimizer 130 of FIGS. 1A-1B. The flowchart includes the operations described as performed by the local grid optimizer 140, but one or more of the operations may instead or additionally be performed by the seismic data pre-processor 110 or the global sparse grid optimizer 130. The flowchart includes the operations depicted as performed by the local grid interior optimizer 550. It should be understood that the local grid interior optimizer 550 can be a component of the local grid optimizer 140 or can be in communication with the local grid optimizer 140.

The local grid optimizer 140 can operate on one local grid at a time, on more than one local grid at a time, on the local grids in parallel, or on the local grids in sequence. In some embodiments, more than one local grid optimizer 140 can operate, such as via distributed computing, in order to reduce computational burned on each local grid optimizers. It should be understood that the operations described for the local grid optimizer 140 can be performed instead by multiple local grid optimizers.

At block 510, the local grid edges for the selected horizon are obtained. For example, with reference to FIGS. 1A-1B, the local grid optimizer 140 can obtain the local grid edges from the global sparse grid optimizer 130 or an output of the global sparse grid optimizer 130. The local grid optimizer 140 can also obtain the local grid edges from storage or from the local grid edge optimizer 450. The local grid optimizer 140 can also be in communication with the local grid edge optimizer 450 or a component of the local grid edge optimizer 450. The local grid optimizer can also obtain the local grid edges from the output of block 430 of FIG. 4 or operate on the output of block 430.

At block 512, the local grid edges are set as constraint points for the local grids. For example, with reference to FIGS. 1A-1B, the local grid optimizer 140 can set the local grid edges as constraint points for the local grids. The local grid optimizer 140 can set the points of the sparse global grid and the local grid edges as constraint points using any appropriate method, such as those described in reference to block 312 of FIG. 3.

At block 513, a local grid is generated for the selected horizon. For example, with reference to FIGS. 1A-1B, the local grid optimizer 140 can generate the local grid for the selected horizon. The local grid optimizer 140 can generate the local and constituent points for the local grid based on locations of the points of the sparse global grid and the points of the local grid edges. The local grid optimizer 140 can generate the local grid and points of the local grid between as infill rows and columns based on the adjacent points of the spares global grid and the local grid edges. The local grid optimizer 140 can generate the points of the local grid along vectors or surfaces connecting each of the points of the local grid edges. The local grid optimizer 140 can space the points of the local grid equally between the adjacent points of the local grid edges, where the points can be spaced equally in distance between two of the adjacent points, equally in depth, or equally in one of the horizontal directions. The local grid optimizer 140 can generate a number of points based on the relative intensity of the change in depth between the points of the sparse global grid or the local grid edges—i.e., the local grid optimizer 140 can generate more or less points along the local grid based on the magnitude of the change in depth between the points of the sparse global grid and the local grid edges. For example, the local grid optimizer 140 can generate fewer points in the local grid formed over separate sides of a fault. That is, the number of points for the local grid can be weighted based on seismic data. The local grid optimizer 140 can also generate points of the local grid at the granularity of the data. That is, the local grid optimizer 140 can generate a point for each trace in each of the horizontal directions, for each voxel, or otherwise at the smallest measurement unit available for the seismic data. The points for the local grid can also optionally or alternatively be generated by the global sparse grid optimizer 130, such as at block 310 of FIG. 3.

At block 514, the weighting factor is determined for the selected horizon on the local grid. For example, with reference to FIGS. 1A-1B, the local grid optimizer 140 can determine the weighting factor for the selected horizon on the local grid. The local grid optimizer 140 can determine the weighing factor for the points on the local grid using any appropriate method, such as those detailed in reference to block 314 of FIG. 3. The local grid optimizer 140 can determine the weighting factors based on the depth of the points of the local grid, and can update or recalculate the weighting factors if the depth of the points of the local grid are changed or updated. The local grid optimizer 140 can also apply the weighting factor, a component of the weighting factor, or an average or composition of the weighting factor of the points of the sparse global grid or the points of the local grid edges to the points of the local grid between those points instead of calculating or re-calculating the weighting factor.

At block 516, offset for the local grid points is determined based on the seismic dip. For example, with reference to FIGS. 1A-1B, the local grid optimizer 140 can determine the offset based on the seismic dip for the local grid points. The local grid optimizer 140 can determine the offset for each point of the local grid. The local grid optimizer 140 can determine the offset based on the seismic dip for each voxel of the seismic volume, such as that determined at block 204 of FIG. 2 by the seismic data pre-processor 110 of FIGS. 1A-1B. The local grid optimizer 140 can determine the offset in any appropriate manner, such as those described in reference to block 316 of FIG. 3.

At block 518, the objective function value(s) is determined based on the constraint points, the weighting factor, and the offset. For example, with reference to FIGS. 1A-1B, the local grid optimizer 140 can determine the objective function value(s) based on the constraint points, the weighting factor, and the offset. The local grid optimizer 140 can determine the objective function value(s) in any appropriate manner, such as those described in reference to block 318 of FIG. 3. The local grid optimizer 140 can also interpolate or estimate the value(s) of the objective function based on the values of the objective function at the points of the sparse global grid or the local grid edges which bookend the local grid. The local grid optimizer 140 can also interpolate or estimate the value(s) of the objective function based on the values of the objective function at the points which bookend the local grid and on values of one or more additional seismic attributes.

At block 520, optionally, the objective function value(s) is determined based on an additional seismic attribute. For example, with reference to FIGS. 1A-1B, the local grid optimizer 140 can determine the objective function value(s) based on the additional seismic attribute. The local grid optimizer 140 can determine the objective function value(s) in any appropriate manner, such as those described in reference to block 320 of FIG. 3. The local grid optimizer 140 can also interpolate or estimate the value(s) of the objective function with the additional seismic attribute based on the values of the objective function or the values of the additional seismic attribute at the points of the sparse global grid or the local grid edges which bookend the local grid.

At block 522, it is determined if the objective function optimization criteria is reached. For example, with reference to FIGS. 1A-1B, the local grid optimizer 140 can determine if the objective function optimization criteria is reached. The local grid optimizer 140 can determine if the objective function optimization criteria is reached in any appropriate manner, including those described in reference to block 322 of FIG. 3. If local grid optimizer 140 determines that the objective function optimization criteria is reached, flow continues to block 530 where the local grid is output for the selected horizon. If local grid optimizer 140 determines that the objective function optimization criteria is not reached, flow continues to block 524.

At block 524, the depths of the local grid are adjusted based on the objective function to minimize the objective function value(s). For example, with reference to FIGS. 1A-1B, the local grid optimizer 140 can adjust the depth of the local grid based on the objective function to minimize the objective function value(s). The local grid optimizer 140 can adjust the depth of the points of the local grid in any appropriate manner, such as those described in reference to block 324 of FIG. 3.

At block 526, it is determined if the optimization iteration criteria is reached. For example, with reference to FIGS. 1A-1B, the local grid optimizer 140 can determine if the optimization iteration criteria is reached. The local grid optimizer 140 can determine if the optimization iteration criteria is reached in any appropriate manner, including those described in reference to block 326 of FIG. 3. If local grid optimizer 140 determines that the optimization iteration criteria is reached, flow continues to block 530 where the local grid is output for the selected horizon. If local grid optimizer 140 determines that the objective function optimization criteria is not reached, flow continues to block 514, where the weighting factor is determined.

At block 530, the local grid for the selected horizon is output. For example, with reference to FIGS. 1A-1B, the local grid optimizer 140 can output the local grid for the selected horizon. The local grid optimizer 140 can output the local grid to an operator or user. The local grid optimizer 140 can output the local grid to a set of seismic data or otherwise attach the local grid edges to a set of seismic data. The local grid optimizer 140 can operate upon the multiple local grids to reconstruct a map of the selected horizon. The local grid optimizer 140 can also output the local grid to a program or processor for construction or reconstruction of a map of the selected horizon. The local grid optimizer 140 can rejoin the local grids or cause the local grids to be rejoined to generate the map of the selected horizon, where the maps can be rejoined based on the locations and identification of the points of the sparse global grid or the local grid edges which belong to multiple local grids.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 318 and 320 can be performed in parallel or concurrently. With respect to FIG. 2, an additional seismic attribute is not necessary. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

Example Graphs

Example graphs for horizon optimization (which are depicted in FIGS. 6, 7A-7B, 8A-8B, 9A-9B, 10A-10B, 11, 12A-12B, 13, 14A-14C, and 15) are now described.

Figure 6:
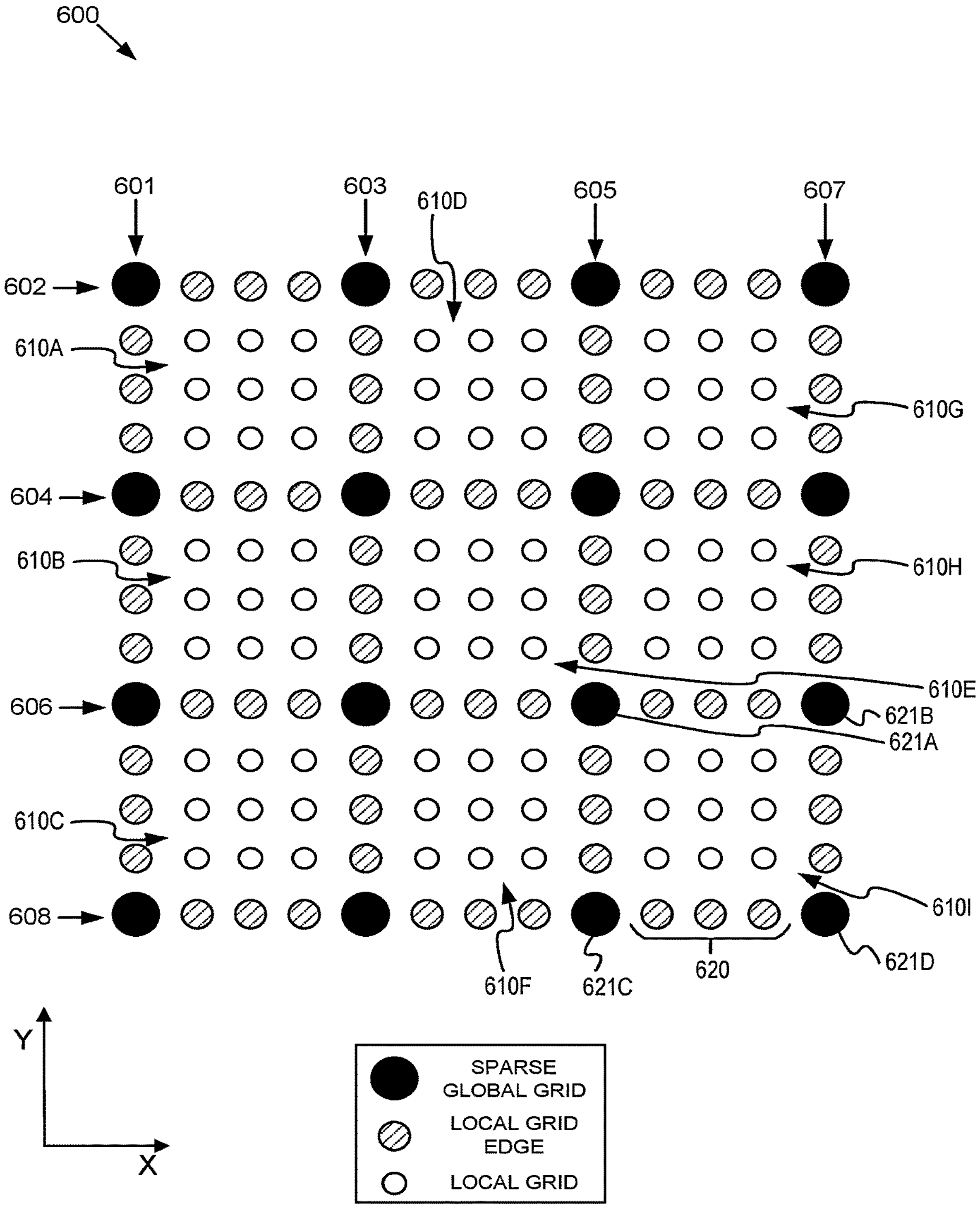
FIG. 6 depicts an example diagram of a sparse global grid and its constituent local grids for horizon optimization, according to some embodiments.

FIG. 6 depicts an example diagram of a sparse global grid and its constituent local grids for horizon optimization, according to some embodiments. FIG. 6 depicts a diagram 600 which depicts example points 621A, 621B, 621C and 621D of a sparse global grid. The diagram 600 also identified columns 601, 603, 605, and 607 and rows 602, 604, 606, and 608 of the sparse global grid. The diagram 600 depicts example points 620 of the local grid edges, where the points of the local grid edges also lie within the columns 601, 603, 605, and 607 and the rows 602, 604, 606, and 608 of the sparse global grid. The diagram 600 further identified example local grids 610A, 610B, 610C, 610D, 610E, 610F, 610G, 610H, and 610I interpolated between the columns 601, 603, 605, and 607 and the rows 602, 604, 606, and 608 of the sparse global grid.

Figure 7B:
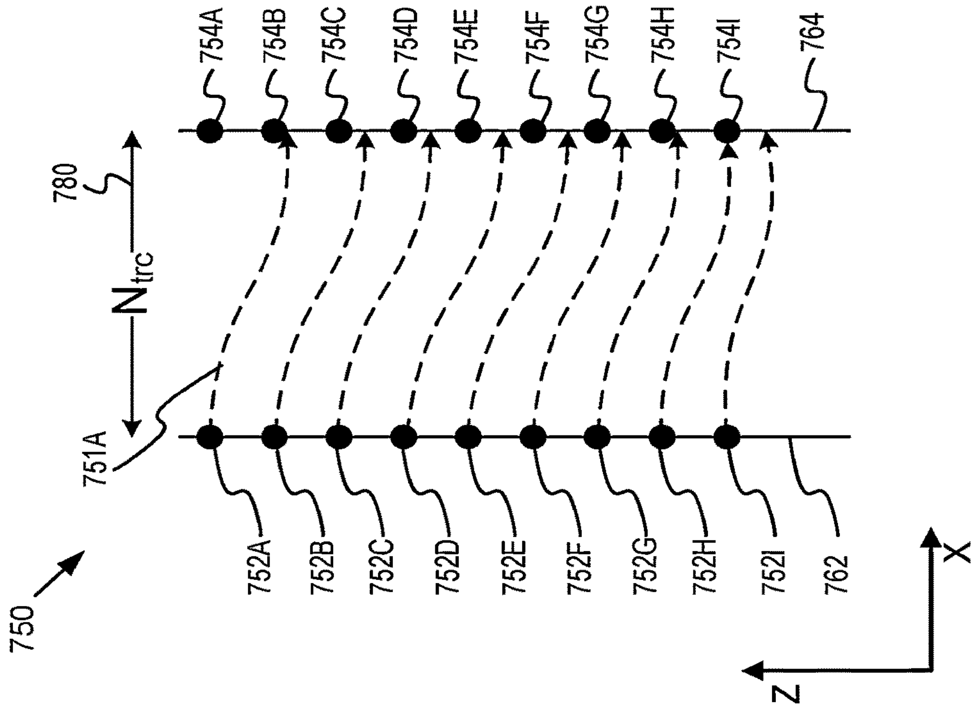
FIGS. 7A-7B depict example diagrams of sparse offset volume generation operations, according to some embodiments.
Figure 7A:
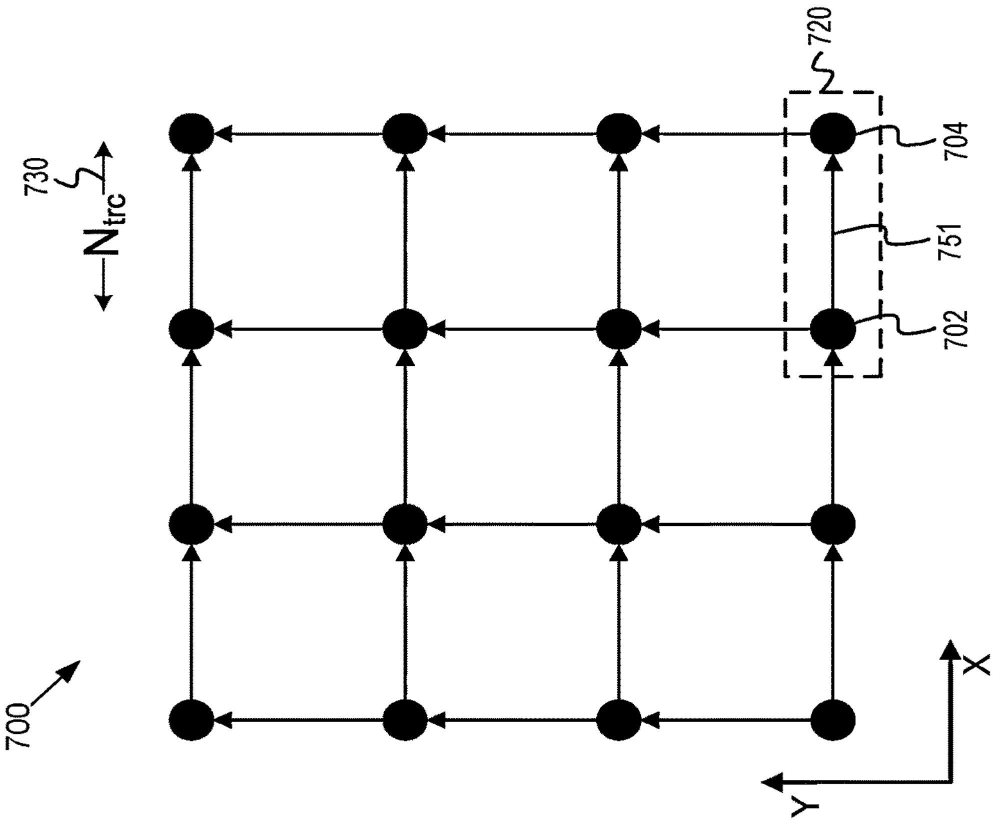

FIGS. 7A and 7B depict example diagrams of sparse offset volume generation operations, according to some embodiments. FIG. 7A depicts a diagram 700 depicting multiple grid points, including grid points 702 and 704, which can be points of the sparse global grid, of the local grid edges, or of one or more local grids. The grid points 702 and 704 are separated by a number of traces ($N_{trc}$) indicated by an arrow 730. The number of traces $N_{trc}$ can be n for the sparse global grid (where in an example embodiment n can be 5 or 6). The number of traces $N_{trc}$ can be zero or one for a local grid (depending on how separation is defined), where the traces can be adjacent traces. The distance between the grid points 702 and 704 is indicated by a tracker vector 751. The tracker vectors indicate the distance between two adjacent grid points are can be perpendicular to each of the horizontal directions of the seismic data or the seismic volume. The dotted line encompasses an area 720 including the grid points 702 and 704 and the tracker vector 751 and represents identifies a surface area under which many grid points may be stacked within the depth of the seismic volume.

FIG. 7B depicts a diagram 750 depicting a vertical slice of the seismic volume (i.e., a cross-section of the seismic volume with respect to depth) showing multiple grid points as a function of depth within the area 720 of FIG. 7A. The diagram 750 depicts grid points 752A, 752B, 752C, 752D, 752E, 752F, 752G, 752H, and 752I along a depth vector 762, which corresponds to the grid point 702 of FIG. 7A. The diagram 750 depicts grid points 754A, 754B, 754C, 754D, 754E, 754F, 754G, 754H, and 754I along a depth vector 764, which corresponds to the grid point 704 of FIG. 7A. The grid points 752A-752I of depth vector 762 are connected to the depth vector 764 by a dip vector, where an example dip vector 751A is labeled. The dip vectors represent the movement of the horizon or a number of horizons between the depth vector 762 and the depth vector 764. The grid points 752A-752I and the grid points 754A-754I are separated by a number of traces ($N_{trc}$) indicated by an arrow 780. The number of traces $N_{trc}$ can be n for the sparse global grid (where in an example embodiment n can be 5 or 6). The number of traces $N_{trc}$ can be zero or one for a local grid (depending on how separation is defined), where the traces can be adjacent traces. The seismic dip records the shift in the horizon, as determined based on an image tensor vector or other appropriate method, between a grid point of a first depth vector and a grid point of a second depth vector.

The relationship between the grid points 752A-752I of depth vector 762 and the grid points 754A-754I of the depth vector 764 can also or instead be determined using dynamic time warping (DTW). With DTW, a warping path between the depth vector 762 and the depth vector 764 can be determined. Based on values of seismic intensity (or another seismic attribute such as phase, relative phase, etc.), a pattern of behavior for the series of values of the depth vector 762 can be determined. By the same method, an additional pattern of behavior for the series of values of the depth vector 764 can be determined. A warping path can then be determined which represents the offset between each portion of the pattern of the depth vector 762 and its matching portion of the pattern of the depth vector 764. The warping path can measure an offset for between each of the grid points 752A-752I and their respective points on the depth vector 764—i.e., the grid points 754A-754I. The offset for each set of points (e.g., the grid point 752A and the grid point 754A) can vary as a function along the depth vectors 762 and 764 and can be information contained within the warping path.

DTW can be used instead of or in addition to seismic dip—such as using a warping path determined offset as an additional seismic attribute. Because DTW does not calculate intermediate values for voxels between the grid points (i.e., for voxels between depth vector 762 and the depth vector 764), DTW can improve offset calculation over faults. Correlation between traces on either side of faults can be made without calculation of seismic dip or image tensors at or along faults where such values can be poorly defined or difficult to calculate due to noise.

Figure 8B:
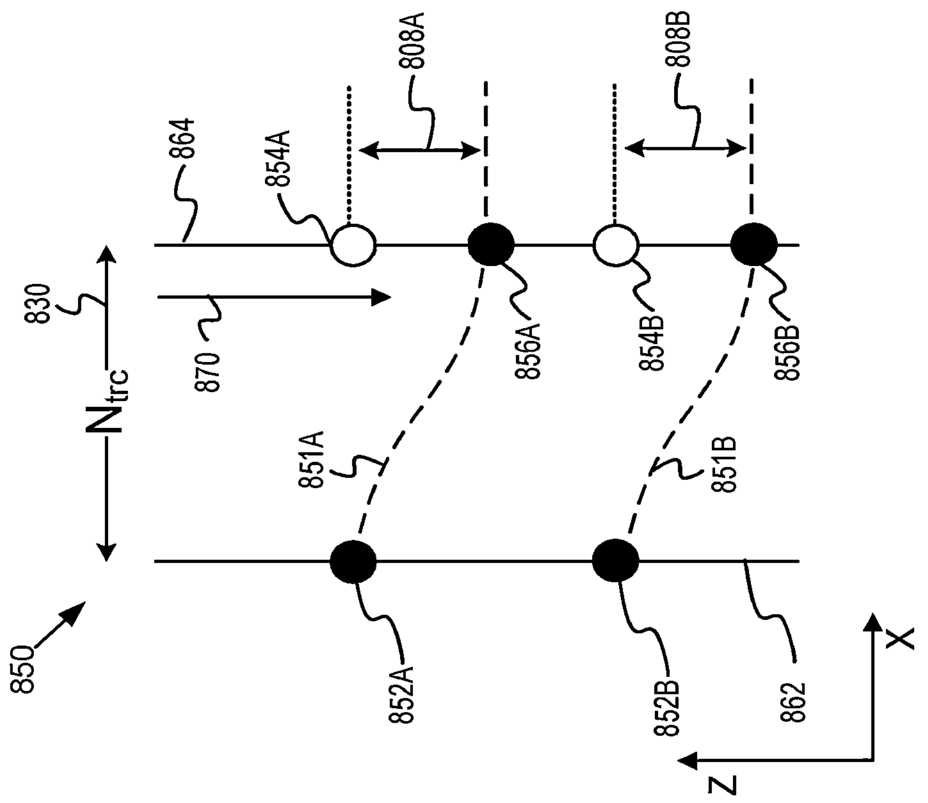
FIGS. 8A-8B depict example diagrams of dip optimization operations, according to some embodiments.
Figure 8A:
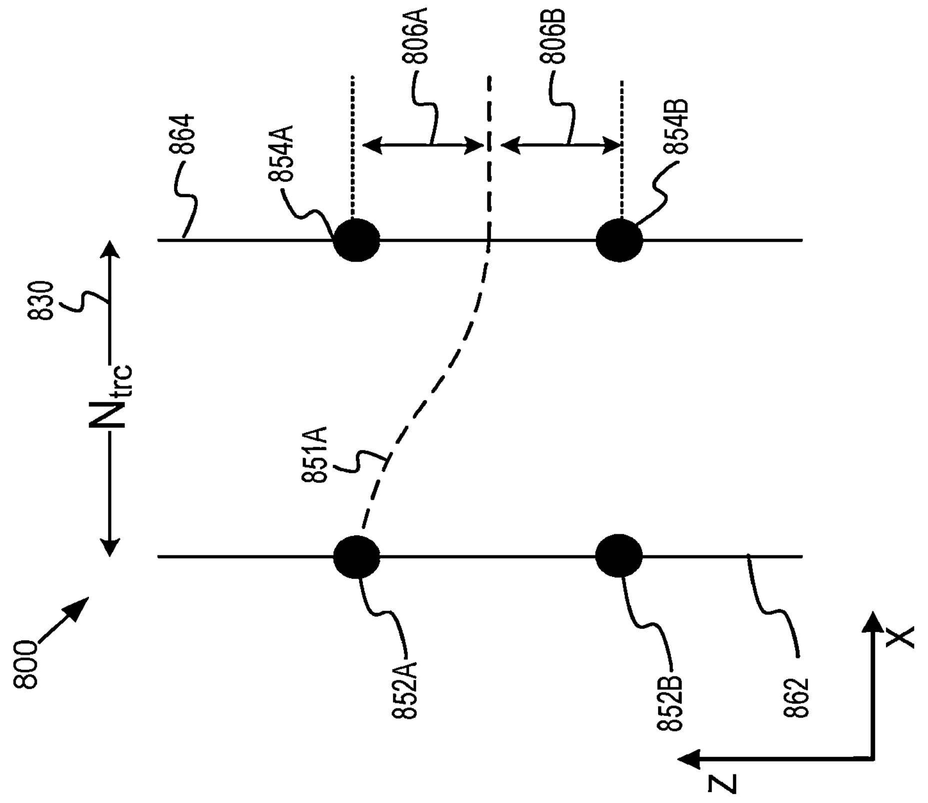

FIGS. 8A and 8B depict example diagrams of dip optimization operations, according to some embodiments. FIG. 8A depicts a diagram 800 depicting a vertical slice of the seismic volume (i.e., a cross-section of the seismic volume with respect to depth) showing multiple grid points as a function of depth within the seismic volume. The diagram 800 depicts grid points 852A and 852B along a depth vector 862, and grid points 854A and 854B along a depth vector 864. The grid points 852A and 852B and the grid points 854A and 854B are separated by a number of traces $N_{trc}$ indicated by an arrow 830. The grid point 852A is connected to the depth vector 864 by a dip vector 851A, representing a horizon. The dip vector 851A intersects the depth vector 864 at a depth $d_i$ 806A from the grid point 854A and at a depth $d_j$ 806B from the grid point 854B. The grid points 852A and 852B and the grid points 854A and 854B are separated by a number of traces $N_{trc}$ indicated by an arrow 830.

FIG. 8B depicts a diagram 850 depicting the vertical slice of the seismic volume (i.e., a cross-section of the seismic volume with respect to depth) of FIG. 8B in which depths of showing multiple grid points have been adjusted based on the seismic dip. The diagram 850 depicts the grid points 852A and 852B along the depth vector 862, and previous locations of grid points 854A and 854B along the depth vector 864. In the diagram 850, the depth vector 864 has been adjusted by a distance 808A in the direction indicated by the arrow 870. Grid points along the depth vector 864 are now indicated by grid points 856A and 856B. The grid point 852A is connected to the depth vector 864 at the grid point 856A by a dip vector 851A, representing a horizon. The grid points 852A and 852B and the grid points 856A and 856B are separated by a number of traces $N_{trc}$ indicated by an arrow 830. The grid point 852B is connected to the depth vector 864 at the grid point 856B by a dip vector 851B, which may represent a neighboring horizon. In some embodiments, adjustment of the depth of a grid point can adjust other grid points along the same horizontal location. In some embodiments, grid points for a single horizon are optimized without adjustment of other grid points. The grid point 864B is a distance 808B from the previous location of the grid point 852B. The distance 808B may or may not be the distance 808A, depending on the depth optimization operation. The distance 808A can be determined based on the seismic dip. For the sparse global grid, the distance 808A can be determined based on the sparse offset dip volume, which is a function of the seismic dip and the number of traces $N_{trc}$ of separation between the grid points of the sparse global grid.

Figure 9A:
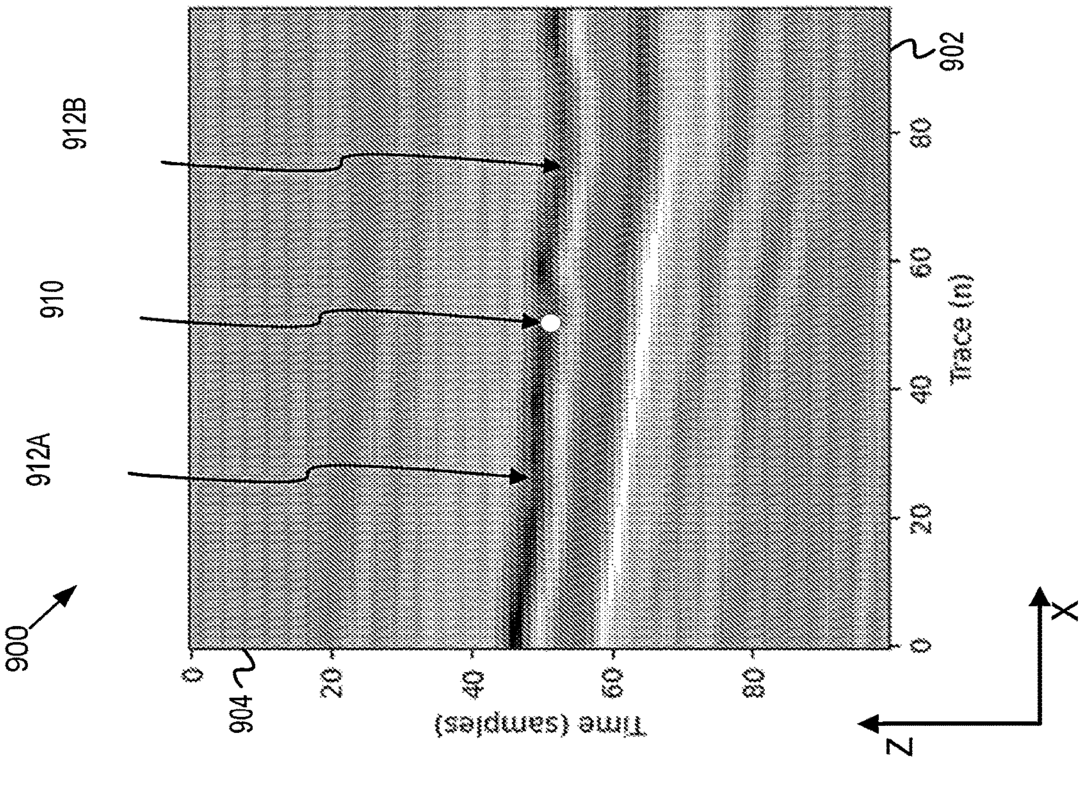
FIG. 9A depicts an example graph of seismic data for which an example horizon has been selected through the use of a constraint point, according to some embodiments.

FIG. 9A depicts an example graph of seismic data for which an example horizon has been selected through the use of a constraint point, according to some embodiments. FIG. 9A depicts a graph 900 of seismic values for vertical slice of the seismic volume (i.e., a cross-section of the seismic volume with respect to depth). The seismic data is plotted along one horizontal axis as a function of trace number (on x-axis 902) and along the depth axis as a function of sample time (on y-axis 904). The graph 900 contains a strong reflector which produces a horizon indicated by arrows 912A and 912B. A constraint point 910 has been selected for the horizon indicated by the arrows 912A and 912B.

Figure 9B:
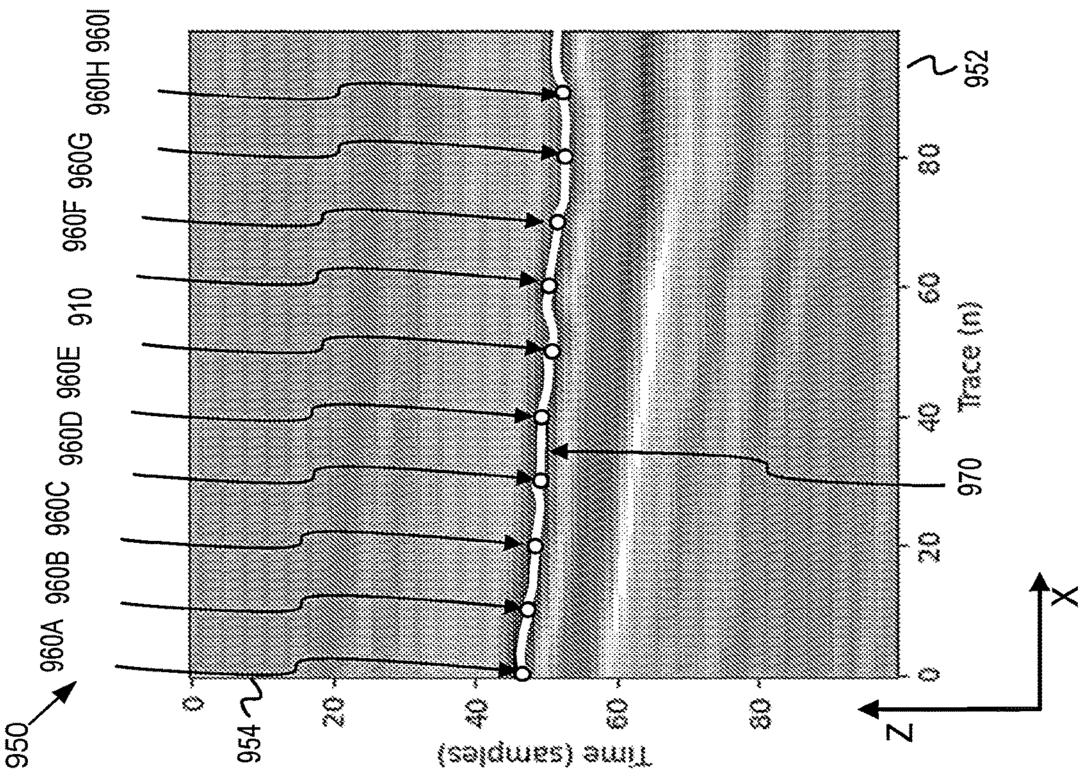
FIG. 9B depicts an example graph of seismic data for which an example horizon has been optimized, according to some embodiments.

FIG. 9B depicts an example graph of seismic data for which an example horizon has been optimized, according to some embodiments. FIG. 9B depicts a graph 950 of the seismic values of the graph 900 of FIG. 9A onto which a mapped horizon has been projected. The seismic data is plotted along one horizontal axis as a function of trace number (on x-axis 952) and along the depth axis as a function of sample time (on y-axis 954). Based on the constraint point 910, additional points 960A, 960B, 960C, 960D, 960E, 960F, 960G, 960H, and 960I of the sparse global grid have been generated. Based on the constraint point 910 and the additional points 960A-960I, a mapped horizon 970 has been optimized. The mapped horizon 970 conforms to the horizon of the graph 900 of FIG. 9A.

Figure 10A:
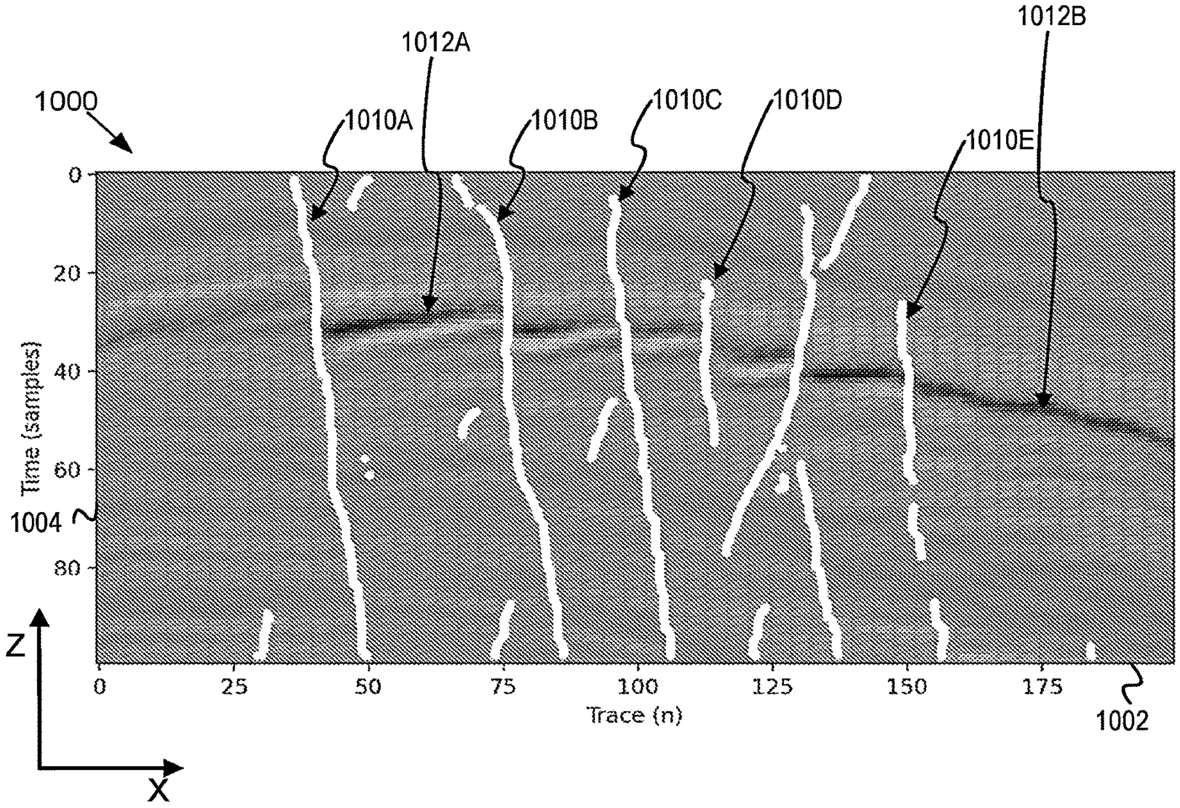
FIGS. 10A-10B depict example graphs of seismic data for horizon optimization for which geological faults have been identified, according to some embodiments.
Figure 10B:
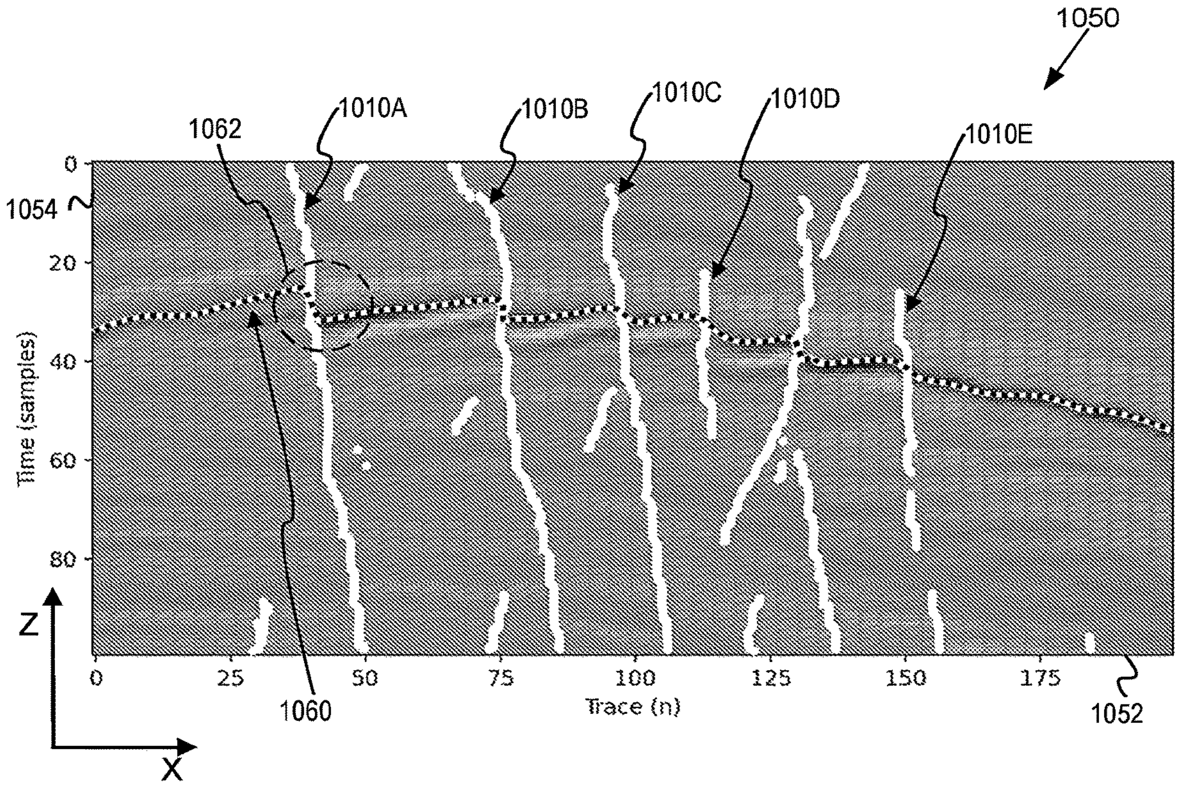

FIGS. 10A and 10B depict example graphs of seismic data for horizon optimization for which geological faults have been identified, according to some embodiments. FIG. 10A depicts a graph 1000 of seismic values for vertical slice of the seismic volume (i.e., a cross-section of the seismic volume with respect to depth). The seismic data is plotted along one horizontal axis as a function of trace number (on x-axis 1052) and along the depth axis as a function of sample time (on y-axis 1054). The graph 1000 contains a strong reflector which produces a horizon indicated by arrows 1012A and 1012B. The graph 1000 also contains faults (which are depicted as white lines), some of which are indicated by the arrows 1010A, 1010B, 1010C, and 1010E. The faults cause (or correspond to) discontinuity in the indicated horizon.

FIG. 10B depicts a graph 1050 of seismic values of the graph 1000 of FIG. 10A. The seismic data is plotted along one horizontal axis as a function of trace number (on x-axis 1002) and along the depth axis as a function of sample time (on y-axis 1004). Based on at least one constraint point and a discontinuity weighting factor, a mapped horizon 1060 has been optimized. The mapped horizon 1060 conforms to the horizon of the graph 1000 of FIG. 10A. A circle 1062 indicates where the mapped horizon 1060 follows the horizon across the fault 1010A. The discontinuity of the mapped horizon 1060 is generated by the use of a discontinuity weighting factor or a fault proximity weighting factor which allows the mapped horizon 1060 to be less continuous near the fault 1010A, and other identified faults.

Figure 11:
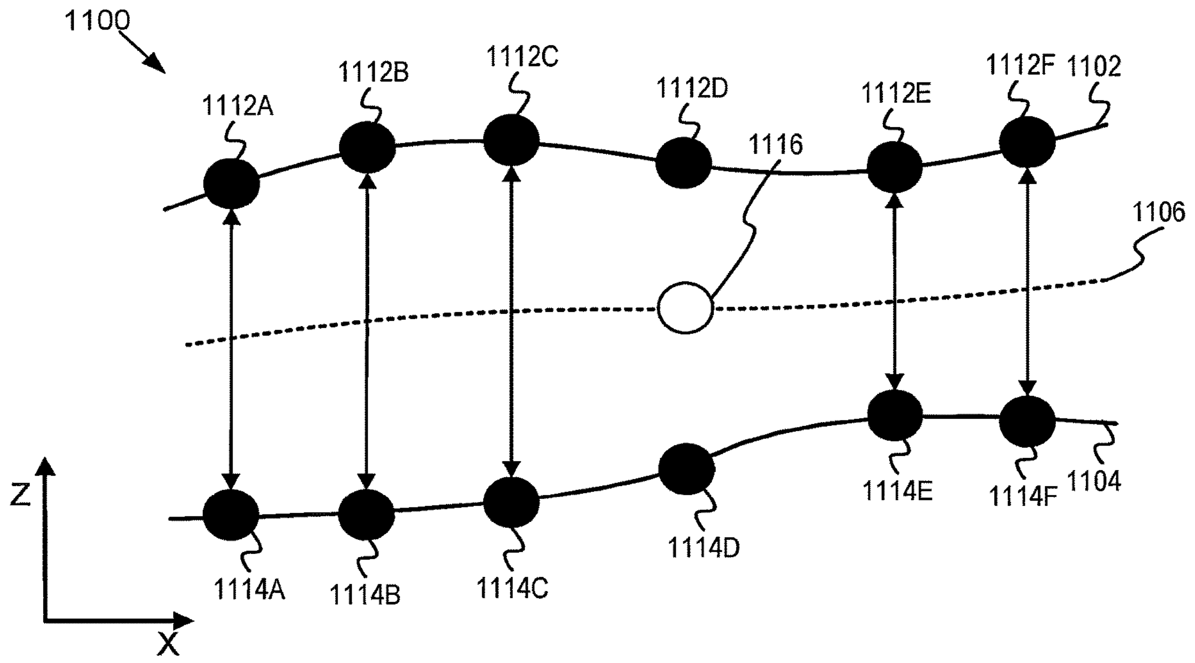
FIG. 11 depicts an example diagram of upper and lower bounds used to constrain horizon optimization, according to some embodiments.

FIG. 11 depicts an example diagram of upper and lower bounds used to constrain horizon optimization, according to some embodiments. FIG. 11 depicts a diagram 1100 displaying grid points 1112A, 1112B, 1112C, 1112D, 1112E, and 1112F of a constraint surface 1102 and grid points 1114A, 1114B, 1114C, 1114D, 1114E, and 1114F of a constraint surface 1104 in cross-section with respect to depth. The constraint surfaces 1102 and 1104 can represent a constraint surface or plain, including a mapped seismic horizon. The constrain surfaces 1102 and 1104 can be generated using multi-scale optimization or through any other appropriate method of constraint generation or seismic horizon mapping. The diagram 1110 also displays a grid point 1116 on a potential horizon 1106. The constraint surface 1102 can function as an upper bound or any other constraint point or surface for depth of the potential horizon 1106. The constraint surface 1104 can function as a lower bound or any other constraint point or surface for the potential horizon 1106. Although both an upper bound and a lower bound are depicted, it should be understood that only an upper bound or a lower bound or any portion thereof may be present.

Figure 12A:
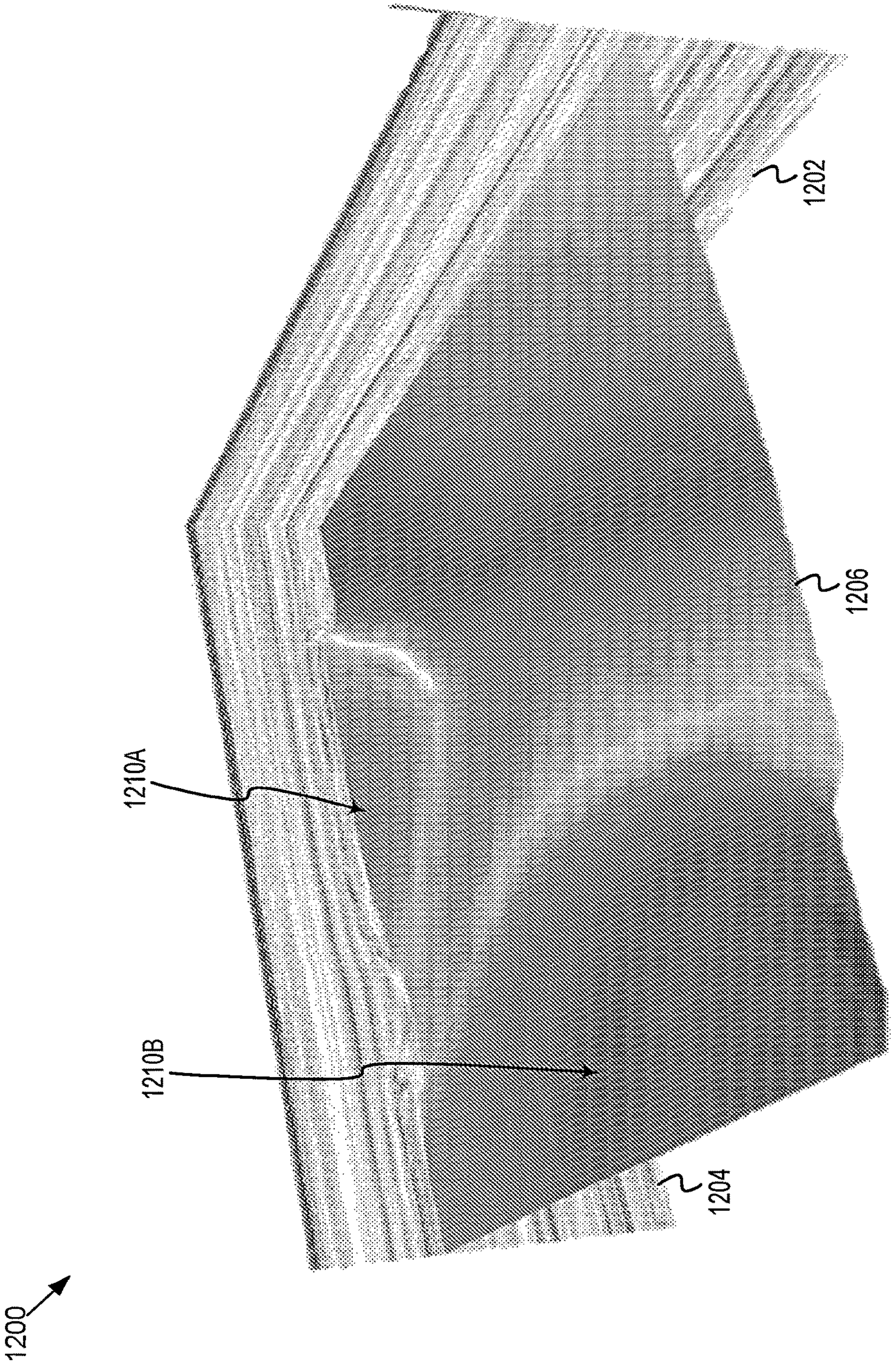
FIGS. 12A-12B depict example graphs of seismic horizons extracted from three-dimensional (3D) seismic volumes using seismic horizon mapping with multi-scale optimization, according to some embodiment.
Figure 12B:
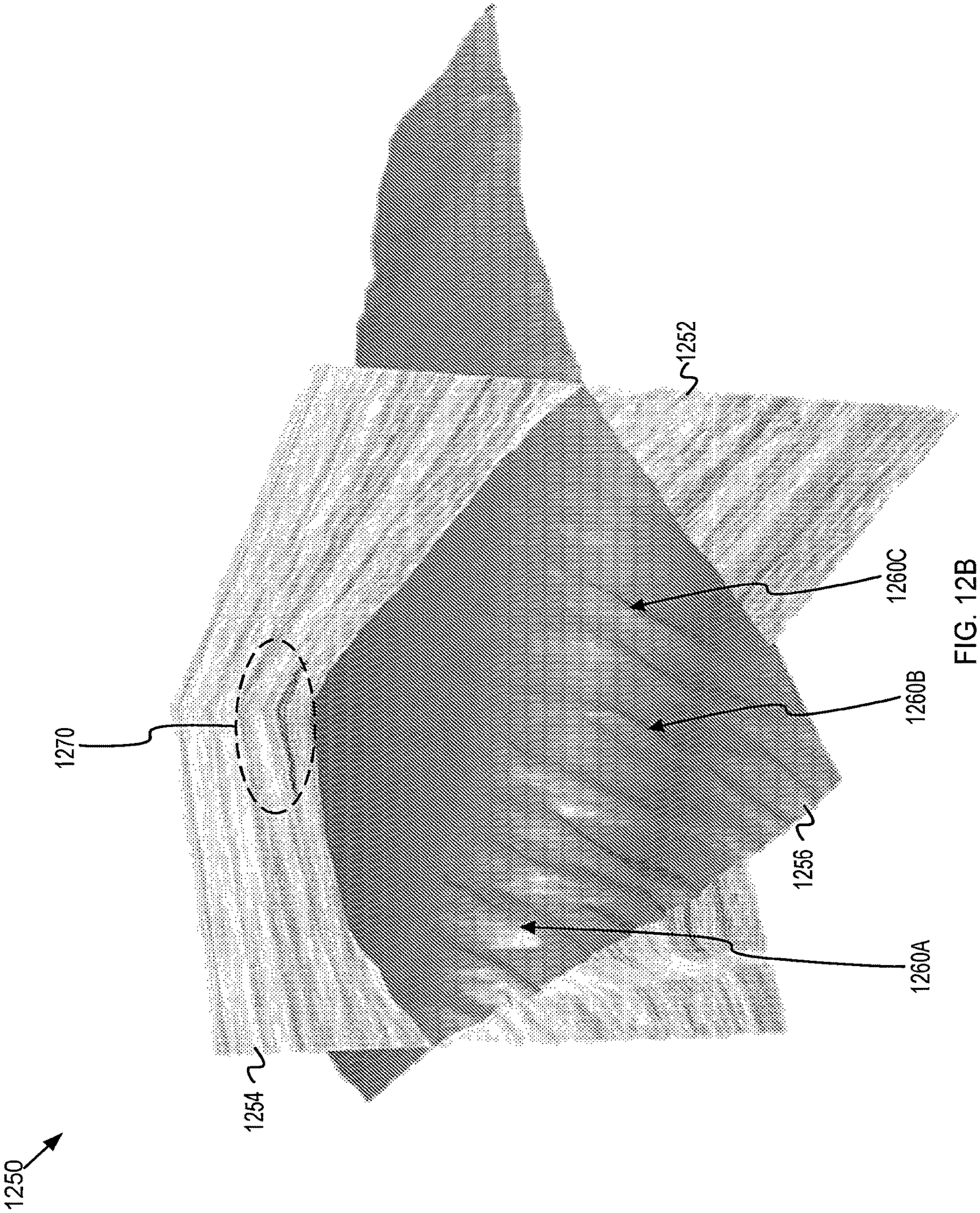

FIGS. 12A and 12B depict example graphs of seismic horizons extracted from three-dimensional (3D) seismic volumes using seismic horizon mapping with multi-scale optimization, according to some embodiments. FIG. 12A depicts 3D graph 1200 containing two orthogonal cross-sectional seismic maps (2D map 1202 and 2D map 1204) for a seismic volume. Each of the 2D maps 1202 and 1204 display seismic intensity as a function of depth and one of the horizontal distances of the seismic volume. In the 2D maps 1202 and 1204, multiple horizons are visible as seismic reflectors. The 3D graph 1200 also displays a 3D projection of a mapped horizon 1206. The mapped horizon 1206 shows the structure of two carbonate build ups present in the seismic volume—indicated by arrows 1210A and 1210B.

FIG. 12B depicts 3D graph 1250 containing two orthogonal cross-sectional seismic maps (2D map 1252 and 2D map 1254) for a seismic volume. Each of the 2D maps 1252 and 1254 display seismic intensity as a function of depth and one of the horizontal distances of the seismic volume. In the 2D maps 1252 and 1254, multiple horizons are visible as seismic reflectors—including a very strong reflector indicated by an oval 1270. The 3D graph 1250 also displays a 3D projection of a mapped horizon 1256. The mapped horizon 1256 shows the structure multiple channels incised into a rise of the horizon, as indicated by arrows 1260A, 1260B, and 1260C.

Figure 13:
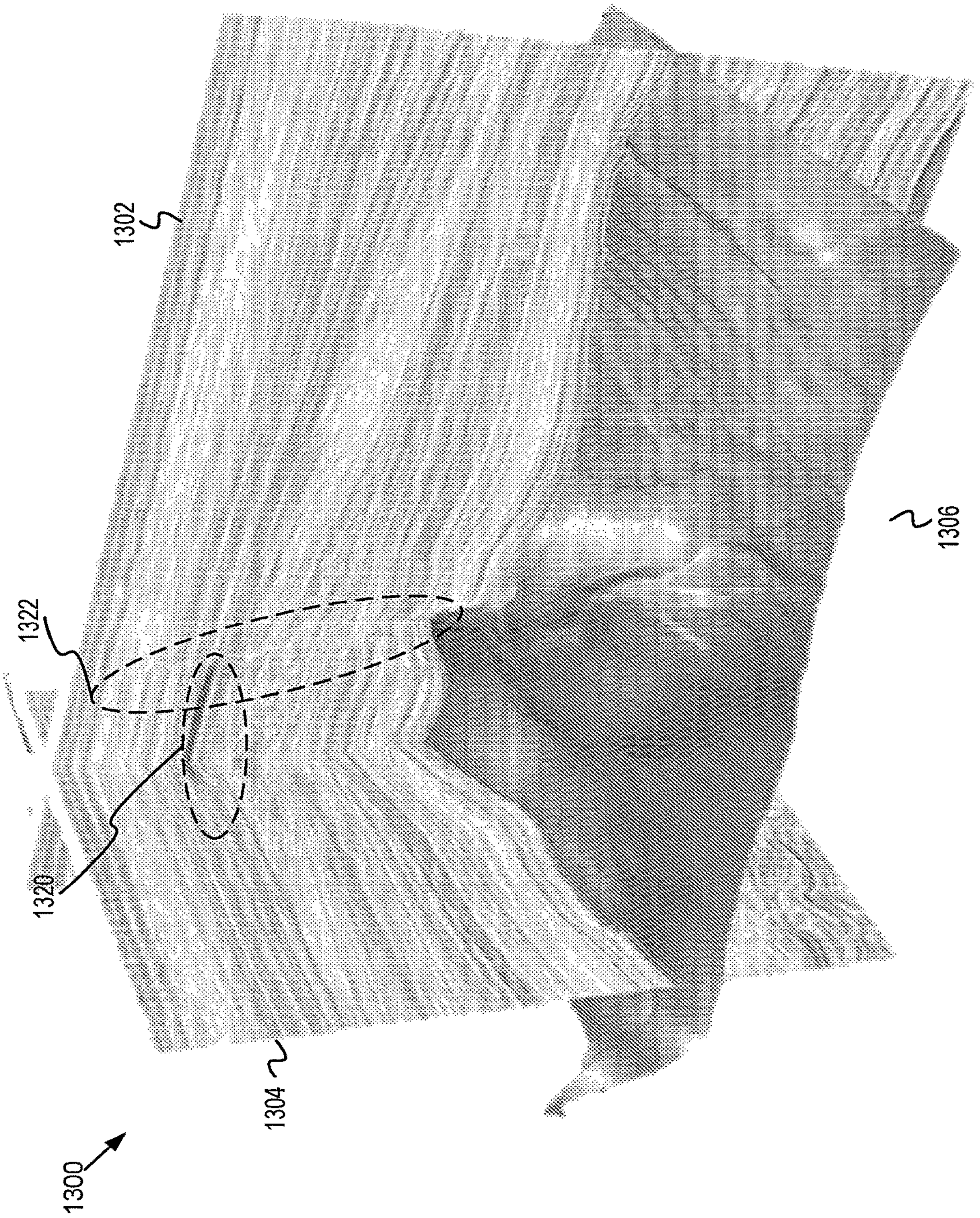
FIG. 13 depicts an example graph of a seismic horizon extract from three-dimensional (3D) seismic volumes using seismic horizon mapping with multi-scale optimization with dynamic time warping based on a single constraint point, according to some embodiments.

FIG. 13 depicts an example graph of a seismic horizon extract from three-dimensional (3D) seismic volumes using seismic horizon mapping with multi-scale optimization with dynamic time warping based on a single constraint point, according to some embodiments. FIG. 13 depicts 3D graph 1300 containing two orthogonal cross-sectional seismic maps (2D map 1302 and 2D map 1304) for a seismic volume. Each of the 2D maps 1302 and 1304 display seismic intensity as a function of depth and one of the horizonal distances of the seismic volume. In the 2D maps 1302 and 1304 multiple horizons are visible as seismic reflectors, including a very strong reflector indicated by an oval 1320. A fault is also visible, where the fault is contained within an oval 1322. The 3D graph 1300 also displays a 3D projection of a mapped horizon 1306. The mapped horizon 1306 displays a large offset across the fault of the oval 1322.

Figure 14A:
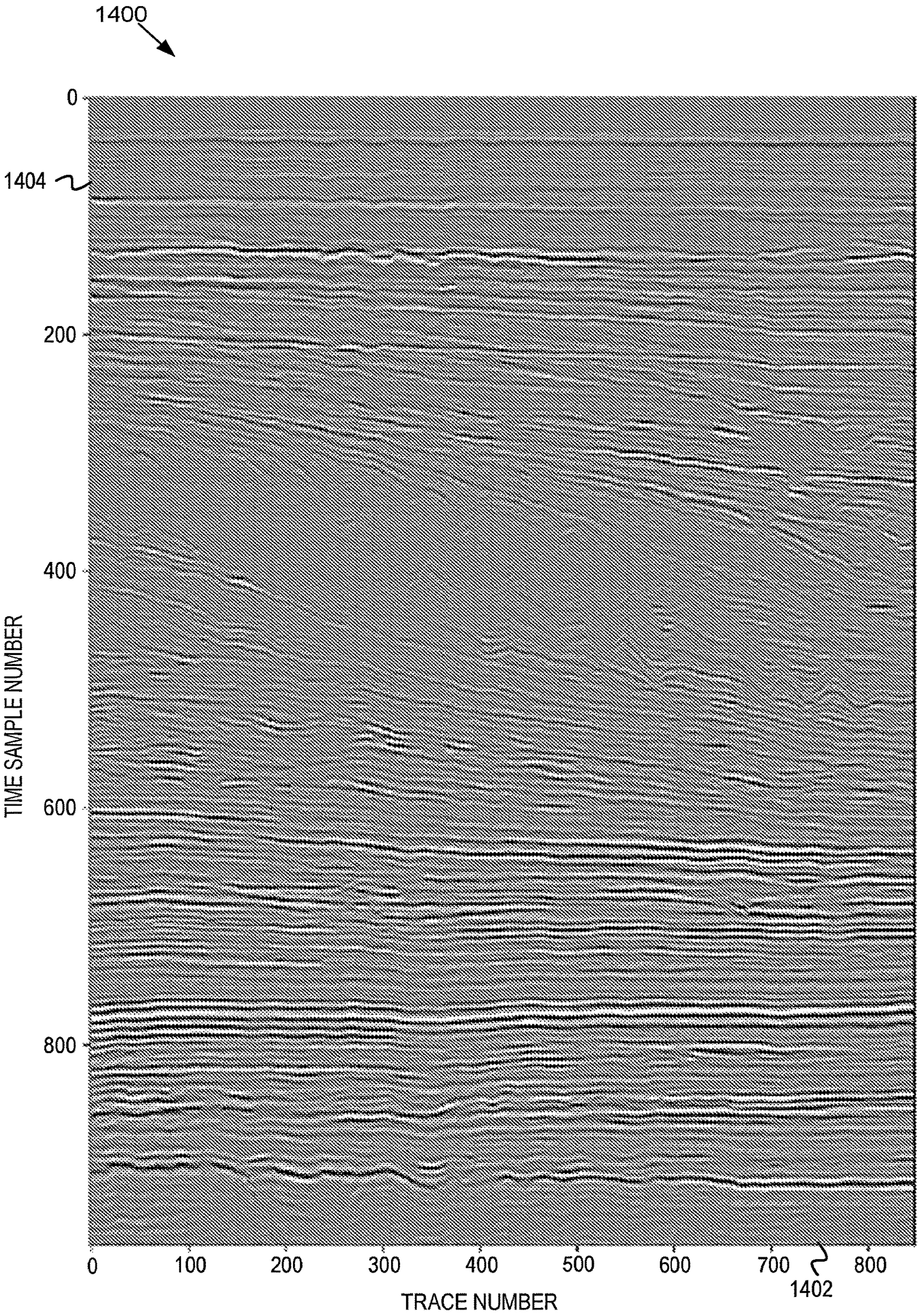
FIGS. 14A-14C depict graphs for generation of an example continuous geological age volume using seismic horizon mapping with multi-scale optimization, according to some embodiments.
Figure 14B:
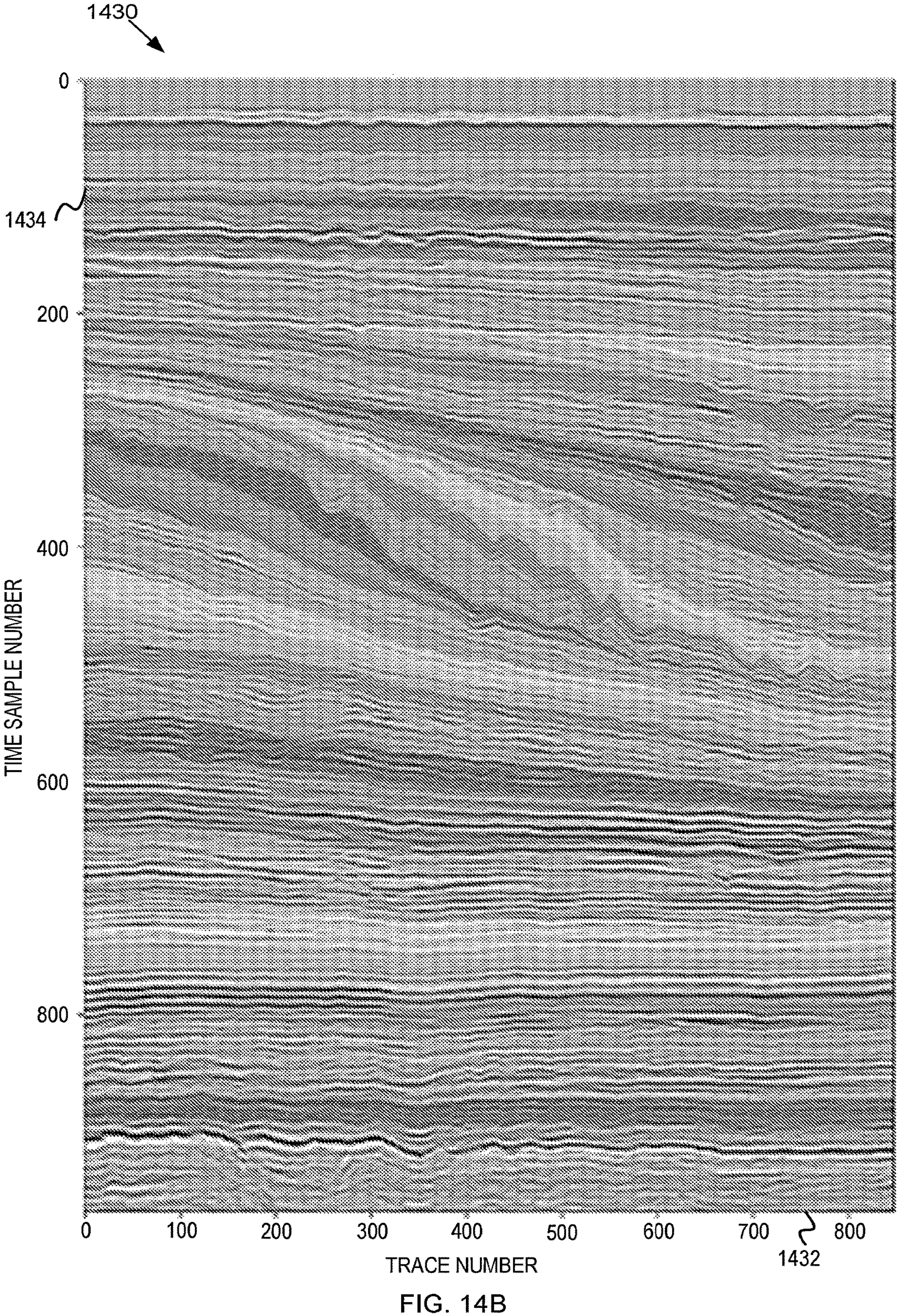
Figure 14C:
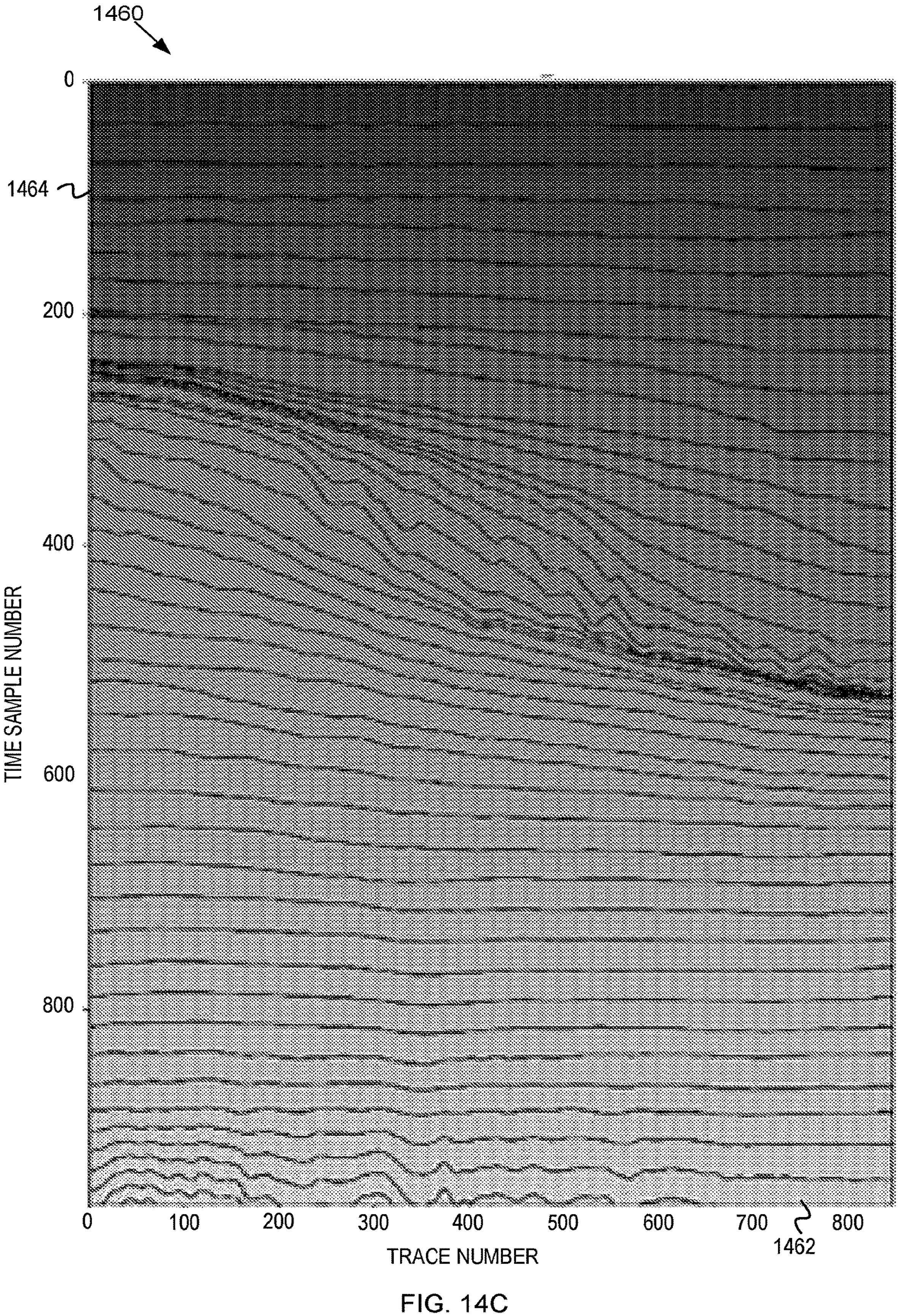

FIGS. 14A-14C depict graphs for generation of an example continuous geological age volume using seismic horizon mapping with multi-scale optimization, according to some embodiments. FIG. 14A depicts a graph 1400 of input seismic data as a function of trace number (along x-axis 1402) along a horizontal direction and as a function of time sample dumber (along y-axis 1404) along the depth direction. The graph 1400 shows input seismic data for a seismic volume. FIG. 14B depicts a graph 1430 of seismic horizons as a function of trace number (along x-axis 1432) along a horizontal direction and as a function of time sample number (along y-axis 1434) along the depth direction. The graph 1430 shows mapped horizons (in various shades of gray-scale) for the input seismic data for the seismic volume shown in the graph 1400 of FIG. 14A. FIG. 14C depicts a graph 1460 of continuous geological age as a function of trace number (along x-axis 1462) along a horizontal direction and as a function of time sample dumber (along y-axis 1464) along the depth direction. The graph 1460 shows continuous geological age (in various shades of grayscale) and mapped horizons (as black lines) for the input seismic data for the seismic volume shown in the graph 1400 of FIG. 14A.

Figure 15:
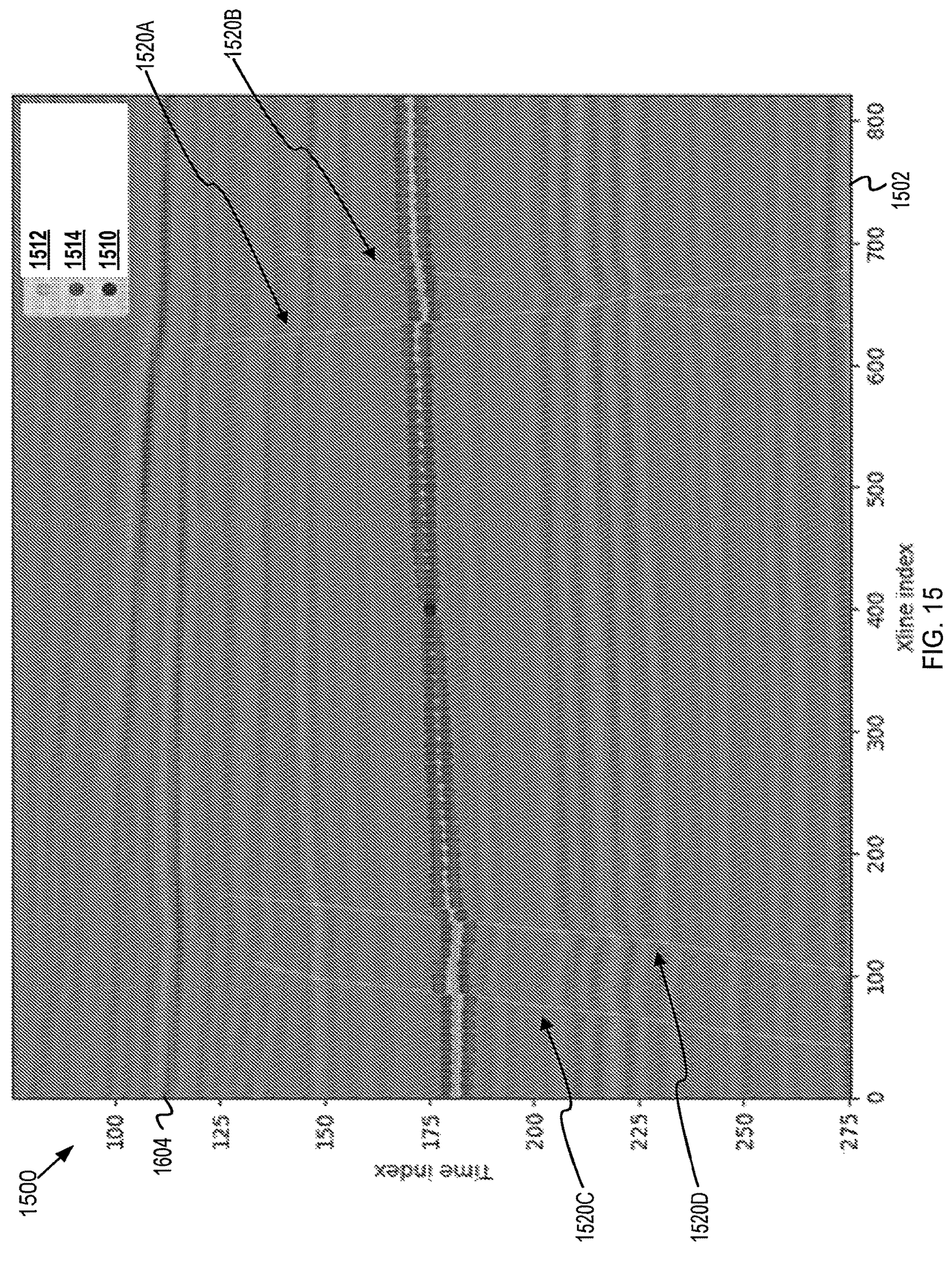
FIG. 15 depicts an example graph of an uncertainty estimate test for a seismic horizon mapped with multi-scale optimization, according to some embodiments.

FIG. 15 depicts an example graph of an uncertainty estimate test for a seismic horizon mapped with multi-scale optimization, according to some embodiments. FIG. 15 depicts a graph 1500 of seismic values for a vertical slice of the seismic volume (i.e., a cross-section with respect to depth). The seismic data is plotted along one horizontal axis as a function of trace number (on x-axis 1502) as x-line index and along the depth axis as a function of time index (on y-axis 1504). The graph 1500 also displays a seed point 1510, a best fit model for a horizon represented by points 1512, and a variance represented by points 1514 at plus or minus two standard deviations (i.e., $\pm 2\sigma$). The graph 1500 shows faults (indicated by arrows 1520A, 1520B, 1520C, and 1520D). The standard deviation in the model uncertainty increases as a function of distance from the seed point, and also for values separated by a fault from the seed point. Generally, the margin of error (or the standard deviation) approximates the horizon even across fault discontinuities.

Example embodiments can include a covariance estimate of uncertainty for a seismic horizon mapped with multi-scale optimization, which are now described. For a linear system of equations given by the relationship shown in Equation 17, below:

$$A\ x = B \tag{17}$$

where A, x, and B are matrices or vectors, a generalized solution can be given by Equation 18, below:

$$x = (A' C_B^{-1} A)^{-1} (A' C_B^{-1} A) \tag{18}$$

where $C_B$ is the covariance matrix of uncertainties of B. The model uncertainties for Eq. 5 can then be estimated using the covariance matrix, where an example is given by Equation 19, below:

$$C_x = (A' C_B^{-1} W A)^{-1} \tag{19}$$

where $C_x$ covariance matrix of x. Then the variance of the model parameters can be given by the diagonal elements of the covariance matrix, following Equation 20, below:

$$\sigma_x^2 = [C_x]_{ii} \tag{20}$$

where $\sigma_x^2$ is the variance and $[C_c]_{ii}$ is the $i^{th}$ diagonal element of the matrix $C_x$.

Figure 16:
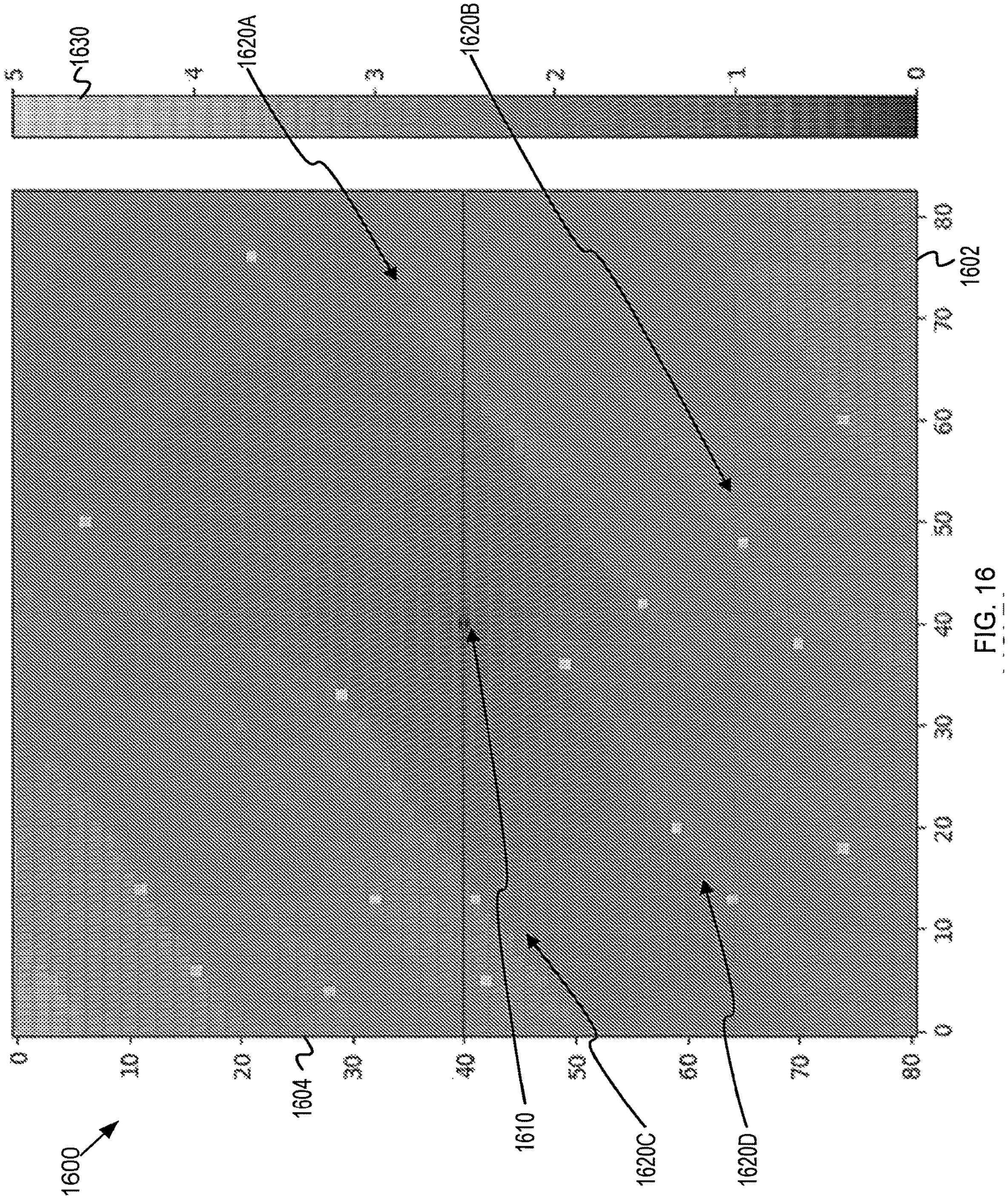
FIG. 16 depicts an example graph of values of a covariance estimate of uncertainty for a seismic horizon mapped with multi-scale optimization, according to some embodiments.

FIG. 16 depicts an example graph of values of a covariance estimate of uncertainty for a seismic horizon mapped with multi-scale optimization, according to some embodiments. FIG. 16 depicts a graph 1600 of covariance values as a function of the horizontal locations within the seismic volume for the horizon mapped in the graph 1500 of FIG. 15. The seismic data is plotted along one horizontal axis as a function of trace number (on x-axis 1602) and along another horizontal axis as a function of trace number (on y-axis 1604). The graph 1600 also displays a seed point 1610. The value of the covariance estimate is given by the shading as represented on legend 1630. The graph 1600 shows jumps in the value of the covariance which indicate faults, where fault artifacts are indicated by arrows 1620A, 1620B, 1620C, and 1620D. The value of the covariance estimate increases as a function of distance from the seed point, and also for values separated by a fault from the seed point. Generally, the value of the covariance estimate remains small even across fault discontinuities.

Faulted Seismic Horizon Mapping

Example implementations are now described that include mapping of seismic horizons having one or more faults. In some implementations, such horizon mapping may be based on the horizon optimization described above in reference to FIGS. 1-16. In some other implementations, such horizon mapping may be independent of the horizon optimization described above in reference to FIGS. 1-16.

A fault can represent a discontinuity on the horizon surface caused by slip along the fault plane. As discussed above, a seismic horizon may be modeled using structural seismic attributes like dip, coherence and fault likelihood. Fault likelihood has previously been used and certain aspects were down-weighted in the equations because the actual discrete faults and faults planes were unknown. However, to ensure an accurate horizon the surface may still often be guided by the presence of multiple user constraints. In addition, where isolated fault blocks exist on the horizon surface and significant throw exists on the fault plane, the seismic mapping or modeling may be unable to calculate the correct displacement across faults as this displacement is not captured by local seismic attributes such as dip.

Equation 21 (shown below) represents a generalized horizon optimization system of equations that is solved. "x" is the grid points on the horizon surface, "d" is the corresponding seismic dip value between adjacent grid points. "w" is the weighting term which is typically a function of data quality and the presence of faults.

$$w_i(x_i - x_i + 1) = w_i d_i \tag{21}$$

As now described, some operations may directly incorporate discrete fault planes into the horizon mapping or model. Accordingly, input to such operations may be one or more fault planes, which have been identified within the seismic volume. Discrete fault planes may provide both geometrical and spatial relationship information, which is lacking from a seismic attribute volume such as fault-likelihood that only give a probability of a fault plane passing through a point in the seismic volume. As a result, prior knowledge of fault planes may allow the fault planes to be treated as a boundary condition within the optimization framework. In some implementations, the horizon may be disconnected on either side of a fault, and the fault itself may represent a surface of free slip within the mapping or model.

Figure 17:
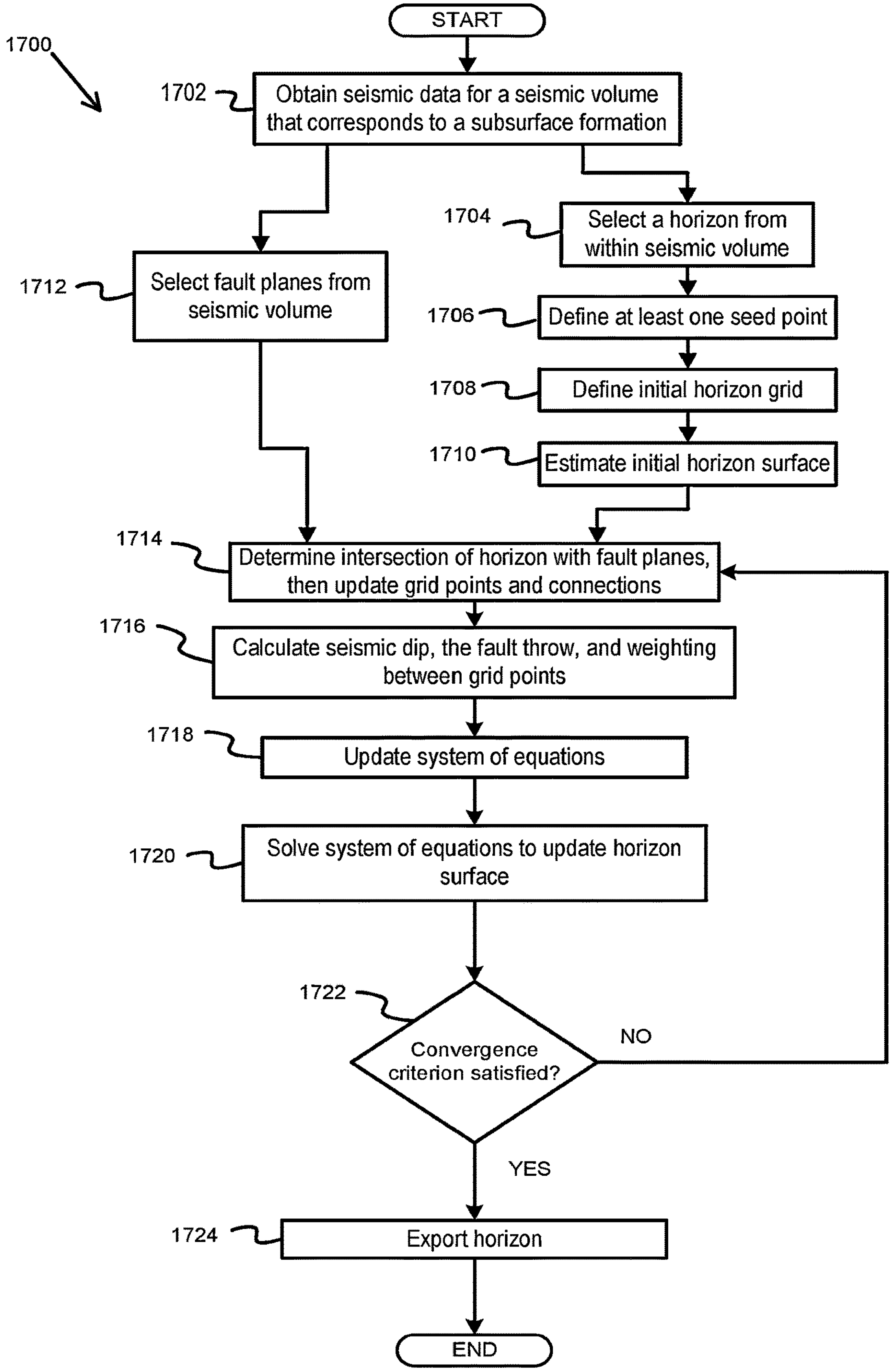
FIG. 17 depicts a flowchart of example operations for mapping seismic horizons having fault planes, according to some embodiments.

FIG. 17 depicts a flowchart of example operations for mapping seismic horizons having fault planes, according to some embodiments. FIG. 17 depicts a flowchart 1700 having example operations that can be performed by any combination of hardware, software, and firmware. For example, the operations can be performed by one or more processors executable program code. Such operations can be performed downhole in a wellbore, at the surface of the wellbore (including local and remote the wellsite), etc.

In some implementations, since the intersection of at least one fault plane with the horizon depends on the horizon itself, operations of the flowchart 1700 can be performed iteratively to allow convergence to the final result. As described above, in some implementations, a horizon surface can be solved iteratively as the solution may be strictly non-linear as seismic attribute values used to solve the horizon surface depend on the horizon surface itself. Examples of seismic attributes may include seismic dip, coherence, fault likelihood, etc. Where the horizon intersects the fault is also dependent on the horizon itself, operations of the flowchart 1700 may be carried out whenever the horizon surface is iteratively updated. Operations of the flowchart 1700 start at block 1702.

At block 1702, seismic data is obtained. For example, a seismic source can emit seismic waves that can be detected by one or more seismic sensors at the surface of the subsurface formation and/or in a wellbore formed in the subsurface formation. A processor can obtain the seismic data 1702 from the one or more seismic sensors.

Operations of the flowchart 1700 continue at blocks 1704 and 1712.

At block 1704, one horizon is selected from the seismic volume. For example, a processor can perform this operation.

At block 1706 at least one seed/constraint point is defined for the horizon. For example, a processor can perform this operation.

At block 1708 the initial horizon grid is defined. In some embodiments, generating the horizon grid may include generating a number of grid points on the horizon, wherein each of the number of grid points is derived from a seismic trace; and determining a connecting line between adjacent grid points of the number of grid points indicating a seismic attribute. One example of an initial horizon grid may be seen in FIGS. 7 and 9.

At block 1710 an initial horizon depth is defined at each of the initial grid points to give the starting horizon surface. For example, a processor can generate the map. In some embodiments, the initial horizon surface is generated based on an interpolated surface that passes through each of the seed/constraint grid points.

At block 1712, at least one fault plane in the seismic volume is selected. For example, a processor can perform this operation. In some embodiments, the fault plane will include an estimate of the fault throw. In some embodiments, a starting estimate of fault throw may be refined and updated as each subsequent horizon is interpreted.

At block 1714, using the selected horizon surface, any intersections of the at least one fault plane with the horizon are determined by identifying a link between the grid points which intersect the fault plane. The horizon grid is then updated to account for intersection of the horizon with any fault planes. For example, a processor can perform this operation.

At block 1716, seismic attributes, such as the seismic dip, and fault throw may be calculated and are weighted between relevant grid points. For example, a processor can perform these operations. Examples of the relevant grid points and their weighting are further described below in reference to FIGS. 18A-18D and a system of equations (such as Equations (22)-(29) described below).

At block 1718, the system of equations that is used to solve each horizon is updated with the values determined in block 1716. For example, a processor can perform this operation.

At block 1720, the system of equations is solved using any appropriate method, such as a direct solver or iterative least-squares method to update the horizon surface. For example, a processor can perform this operation.

At block 1722, a determination is made of whether a convergence criteria has been reached. For example, a processor may perform this determination. For example, the convergence criteria may be based on whether optimization of the horizon is reached. The convergence criteria may be based upon the value of the objective function (Equation 5), which is minimized when solving the system of equations, referred to from here on as the error value. If the error value reaches a certain threshold, stops changing for a certain number of iterations or a maximum number of iterations has been reached the convergence criteria may be met and the method outputs an updated horizon surface. In some embodiments, the threshold may be when the overall error value is much less than the vertical resolution of the input seismic volume, for example 0.001. In other embodiments, the convergence is achieved when the optimization has gone through at least 5 iterations without any improvement or change in the error value. If the convergence criteria has not been reached, operations of the flowchart 1700 return to block 1706 where at least one horizon is again selected from the map. If the convergence criteria has been reached, operations of the flowchart 1700 continue at block 1722.

At block 1722, the updated horizon is exported. For example, the processor may perform this exporting by displaying the updated seismic horizon map, storing the updated horizon in a data storage device, etc. Operations of the flowchart 1700 are complete.

As discussed above in reference to the flowchart 1700 of FIG. 17, the horizon grid is updated to incorporate any intersections with the at least one fault from the seismic volume in block 1714. Updating the horizon grid may include removing any grid point on the at least one fault; and removing any connecting lines that connects any grid point that have been removed. Updating the grid, in some embodiments, may include removing any connecting line that crosses the at least one fault. In other embodiments, updating the horizon grid may include determining, independently, the horizon grid on each side of the at least one fault. Updating the grid may also include determining a connecting line between two grid points of the number of grid points on opposite sides of the fault relative to the seismic attribute. The two grid points may include grid points nearest the at least one fault on each side of the at least one fault.

FIG. 18A-18D depict example two-dimensional (2D) schematic diagrams of how faults are included in a horizon mapping, according to some embodiments. FIGS. 18A-18D depict diagrams 1802-1808, respectively. As now described, the diagrams 1802-1808 help illustrate example operations for inclusion of faults in horizon mapping. Such operations can include removing connections between grid points that intersect a fault, determining a connection between two grid points that are located on opposite sides of the fault, and determining relevant seismic attributes, such as seismic dip or fault throw, between adjacent grid points.

In the diagrams 1802-1808, grid points represent positions on the horizon surface that will be solved for, connecting lines represent a single equation used to solve the surface. An initial equation, Equation 21 discussed and shown above, may be modified to account for the presence of the fault. In the original horizon optimization method weights are included to ensure the horizon surface will not be smoothed across a fault plane as shown in the diagram 1802 of FIG. 18A.

Figure 18A:
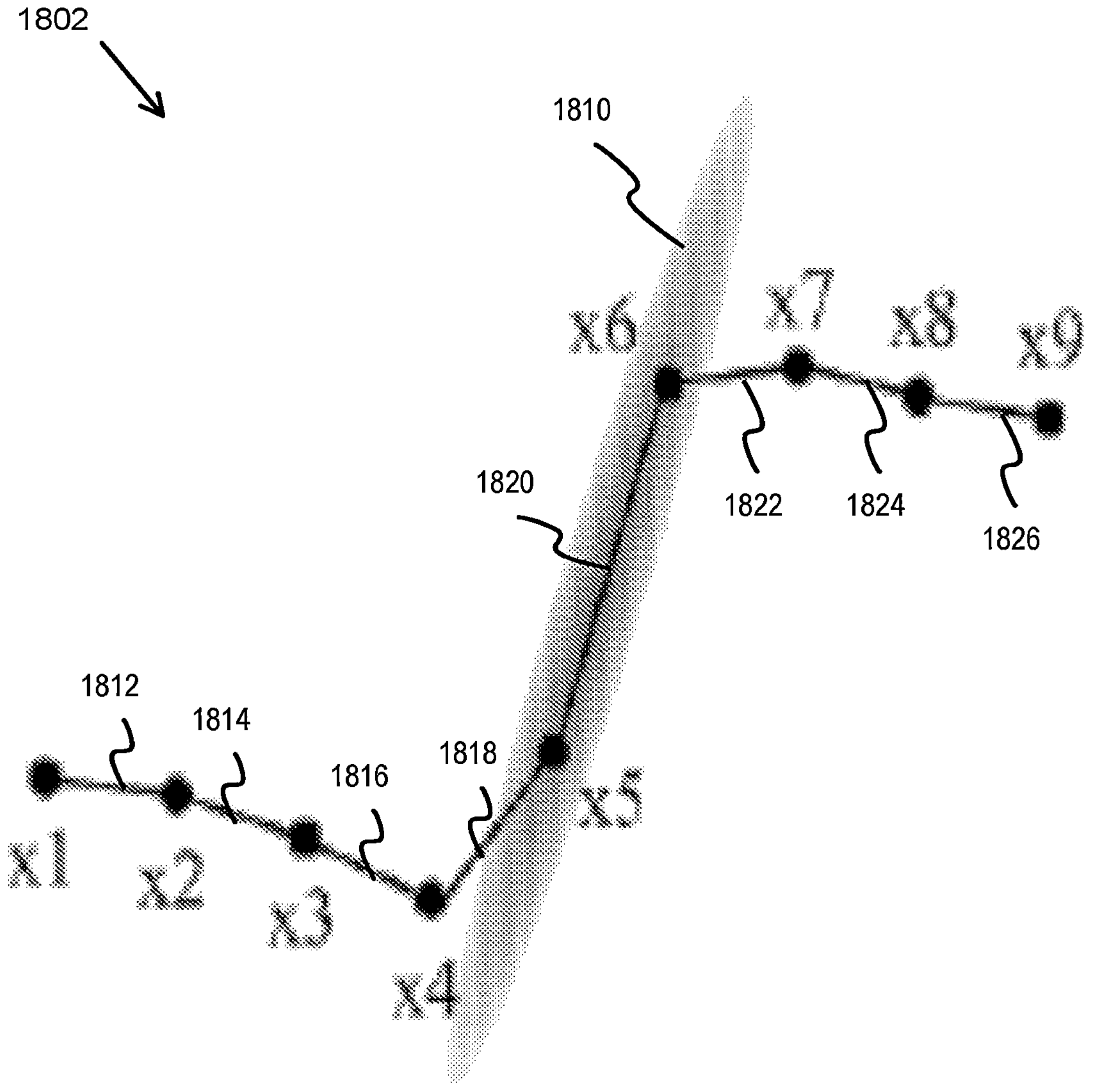
FIG. 18A-18D depict example two-dimensional (2D) schematic diagrams of how faults are included in a horizon mapping, according to some embodiments.

FIG. 18A illustrates an example from horizon mapping with a fault represented by a high probability region in an attribute volume (an ellipse 1810). Equations used to solve the horizon surface can be weighted according to their fault probability value. The diagram 1802 of FIG. 18A includes a connecting line 1812 connecting a grid point x1 to a grid point x2. The diagram 1802 includes a connecting line 1814 connecting the grid point x2 to a grid point x3. The diagram 1802 includes a connecting line 1816 connecting the grid point x3 to a grid point x4. The diagram 1802 includes a connecting line 1818 connecting the grid point x4 to a grid point x5. The diagram 1802 includes a connecting line 1820 connecting the grid point x5 to a grid point x6. The diagram 1802 includes a connecting line 1822 connecting the grid point x6 to a grid point x7. The diagram 1802 includes a connecting line 1824 connecting the grid point x7 to a grid point x8. The diagram 1802 includes a connecting line 1826 connecting the grid point x8 to a grid point x9.

Figure 18B:
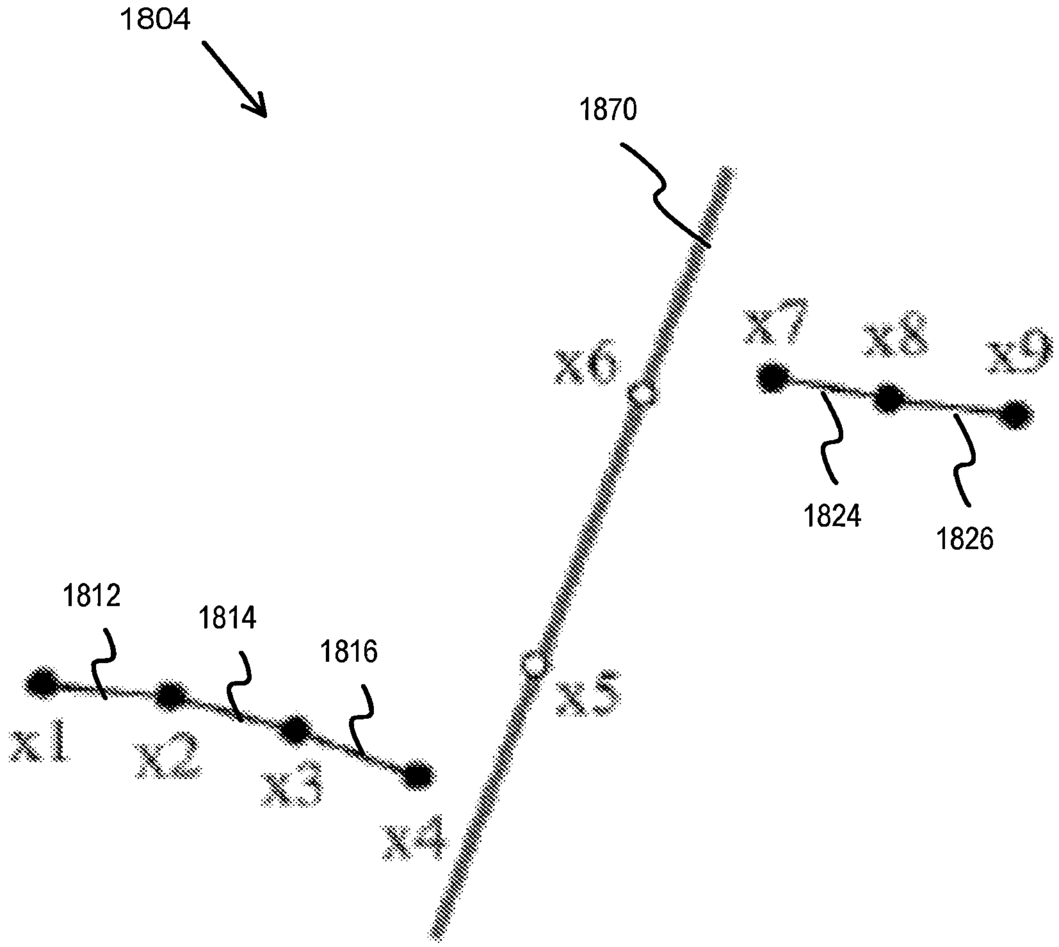

The diagram 1804 of FIG. 18B illustrates an example of including a discrete fault plane 1870 as a boundary condition, equations across the discrete fault plane 1870 and grid points on the discrete fault plane 1870 are removed {x5, x6}, allowing displacement of the horizon surface across the fault plane. In the diagram 1804, the connecting line 1818 is removed so that the grid point x4 is disconnected from the grid point x5. The connecting line 1820 is removed so that the grid point x5 is disconnected from the grid point x6. The connecting line 1822 is removed so that the grid point x6 is disconnected from the grid point x7. Additionally, the line points x5 and x6 are removed.

Figure 18C:
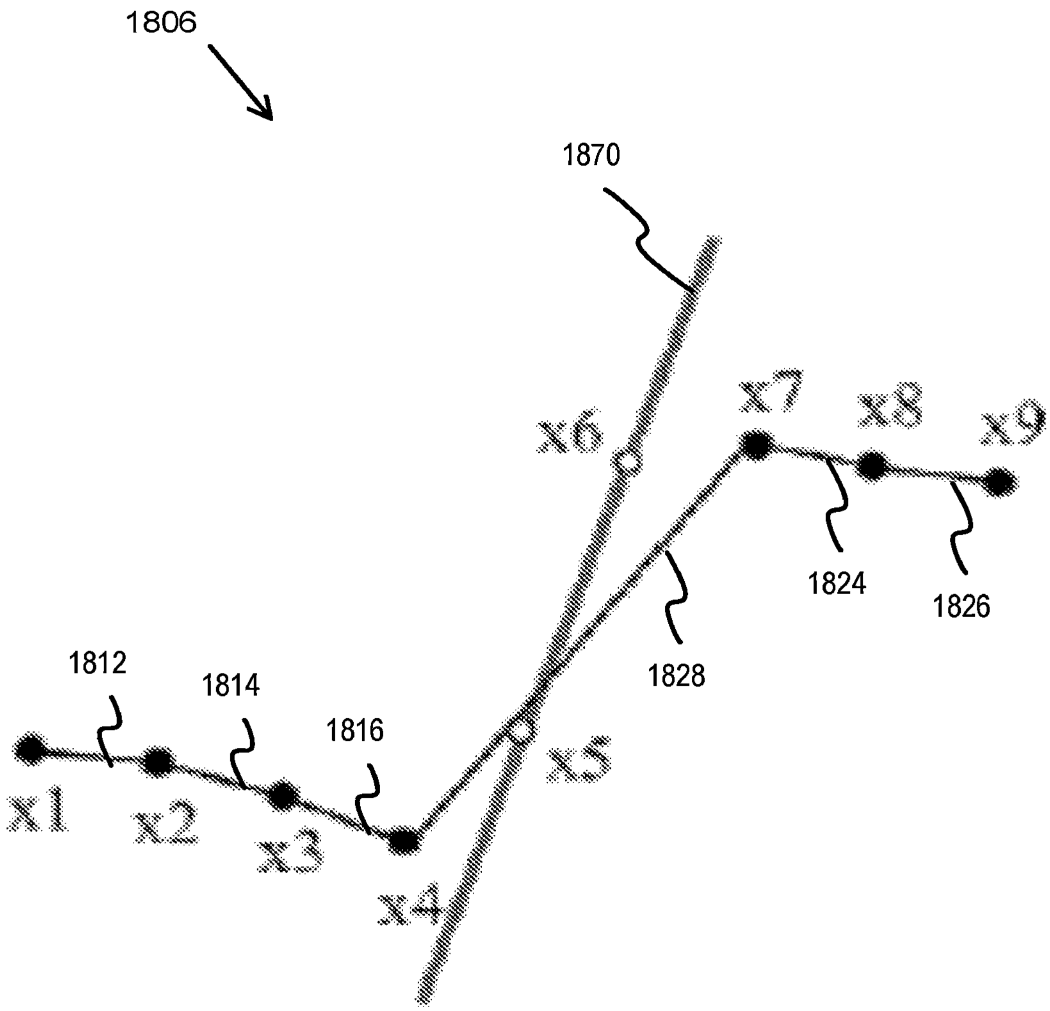

The diagram 1806 of FIG. 18C illustrates an example that is the same as shown in the diagram 1804 of FIG. 18B but including an equation that connects the two grid points {x4, x7} that lie on either side of the fault, which represents an estimate of vertical throw across the fault. In particular, a connecting line 1828 is added so that the grid point x4 is connected with the grid point x7.

Figure 18D:
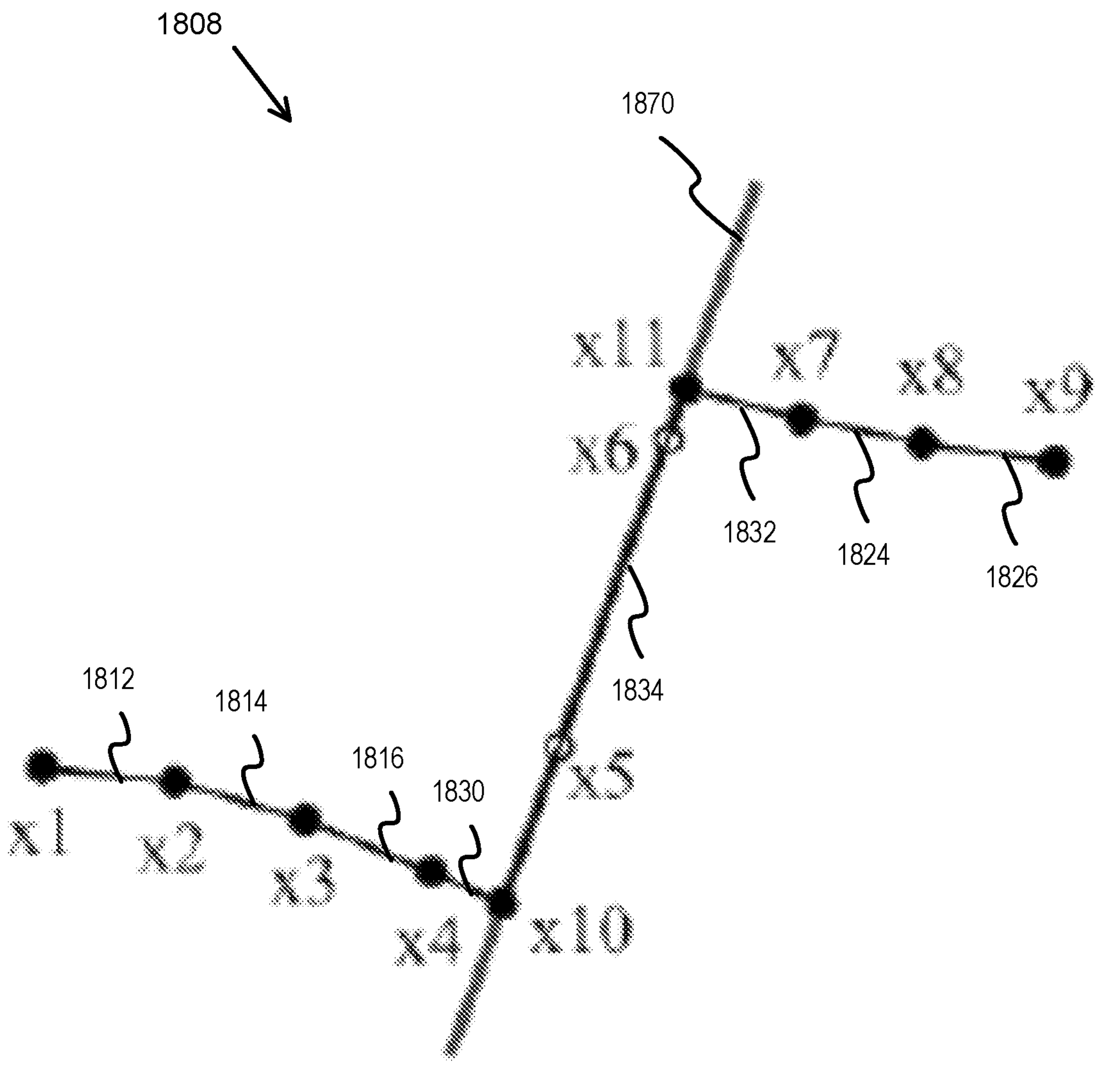

The diagram 1808 of FIG. 18D illustrates an example that is the same as shown in the diagram 1806 of FIG. 18C, but now distance between grid points is greater than one trace in the seismic volume. In some implementations, new grid points may therefore be added directly on either side of the fault and connected to the nearest grid point e.g. {x4→x10} and {x11–x7}. An equation then be added which connects x10 and x11, which again represents the vertical fault throw. In particular, a grid point x10 and a grid point x11 are added on the fault plane 1870. A connecting line 1834 is added for connecting the grid point x10 to the grid point x11. A connecting line 1830 is added for connecting the grid point x4 to the grid point x10. A connecting line 1832 is added for connecting the grid point x7 to the grid point x11.

The following system of equations (equations 22-29) may be used for encoding the horizon mapping problem shown in FIGS. 18D, which includes the presence of a single fault plane. Equations 22-26 would be part of the system of equations that defines the initial grid as described in Equation 21. Equations 27-29 are the additional equations needed to encode the vertical displacement across the fault plane 1870 correctly.

$$x_2 - x_1 = d_{1\to 2} \tag{22}$$

$$x_3 - x_2 = d_{2\to 3} \tag{23}$$

$$x_4 - x_3 = d_{3\to 4} \tag{24}$$

-continued $$x_8 - x_7 = d_{7\to 8} \tag{25}$$

$$x_9 - x_8 = d_{8\to 9} \tag{26}$$

$$x_4 - x_{10} = d_{4\to 10} \tag{27}$$

$$x_7 - x_{11} = d_{11\to 7} \tag{28}$$

$$x_{11} - x_{10} = t_{10\to 11} \tag{29}$$

In the above system of equations, "x" is the horizon grid, "d" is the corresponding seismic dip between adjacent grid points and "t" is the vertical component of fault throw between grid points on either side of the fault. Note that the original equations that would have included x5 and x6 have been removed as they intersect the fault plane and are weighted as zero (as illustrated in FIG. 18A-D). In the place of x5 and x6 their place, the final three equations, equations 27-29, have been added that encode the vertical throw/displacement across the fault plane from x4 to x7.

FIGS. 18A-18D illustrate an example iterative process of updating a horizon mapping by considering faults according to the flowchart 1700 of FIG. 17. The at least one horizon may be separated into a first horizon partition and a second horizon partition by the at least one fault as shown in the diagram 1804 of FIG. 18B. As shown in FIG. 18C, updating the map may then include adding two new grid points. A first new grid point may be added on the at least one fault at a location wherein the first horizon partition is predicted to intersect with the at least one fault, such as x10. A second new grid point may be added on the at least one fault at a location wherein the second horizon partition is predicted to intersect with the at least one fault, such as x11.

As shown in FIG. 18D, the map may be updated to include a connecting line between the first new grid point and a grid point of the number of grid points that is nearest the at least one fault in the first horizon partition, such as between x4 and x10. The map may also be updated to include a connecting line between the second new grid point and a grid point of the number of grid points that is nearest the at least one fault in the second horizon partition, such as between x11 and x7. Additionally, the map may be updated to include a connecting line between the first new grid point and the second new grid point, such as from x10 to x11.

A three-dimensional (3D) extension of the method may be used in some embodiments. The analysis described in the 2D case is performed on multiple vertical 2D slices along both horizontal axes of the seismic volume, which is illustrated in FIG. 19. The difference being that the equations which represent vertical fault displacement may be added on lines which are sub-parallel to the fault plane normal at the intersection point of the horizon surface with the fault on that line. In some embodiments, sub-parallel may be less than or equal to 45 degrees in the case of 3D surveys. In other embodiments a similar constraint and sub-parallel less than or equal to 45 degrees may also be used for sparse 2D surveys.

Figure 19A:
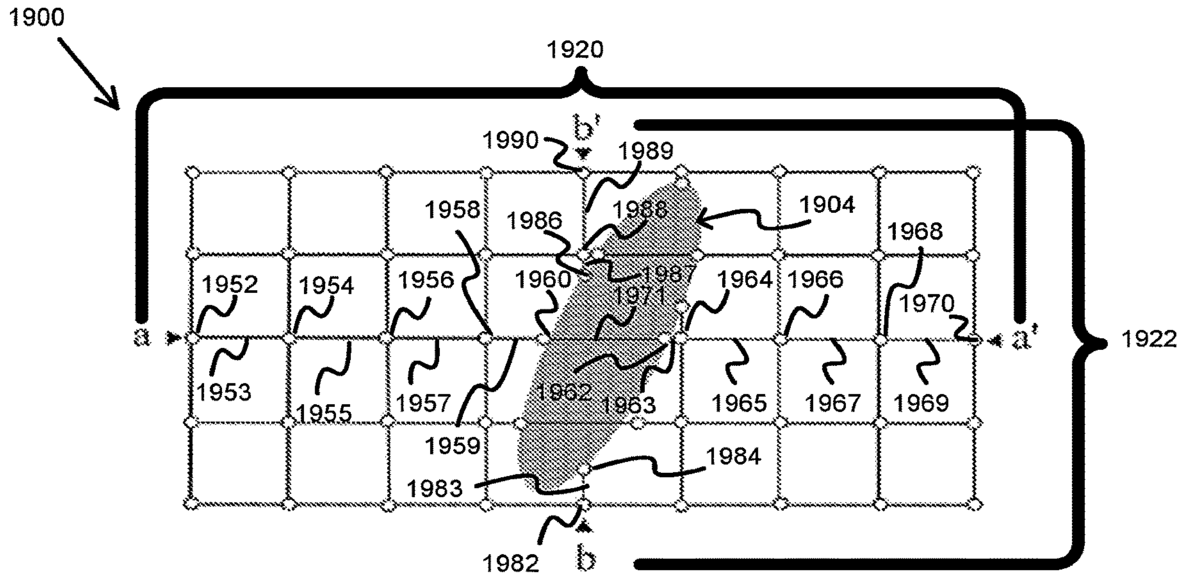
FIGS. 19A-19C depict example plots of a horizon surface with points to be solved, according to some embodiments.
Figure 19B:
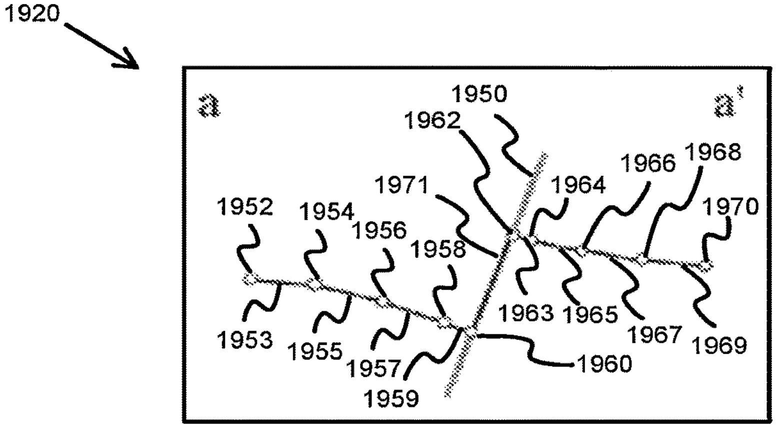
Figure 19C:
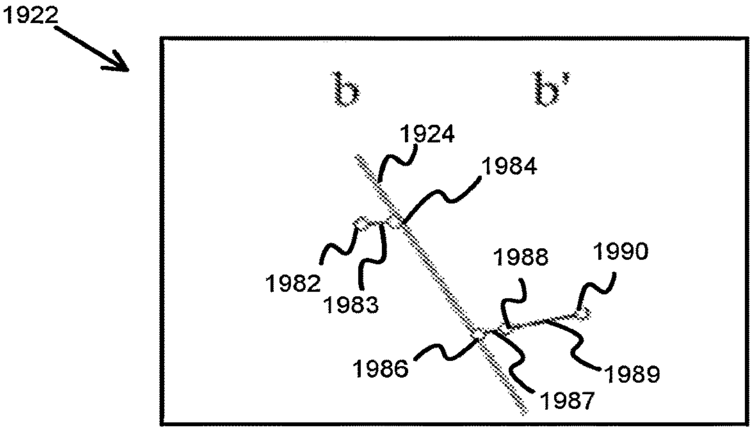

To illustrate, FIGS. 19A-19C depict example plots of a horizon surface with points to be solved, according to some embodiments. A plot 1900 of a horizon surface includes a number of grid points 1952, 1954, 1956, 1958, 1960, 1962, 1964, 1966, 1967, 1970, 1982, 1984, 1986, 1988, and 1990 to be solved. The plot 1900 also includes a number of connecting lines 1953, 1955, 1957, 1959, 1963, 1965, 1967, 1969, 1983, 1985, 1987, and 1989 which represent equations that will be used to solve the horizon surface. As shown, a given connecting line represents the equations that encode the relationship between two adjacent grid points. Thus, the given connecting line represents the equation used to calculate the displacement between the two grid points. The plot 1900 also includes an ellipse 1904 that represents a fault polygon, which is the missing part of the horizon surface created by extension during faulting.

In FIG. 19B, a profile a-a' 1920 represents a line 1950 that is sub-parallel to the fault plane normal on that line, therefore an additional equation is included which represents the vertical fault throw. In particular, the profile a-a' 1920 includes the grid points 1952-1970 and the connecting lines 1953-1969 (from the plot 1900 of FIG. 19A) relative to their position on the line 1950. A connecting line 1971 representing the vertical fault throw is included in the profile a-a' 1920 (between the grid points 1960 and 1962.

In FIG. 19C, a profile b-b' 1922 of FIG. 19C represents a line 1924 that is not sub-parallel to the fault plane normal on that line, therefore no equation is added across the fault plane. In particular, the profile b-b' 1922 includes the grid points 1982-1990 and the connecting lines 1983-1989 (from the plot 1900 of FIG. 19A) relative to their position on the line 1924.

Figure 20:
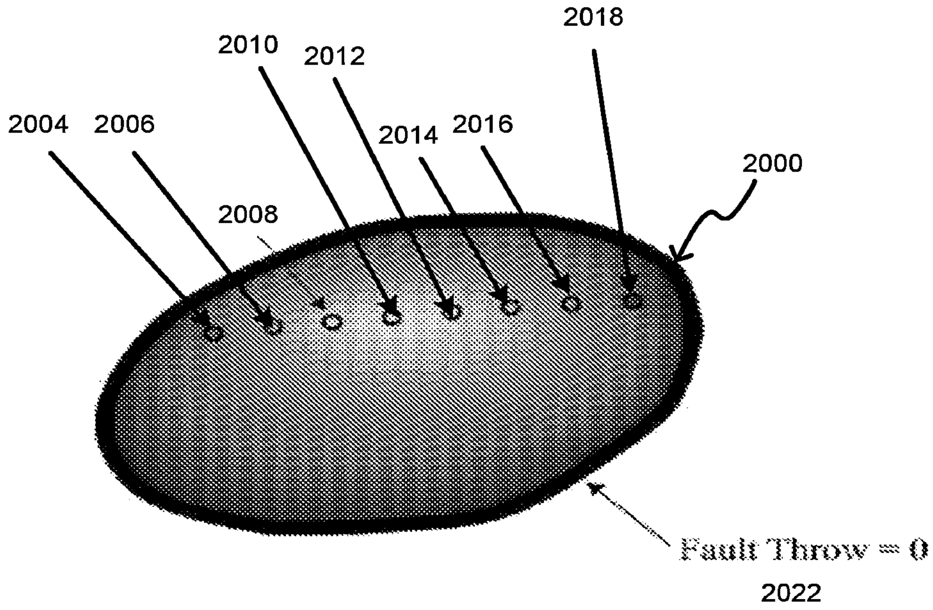
FIG. 20 depicts an example of a three-dimensional fault plane with horizon intersection points, according to some embodiments.

FIG. 20 depicts an example of a three-dimensional fault plane with horizon intersection points, according to some embodiments. FIG. 20 depicts a three-dimensional fault plane 2000 with horizon intersection points 2004-2018. The horizon intersection points 2004-2018 may be used to interpolate vertical fault throw across the remainder of the fault plane. An example of a geological constraint 2022 is also shown, which is that fault throw should be zero at the edge of the fault plane. Some implementations may include how vertical fault throws may be estimated within the horizon framework (as described above). In these implementations, operations that only require the fault planes themselves, may be implemented through a variant of Dynamic Image Warping (DIW). In such implementations, a vertical throw may be sampled at any location on the fault surface (which is the direction of the fault plane normal vector at that location). Another approach to estimating vertical fault throws may use both the fault plane and one or more intersecting horizons. On lines which intersect the fault plane, using the same method as described in the example implementations of FIGS. 19C-20D, the vertical throw may be estimated across the fault from the interpreted horizon surface. Using the values of fault throw and the location at which they intersect the fault plane, fault throw may be interpolated across the fault plane. Geological context may also be included to improve the interpolation, one example being that fault throw should trend to zero at the edge of the fault plane (as depicted in FIG. 20 (described above)). After estimates of the fault throw have been obtained, these estimates may be included in the horizon seismic mapping (as described in reference to FIG. 17 (described above)).

Another example implementation for mapping a seismic horizon that includes fault planes is now described. This example implementation may include an overall iterative workflow that enables continual improvement of both the horizon surfaces as well as the estimates of vertical fault throw. Such an implementation may be implemented to vastly reduced the time taken to generate a dense stack of high-quality seismic horizons in a structurally complex dataset.

Figure 21:
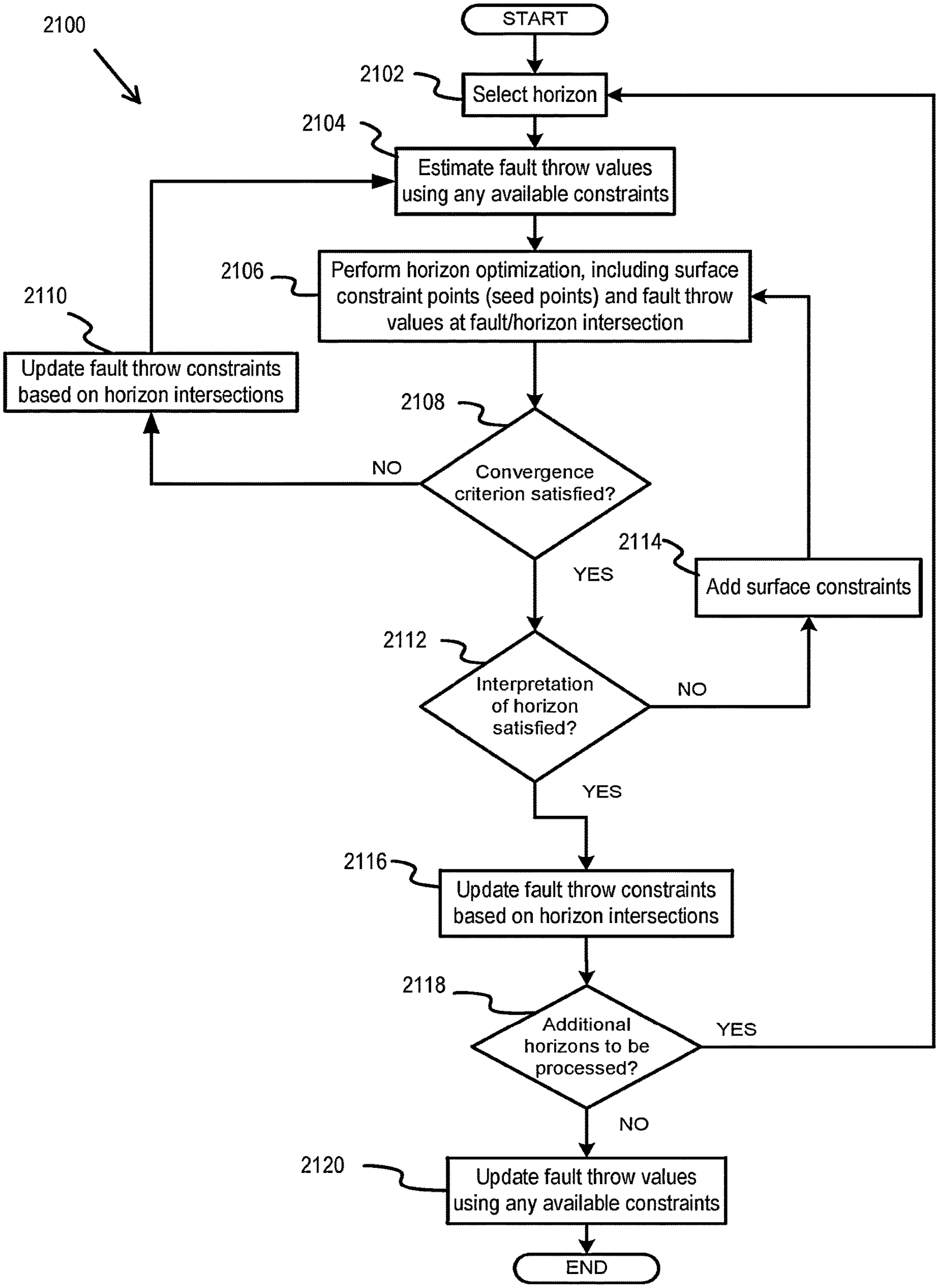
FIG. 21 depicts a flowchart of example operations for mapping seismic horizons having fault planes, according to other some embodiments.

In particular, FIG. 21 depicts a flowchart of example operations for mapping seismic horizons having fault planes, according to other some embodiments. FIG. 21 depicts a flowchart 2100 having example operations that can be performed by any combination of hardware, software, and firmware. For example, the operations can be performed by one or more processors executable program code. Such operations can be performed downhole in a wellbore, at the surface of the wellbore (including local and remote the wellsite), etc. As is now described, operations of the flowchart 2100 may update an initial estimate of vertical displacements on fault planes based on interpreted seismic horizons. This implementation allows for improved estimates of fault throw, which in turn improves generation of subsequent seismic horizons as fewer seed/constraint points will be needed to accurately map seismic horizon across fault planes. Operations of the flowchart 2100 depict start at block 2102.

At block 2102 a seismic horizon is selected. For example, a processor can perform this operation.

At block 2104, fault throw values are estimated using any available constraints. In some embodiments these constraints may come from the intersection of interpreted seismic horizon with the at least one fault planes. In some embodiments, dynamic image warping (DIW) and/or weighted interpolation, using the constraints, is performed on each fault plane to estimate fault throw values. For example, a processor can perform this operation.

At block 2106, horizon optimization may be performed, using surface seed/constraint points and determined fault throw values to output an updated horizon. For example, a processor can perform this optimization as described in FIG. 17. For example, the processor may perform this horizon optimization according to the system of equations 22-29 as discussed above.

At block 2108, a determination is made of whether a convergence criteria has been reached. For example, a processor may perform this determination. For example, the convergence criteria may be based on whether optimization of the horizon is reached similar to the determined made similar to the decision described with block 1722 discussed above. If the convergence criteria has not been reached, operations of the flowchart 2100 continue to block 2110 where fault throw values are determined at the horizon intersection with any fault and the fault throw constraints are updated. In some implementations, the processor may make this determination. The flowchart 2100 returns to block 2104 where fault throw values on the at least one fault planes are then modified according to the new constraints using any appropriate method as discussed above for block 2104.

If the convergence criteria has been reached, operations of the flowchart 2100 continue at block 2112, where a determination is made of whether interpretation of the horizon is satisfied. In some implementations, the processor may make this determination. In other implementations, a user may determine that the horizon is good enough. If not, the user may add additional seed/control points to further constrain the horizon and the method returns back to block 2106. In some embodiments, the additional control points may include grid points on the horizon surface which will be given a fixed depth value during the optimization, thus forcing the horizon surface to pass directly through them. One example of the additional grid points is discussed above with regard to equation 7. If the interpretation of the horizon is satisfied, operations of the flowchart 2100 continue to block 2116.

At block 2116 fault throw constraints are updated, the same as described in block 2110 of flowchart 2100.

At block 2118, a determination is made of whether there are additional horizons to process. In some implementations, the processor makes this determination. For example, if there are other horizons to process, then the processor makes the determination to continue processing additional horizons. If there are no additional horizons to process, operations of the flowchart 2100 continue to block 2120. Otherwise, operations of the flowchart 2100 continue at block 2102.

At block 2120 fault throw values are updated according to the fault throw constraints one final time. The operation in block 2120 is equivalent to that described in block 2104. The final fault throw values are then available for any other processes that may require them. The operations of the flowchart 2100 are then complete Thus, operations of the flowchart 2100 may provide an overall iterative workflow that enables continual improvement of both the horizon surfaces as well as the estimates of vertical fault throw. This iterative process may be implemented to vastly reduced the time taken to generate a dense stack of high-quality seismic horizons in a structurally complex dataset.

In some implementations, the horizon mapping with fault inclusion (as described herein) may be used to perform subsurface operations in one or more subsurface formation. For example, a downhole operation may be initiated, modified, or stopped based on the horizon mapping. Examples of such downhole operations may include completion of the wellbore, updating drilling operations, perforating, fracking, logging operations, additional sampling of the subsurface formation, etc. For instance, this horizon mapping may indicate hydrocarbons located at a different location in the subsurface formation than what was originally predicted. Accordingly, subsurface operations may be adjusted to maximize recovery of these hydrocarbons.

Example System Applications

Figure 22:
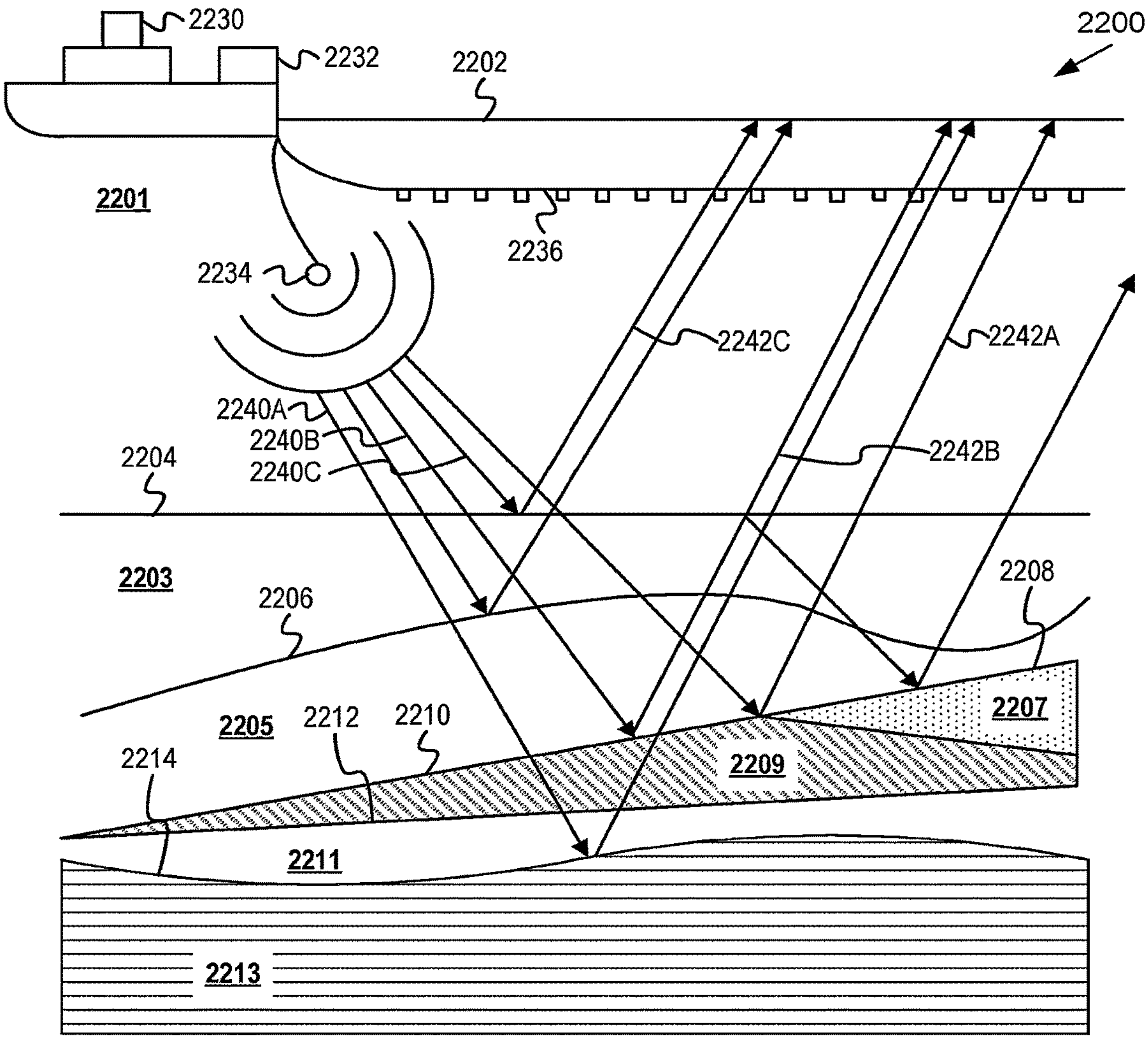
FIG. 22 depicts an example schematic diagram of an example subsea seismic survey system, according to some embodiments.

FIG. 22 depicts a schematic diagram of an example subsea seismic survey system, according to some embodiments. FIG. 22 depicts a schematic diagram 2200 of an elevation view of a typical marine seismic survey that can be used to generate seismic measurements for a seismic volume.

A body of water 2201 over the first geological layer 2203 is bounded at a water surface 2202 by a water-air interface and at a water bottom 2204 by a water-earth interface. Beneath the water bottom 2204 is a first geological layer 2203. Beneath the first geological layer 2203 is a second geological layer 2205 with an upper layer 2206, a geological layer containing gas 2207 with an upper interface 2208, a geological layer containing oil 2209 with an upper interface 2210, a third geological layer 2211 with an upper layer 2212, and a geological layer containing oil sands 2213 with an upper interface 2214. A seismic vessel 2230 travels on the water surface 2202 and contains seismic acquisition control equipment 2232. The seismic acquisition control equipment 2232 includes navigation control, seismic source control, seismic sensor control, and recording equipment.

The seismic acquisition control equipment 2232 includes a seismic source 2234 to actuate at selected times. In response, the seismic source 2234 emits seismic waves. Seismic streamers 2236 contain seismic sensors to detect the reflected waves initiated by the seismic source 2234 and reflected from interfaces in the environment. The seismic streamers 2236 can contain seismic sensors such as hydrophones and/or water particle motion sensors such as geophones. The hydrophones and geophones are typically co-located in pairs or pairs of sensor arrays at regular intervals along the seismic streamers 2236.

The seismic source 2234 is activated at periodic intervals to emit seismic waves in the vicinity of seismic streamers 2236 with the hydrophones and the geophones. Each time the seismic source 2234 is actuated, an acoustic/seismic wave travels upwardly or downwardly in spherically expanding wave fronts. The traveling waves will be illustrated by ray paths normal to the expanding wave fronts. The downwardly traveling wave from the seismic source 2234 traveling along a ray path (i.e., ray paths 2240A, 2240B, 2240C) will reflect off one of the water bottom 2204, the upper layers 2206, 2212, and the upper interfaces 2208, 2210, 2214 and then travel upwardly along ray path (i.e. ray paths 2242A, 2242B, 2242C), where the wave can be detected by the hydrophones and geophones of the seismic streamers 2236. Such a reflection contains information about the various layers under the water bottom 2204 and can be retained for further processing. Additionally, the downwardly traveling wave traveling along ray path (i.e., the ray paths 2242A, 2242B, 2242C) can transmit through the water bottom 2204 and travel along ray path before reflecting off a layer boundary (i.e., the upper layers 2206, 2212, and the upper interfaces 2208, 2210, 2214). A wave reflected thus can then travel upward until it is detected by the hydrophones and geophones. Such a reflection can contain useful information about subterranean formations of interest that can be used to generate seismic measurements.

In addition, a portion of the wave traveling upwardly can be reflected by the water bottom 2204 and travel downward, and so on and so forth as the waves can be both transmitted and reflected by various boundaries. The measurements made of the waves traveling along multiple ray paths are measurements of seismic multiples, which have reflected off of various boundaries. The measurements of the various seismic waves and reflections can be conglomerated to create a seismic volume.

Figure 23:
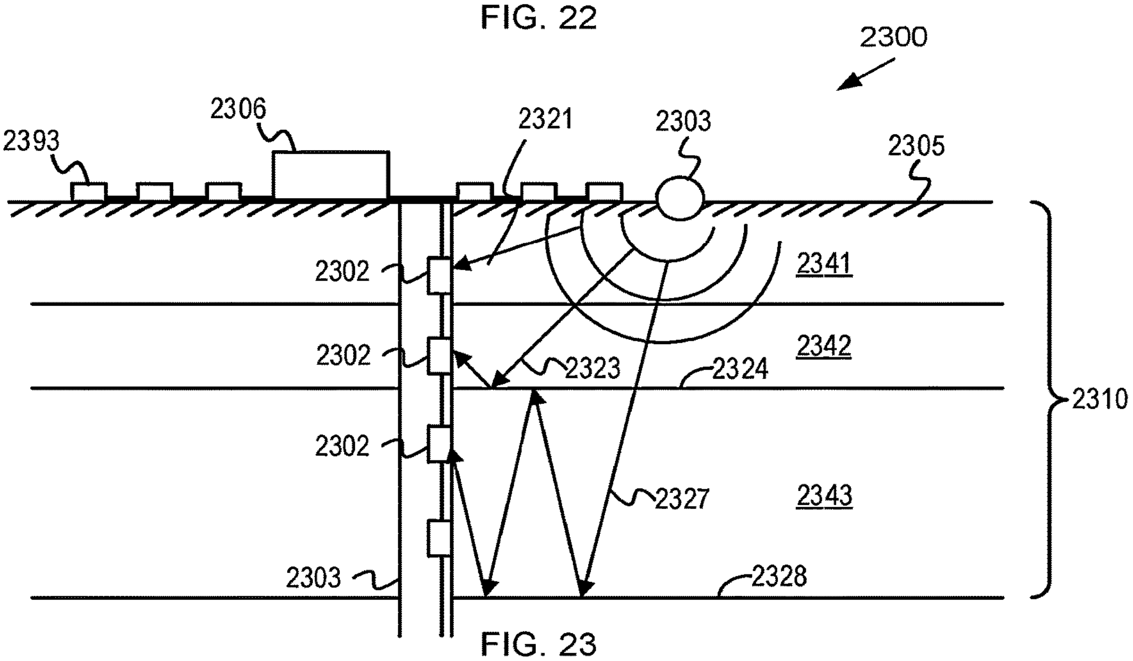
FIG. 23 depicts an example schematic diagram of an example wellbore-based seismic survey system, according to some embodiments.

FIG. 23 depicts a schematic diagram of an example wellbore-based seismic survey system, according to some embodiments. FIG. 23 depicts a schematic diagram 2300 of an onshore borehole seismic survey environment. Subsurface seismic sensors 2302 are in a spaced-apart arrangement within a borehole 2303 to detect seismic waves. The subsurface seismic sensors 2302 can be fixed in place by anchors to facilitate sensing seismic waves. In other embodiments, the subsurface seismic sensors 2302 can be attached to or integrated into a tubing (e.g. well casing or drill pipe), part of a logging-while-drilling (LWD) tool string, part of a bottomhole assembly, incorporated into a wireline logging tool, or attached to a wireline logging tool string. Furthermore, the subsurface seismic sensors 2302 communicate wirelessly or via cable to a data acquisition system 2306 at a surface 2305, where the data acquisition system 2306 receives, processes, and stores seismic measurements collected by the subsurface seismic sensors 2302. In addition, the data acquisition system 2306 can collect seismic measurements from the surface seismic sensors 2393, which are positioned on the surface 2305.

A seismic source 2308 generates a seismic wave which is then measured and added to a set of seismic measurements. The seismic wave propagates through a formation 2310. The formation 2310 includes an upper layer 2341, middle layer 2342, and lower layer 2343. A first seismic wave propagates along the wave trajectory 2321 as a direct wave, which proceeds directly through the upper layer 2341 to the subsurface seismic sensors 2302 without reflection. A second seismic wave propagates along the wave trajectory 2323, which shows a reflection at the interlayer boundary 2324 before arriving at the subsurface seismic sensors 2302.

A third seismic wave is a seismic multiple that propagates along the wave trajectory 2327, which travels through the upper layer 2341, middle layer 2342, and lower layer 2343 before being reflected twice off the interlayer boundary 2328 and once off the interlayer boundary 2324 before arriving at the subsurface seismic sensors 2302. Such waves reflect from acoustic impedance discontinuities or boundary layers to reach the subsurface seismic sensors 2302 and are seismic multiples due to the plurality of reflections off of interlayer boundaries. Illustrative discontinuities include faults, boundaries between formation beds, and boundaries between formation fluids. The collected seismic measurements can be considered seismic data and can be used to create a seismic volume.

Example Computer

Figure 24:
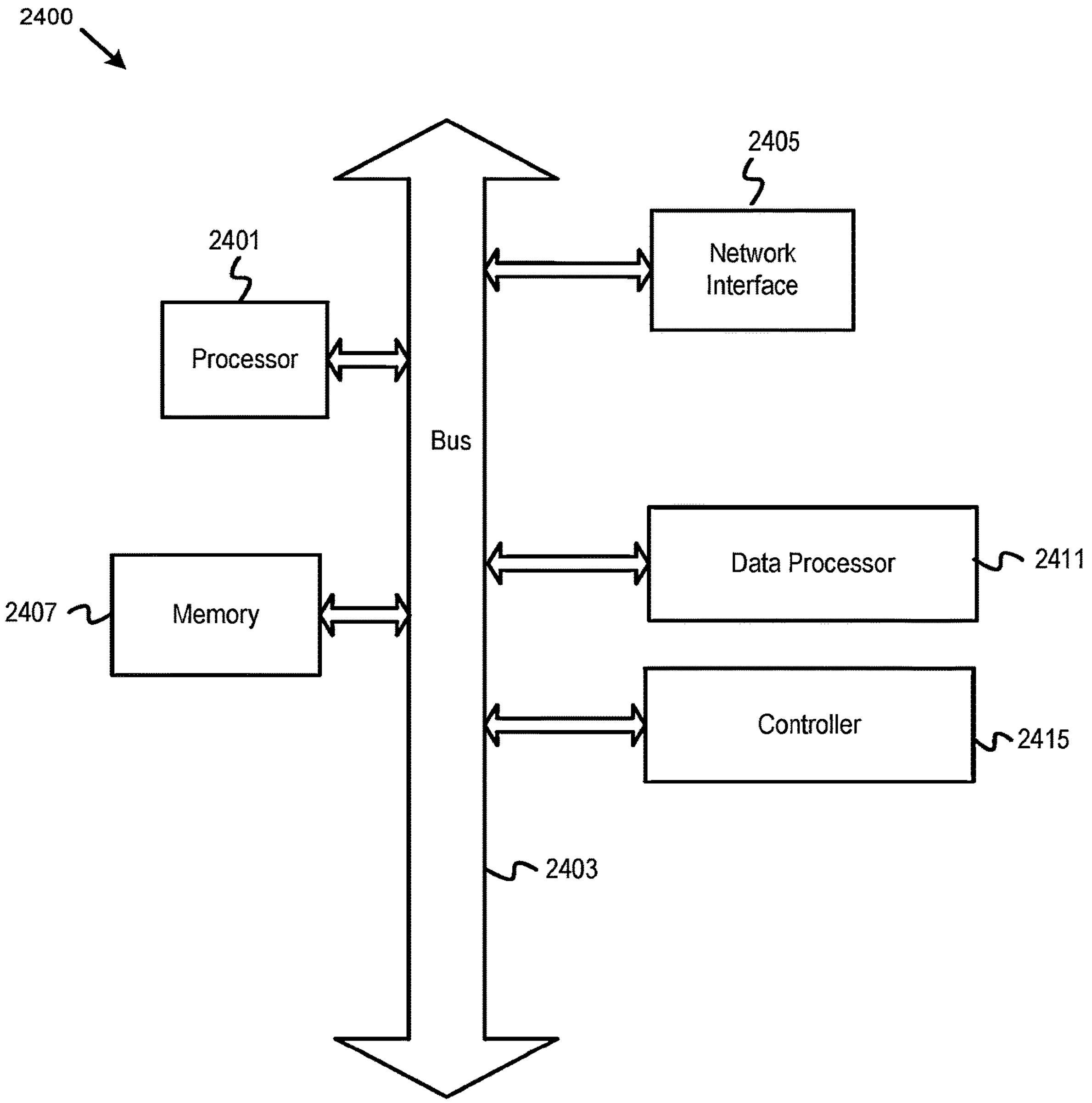
FIG. 24 depicts an example computer, according to some embodiments.

FIG. 24 depicts an example computer, according to some embodiments. A computer 2400 includes a processor 2401 (possibly including multiple processors, multiple cores, multiple nodes, and/or implementing multi-threading, etc.). The computer 2400 includes a memory 2407. The memory 2407 may be system memory or any one or more of the above already described possible realizations of machine-readable media. The computer 2400 also includes a bus 2403 and a network interface 2405. The computer 2400 can communicate via transmissions to and/or from remote devices via the network interface 2405 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

The computer 2400 also includes a data processor 2411, which may process seismic data and signals for generating a map of at least one horizon (as described herein). Any one of the previously described functionalities may be partially (or entirely) implemented in hardware and/or on the processor 2401. For example, the functionality may be implemented with an application specific integrated circuit, in logic implemented in the processor 2401, in a co-processor on a peripheral device or card, etc. Further, realizations may include fewer or additional components not illustrated in FIG. 24 (e.g., video cards, audio cards, additional network interfaces, peripheral devices, etc.). The processor 2401 and the network interface 2405 are coupled to the bus 2403. Although illustrated as being coupled to the bus 2403, the memory 2407 may be coupled to the processor 2401.

While the aspects of the disclosure are described with reference to various implementations and exploitations, it will be understood that these aspects are illustrative and that the scope of the claims is not limited to them. In general, techniques for seismic horizon mapping as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

EXAMPLE EMBODIMENTS

Example Embodiments disclosed herein include the following aspects and elements:

Aspect A: A method comprising: obtaining seismic data for a seismic volume that corresponds to a subsurface formation; generating a map of at least one horizon in the subsurface formation based on the seismic volume; identifying at least one fault intersecting the at least one horizon; determining a throw of the at least one fault; and updating the map of the at least one horizon to incorporate the at least one fault based on the throw of the at least one fault.

Aspect B: A non-transitory, machine-readable medium having instructions stored thereon that are executable by a processor to perform operations comprising: obtaining seismic data for a seismic volume that corresponds to a subsurface formation; generating a map of at least one horizon in the subsurface formation based on the seismic volume; identifying at least one fault intersecting the at least one horizon; determining a throw of the at least one fault; and updating the map of the at least one horizon to incorporate the at least one fault based on the throw of the at least one fault.

Aspect C: An apparatus comprising: a processor; and a computer-readable medium having instructions stored thereon that are executable by the processor to cause the processor to, obtain seismic data for a seismic volume that corresponds to a subsurface formation; generate a map of at least one horizon in the subsurface formation based on the seismic volume; identify at least one fault intersecting the at least one horizon; determine a throw of the at least one fault; and update the map of the at least one horizon to incorporate the at least one fault based on the throw of the at least one fault.

Aspects A, B, and C may have one or more of the following additional elements in combination:

Element 1: wherein generating the map of the at least one horizon comprises: generating a number of grid points on the map along the at least one horizon, wherein each of the number of grid points is derived from a seismic trace; and determining a connecting line between adjacent grid points of the number of grid points indicating a seismic attribute.

Element 2: wherein the seismic attribute comprises a seismic dip.

Element 3: wherein updating the map of the at least one horizon comprises: removing any grid point on the at least one fault; and removing any connecting lines that connects any grid point that has been removed.

Element 4: wherein updating the map of the at least one horizon comprises removing any connecting line that crosses the at least one fault.

Element 5: wherein updating the map of the at least one horizon comprises determining, independently, the map of the at least one horizon on each side of the at least one fault.

Element 6: wherein updating the map of the at least one horizon comprises determining a connecting line between two grid points of the number of grid points on opposite sides of the fault relative to the seismic attribute.

Element 7: wherein the two grid points includes grid points nearest the at least one fault on each side of the at least one fault.

Element 8: wherein the at least one horizon includes a first horizon partition and a second horizon partition, and wherein updating the map of the at least one horizon comprises: adding a first new grid point positioned on the at least one fault at a location wherein the first horizon partition is predicted to intersect with the at least one fault; adding a second new grid point positioned on the at least one fault at a location wherein the second horizon partition is predicted to intersect with the at least one fault; determining a connecting line between the first new grid point and a grid point of the number of grid points that is nearest the at least one fault in the first horizon partition; determining a connecting line between the second new grid point and a grid point of the number of grid points that is nearest the at least one fault in the second horizon partition; and determining a connecting line between the first new grid point and the second new grid point.

Element 9: further comprising performing at least one operation in a wellbore formed in the subsurface formation based on the updated map.

Element 10: generating a number of grid points on the map along the at least one horizon, wherein each of the number of grid points is derived from a seismic trace; and determining a connecting line between adjacent grid points of the number of grid points indicating a seismic attribute, wherein the seismic attribute comprises a seismic dip.

Element 11: wherein the instructions executable by the processor to cause the processor to generate the map of the at least one horizon comprises instructions executable by the processor to cause the processor to generate a number of grid points on the map along the at least one horizon, wherein each of the number of grid points is derived from a seismic trace; and determine a connecting line between adjacent grid points of the number of grid points indicating a seismic attribute.

Element 12: wherein the instructions executable by the processor to cause the processor to update the map of the at least one horizon comprises instructions executable by the processor to cause the processor to determine a connecting line between two grid points of the number of grid points on opposite sides of the fault relative to the seismic attribute, wherein the two grid points includes grid points nearest the at least one fault on each side of the at least one fault.

Element 13: wherein the at least one horizon includes a first horizon partition and a second horizon partition, and wherein the instructions executable by the processor to cause the processor to update the map of the at least one horizon comprises instructions executable by the processor to cause the processor to: add a first new grid point positioned on the at least one fault at a location wherein the first horizon partition is predicted to intersect with the at least one fault; add a second new grid point positioned on the at least one fault at a location wherein the second horizon partition is predicted to intersect with the at least one fault; determine a connecting line between the first new grid point and a grid point of the number of grid points that is nearest the at least one fault in the first horizon partition; determine a connecting line between the second new grid point and a grid point of the number of grid points that is nearest the at least one fault in the second horizon partition; and determine a connecting line between the first new grid point and the second new grid point.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:

obtaining, via one or more seismic sensors, seismic data for a seismic volume that corresponds to a subsurface formation;

generating a model of at least one horizon in the subsurface formation based on the seismic data for the seismic volume;

identifying at least one fault intersecting the at least one horizon;

determining an estimated throw of the at least one fault;

iteratively updating the model of the at least one horizon to incorporate the at least one fault as a part of the model by substituting equations solving for points on a surface of the horizon that lie on either side of the fault, based on the estimated throw of the at least one fault and an update of the estimated throw of the at least one fault, until a convergence criterion is satisfied; and performing at least one downhole operation for recovery of hydrocarbons based on the updated model of the at least one horizon, wherein the at least one operation for the recovery of hydrocarbons is one of completion of a wellbore, updating drilling operations, perforating, fracking, logging operations, and additional sampling of the subsurface formation, and wherein updating drilling operations includes changing a drilling operation, a perforating operation, or a fracking operation.

2. The method of claim 1, wherein generating the model of the at least one horizon comprises:

generating at least one constraint condition for generating the model;

generating a number of grid points along the at least one horizon, based on at the at least one constraint, and wherein each of the number of grid points is derived from a seismic trace;

determine a weighting factor for the at least one horizon on local grid edges of the number of grid points; and determining a connecting line between adjacent grid points of the number of grid points indicating a seismic attribute.

3. The method of claim 2, wherein the seismic attribute comprises a seismic dip.

4. The method of claim 2, wherein updating the model of the at least one horizon comprises:

removing any grid point on the at least one fault; and removing any connecting lines that connects any grid point that has been removed.

5. The method of claim 2, wherein updating the model of the at least one horizon comprises removing any connecting line that crosses the at least one fault.

6. The method of claim 1, wherein updating the model of the at least one horizon comprises determining, independently, the model of the at least one horizon on each side of the at least one fault.

7. The method of claim 2, wherein updating the model of the at least one horizon comprises determining a connecting line between two grid points of the number of grid points on opposite sides of the fault relative to the seismic attribute.

8. The method of claim 7, wherein the two grid points includes grid points nearest the at least one fault on each side of the at least one fault.

9. The method of claim 2, wherein the at least one horizon includes a first horizon partition and a second horizon partition, and wherein updating the model of the at least one horizon comprises, adding a first new grid point positioned on the at least one fault at a location wherein the first horizon partition is predicted to intersect with the at least one fault;

adding a second new grid point positioned on the at least one fault at a location wherein the second horizon partition is predicted to intersect with the at least one fault;

determining a connecting line between the first new grid point and a grid point of the number of grid points that is nearest the at least one fault in the first horizon partition;

determining a connecting line between the second new grid point and a grid point of the number of grid points that is nearest the at least one fault in the second horizon partition; and determining a connecting line between the first new grid point and the second new grid point.

10. The method of claim 1, wherein changing the drilling operation, the perforating operation, or the fracking operation comprises initiating or stopping the drilling operation, the perforating operation, or the fracking operation.

11. A non-transitory, machine-readable medium having instructions stored thereon that are executable by a processor to perform seismic data processing operations comprising:

obtaining, via one or more seismic sensors, seismic data for a seismic volume that corresponds to a subsurface formation;

generating a model of at least one horizon in the subsurface formation based on the seismic data for the seismic volume;

identifying at least one fault intersecting the at least one horizon;

determining an estimated throw of the at least one fault;

iteratively updating the model of the at least one horizon to incorporate the at least one fault as part of the model by substituting equations solving for points on a surface of the horizon that lie on either side of the fault, based on the estimated throw of the at least one fault and an update of the estimated throw of the at least one fault, until a convergence criterion is satisfied; and performing an operation for recovery of hydrocarbons based on the updated model of the at least one horizon, wherein the operation for the recovery of hydrocarbons is one of completion of a wellbore, updating drilling operations, perforating, fracking, logging operations, and additional sampling of the subsurface formation, and wherein updating drilling operations includes changing a drilling operation, a perforating operation, or a fracking operation.

12. The non-transitory, machine-readable medium of claim 11, wherein generating the model of the at least one horizon comprises:

generating at least one constraint condition for generating the model;

generating a number of grid points along the at least one horizon, based on the at least one constraint, and wherein each of the number of grid points is derived from a seismic trace;

determine a weighting factor for the at least one horizon on local grid edges of the number of grid points; and determining a connecting line between adjacent grid points of the number of grid points indicating a seismic attribute, wherein the seismic attribute comprises a seismic dip.

13. The non-transitory, machine-readable medium of claim 12, wherein updating the model of the at least one horizon comprises:

removing any grid point on the at least one fault; and removing any connecting lines that connects any grid point that has been removed.

14. The non-transitory, machine-readable medium of claim 12, wherein updating the model of the at least one horizon comprises removing any connecting line that crosses the at least one fault.

15. The non-transitory, machine-readable medium of claim 12, wherein updating the model of the at least one horizon comprises determining a connecting line between two grid points of the number of grid points on opposite sides of the fault relative to the seismic attribute, wherein the two grid points includes grid points nearest the at least one fault on each side of the at least one fault.

16. The non-transitory, machine-readable medium of claim 12, wherein the at least one horizon is separated into a first horizon partition and a second horizon partition by the at least one fault, and wherein updating the model of the at least one horizon comprises, adding a first new grid point positioned on the at least one fault at a location wherein the first horizon partition is predicted to intersect with the at least one fault;

adding a second new grid point positioned on the at least one fault at a location wherein the second horizon partition is predicted to intersect with the at least one fault;

determining a connecting line between the first new grid point and a grid point of the number of grid points that is nearest the at least one fault in the first horizon partition;

determining a connecting line between the second new grid point and a grid point of the number of grid points that is nearest the at least one fault in the second horizon partition; and determining a connecting line between the first new grid point and the second new grid point.

17. An apparatus for performing seismic data processing comprising:

a processor; and a non-transitory computer-readable medium having instructions stored thereon that are executable by the processor to cause the processor to:

obtain, via one or more seismic sensors, seismic data for a seismic volume that corresponds to a subsurface formation;

generate a model of at least one horizon in the subsurface formation based on the seismic data for the seismic volume;

identify at least one fault intersecting the at least one horizon;

determine an estimated throw of the at least one fault;

iteratively update the model of the at least one horizon to incorporate the at least one fault as part of the model by substituting equations solving for points on a surface of the horizon that lie on either side of the fault, based on the estimated throw of the at least one fault and an update of the estimated throw of the at least one fault, until a convergence criterion is satisfied; and direct a drilling tool to perform an operation for recovery of hydrocarbons based on the updated model of the at least one horizon, wherein the operation for the recovery of hydrocarbons is one of completion of a wellbore, updating drilling operations, perforating, fracking, logging operations, and additional sampling of the subsurface formation, and wherein updating drilling operations includes changing a drilling operation, a perforating operation, or a fracking operation.

18. The apparatus of claim 17, wherein the instructions executable by the processor to cause the processor to generate the model of the at least one horizon comprises instructions executable by the processor to cause the processor to:

generating at least one constraint condition for generating the model;

generate a number of grid points along the at least one horizon, based on the at least one constraint, and wherein each of the number of grid points is derived from a seismic trace;

determine a weighting factor for the at least one horizon on local grid edges of the number of grid points; and determine a connecting line between adjacent grid points of the number of grid points indicating a seismic attribute.

19. The apparatus of claim 18, wherein the instructions executable by the processor to cause the processor to update the model of the at least one horizon comprises instructions executable by the processor to cause the processor to determine a connecting line between two grid points of the number of grid points on opposite sides of the fault relative to the seismic attribute, wherein the two grid points includes grid points nearest the at least one fault on each side of the at least one fault.

20. The apparatus of claim 18, wherein the at least one horizon includes a first horizon partition and a second horizon partition, and wherein the instructions executable by the processor to cause the processor to update the model of the at least one horizon comprises instructions executable by the processor to cause the processor to:

add a first new grid point positioned on the at least one fault at a location wherein the first horizon partition is predicted to intersect with the at least one fault;

add a second new grid point positioned on the at least one fault at a location wherein the second horizon partition is predicted to intersect with the at least one fault;

determine a connecting line between the first new grid point and a grid point of the number of grid points that is nearest the at least one fault in the first horizon partition;

determine a connecting line between the second new grid point and a grid point of the number of grid points that is nearest the at least one fault in the second horizon partition; and determine a connecting line between the first new grid point and the second new grid point.

* * * * *